United States Patent
Takei et al.

(10) Patent No.: US 7,567,286 B2
(45) Date of Patent: Jul. 28, 2009

(54) IMAGE PICKUP APPARATUS

(75) Inventors: Hirofumi Takei, Yokohama (JP); Naoya Kaneda, Chigasaki (JP); Tadanori Okada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/558,975

(22) Filed: Nov. 13, 2006

(65) Prior Publication Data
US 2007/0065135 A1 Mar. 22, 2007

Related U.S. Application Data

(62) Division of application No. 09/240,635, filed on Jan. 29, 1999, now abandoned.

(30) Foreign Application Priority Data

| Feb. 2, 1998 | (JP) | ................... | 10-020938 |
| Apr. 15, 1998 | (JP) | ................... | 10-119913 |
| Jun. 26, 1998 | (JP) | ................... | 10-179950 |
| Jan. 21, 1999 | (JP) | ................... | 11-013527 |

(51) Int. Cl.
H04N 5/225 (2006.01)

(52) U.S. Cl. ................... 348/335; 348/340

(58) Field of Classification Search .............. 348/335, 348/340, 360, 362, 222.1; 396/63, 64, 213, 396/237, 459
See application file for complete search history.

(56) References Cited

U.S. PATENT DOCUMENTS

| 3,801,822 A | 4/1974 | Numata |
| 3,978,497 A | 8/1976 | Kondo |
| 4,016,597 A | 4/1977 | Dillon et al. |
| 4,117,500 A * | 9/1978 | Kondo .................... 396/239 |
| 4,827,348 A | 5/1989 | Ernest et al. |
| 4,984,143 A | 1/1991 | Richardson |
| 5,387,958 A | 2/1995 | Pashley |
| 5,953,546 A | 9/1999 | Okada et al. |
| 6,771,315 B1 | 8/2004 | Nanjo et al. |
| 2004/0130653 A1 | 7/2004 | Nanjo et al. |

FOREIGN PATENT DOCUMENTS

| JP | 02-123335 A | 5/1990 |
| JP | 06-016947 U | 3/1994 |
| JP | 07-020528 A | 1/1995 |
| JP | 09-096851 A | 4/1997 |
| JP | 2000-106649 A | 4/2000 |
| JP | 2000-147589 A | 5/2000 |

OTHER PUBLICATIONS

The above references were cited in a Jun. 17, 2008 Japanese Office Action issued in the counterpart Japanese Patent Application 11-013527.

* cited by examiner

Primary Examiner—Sinh Tran
Assistant Examiner—Yogesh K Aggarwal
(74) Attorney, Agent, or Firm—Cowan, Liebowitz & Latman, P.C.

(57) ABSTRACT

A light quantity control device includes a diaphragm for controlling an incident light quantity and an ND filter insertable into and retractable from an effective ray in a plane approximately perpendicular to an optical axis, and inserts the ND filter into the effective ray before small-aperture diffraction occurs, and also controls the amount of relative movement between the diaphragm and the ND filter to prevent occurrence of shading due to an edge of the ND filter and a variation in brightness during the insertion of the ND filter.

4 Claims, 30 Drawing Sheets

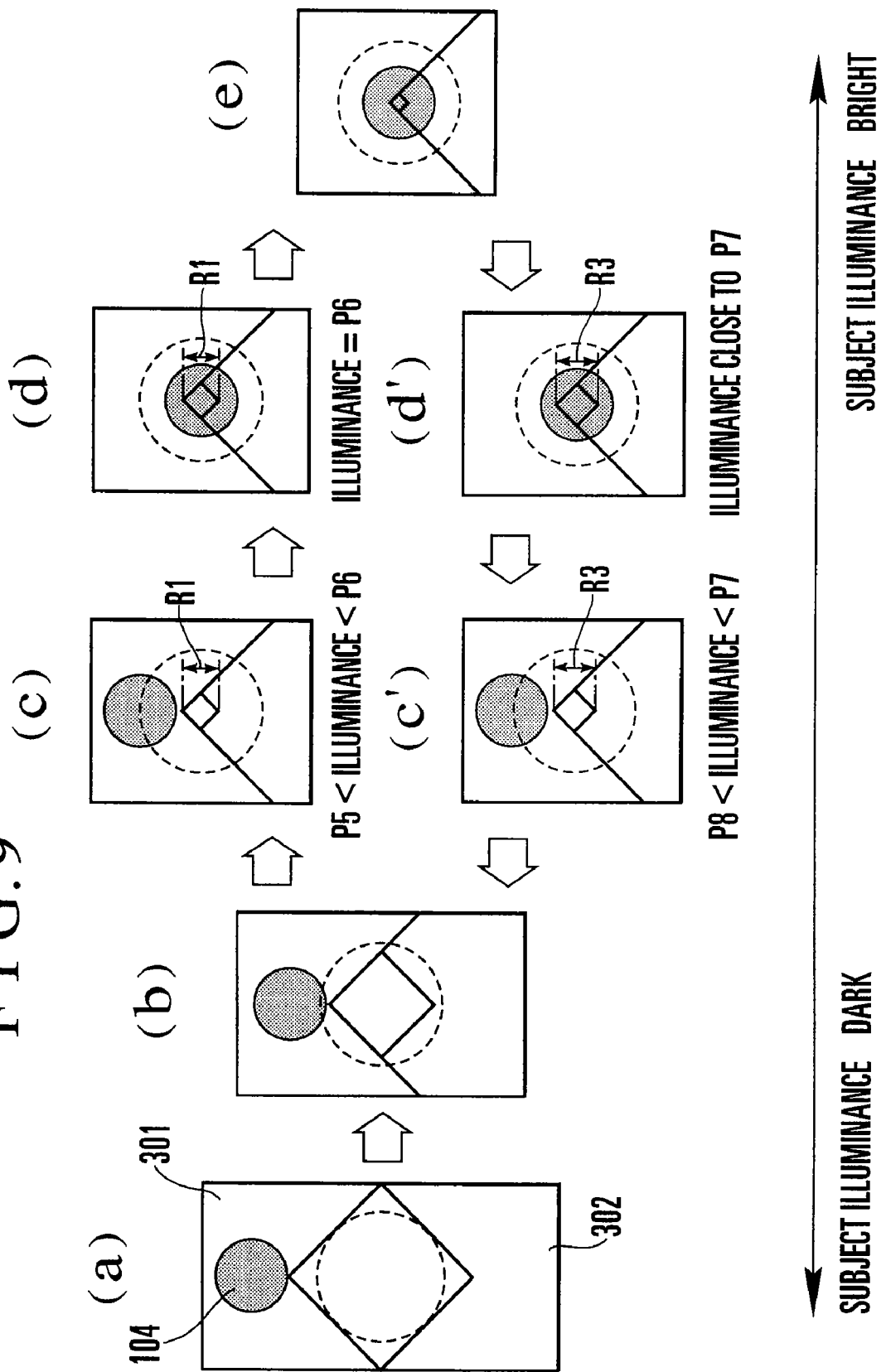

F I G. 22
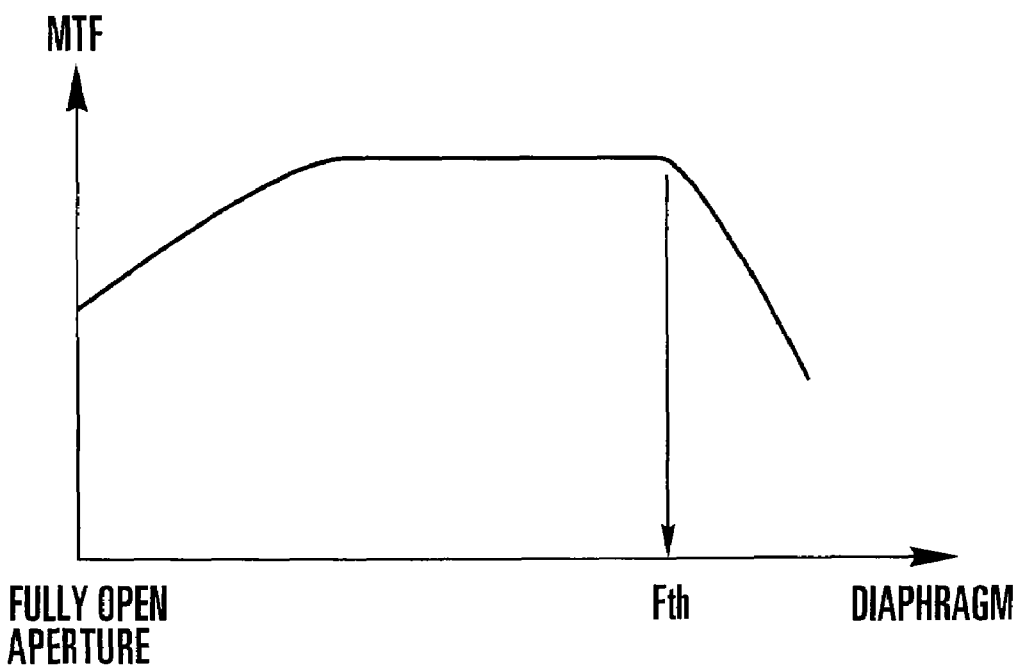
F I G.23(A)
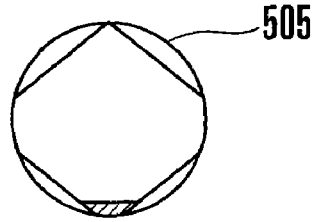
F I G.23(B)
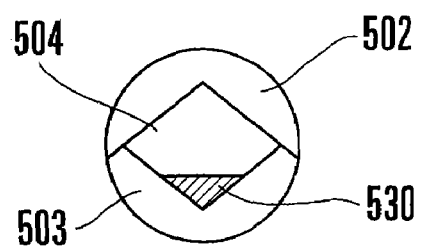
F I G.23(C)
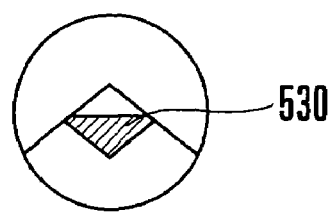
F I G.23(D)
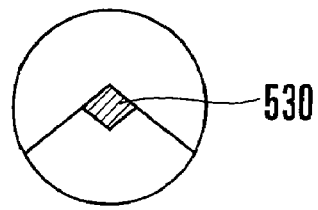

IMAGE PICKUP APPARATUS

CROSS-REFERENCE TO RELATED APPLICATIONS

This application is a divisional of U.S. application Ser. No. 09/240,635, filed Jan. 29, 1999 now abandoned, the entire disclosure of which is hereby incorporated by reference.

BACKGROUND OF THE INVENTION

1. Field of the Invention

The present invention relates to an image pickup apparatus having diaphragm means and a light-attenuating filter.

2. Description of Related Art

Conventionally, an image pickup apparatus such as a video camera has employed the art of cementing a light-attenuating filter (hereinafter referred to as an ND filter (neutral-density filter)) to a diaphragm blade so that correct exposure can be obtained even if the aperture of the image pickup apparatus becomes small during photography under high-subject-illuminance conditions such as a beach or a snow-covered mountain.

FIG. 1 shows the structure and the operation of diaphragm blades of a diagram which has been used in a conventional video camera. In FIG. 1, reference numerals 1 and 2 denote diaphragm blades, reference numeral 3 denotes an ND filter secured to the diaphragm blade 1, and reference numeral 4 denotes the diameter of the optical path of a photographing optical system in the vicinity of the diaphragm blades. As is apparent in FIG. 1, as subject illuminance becomes higher, the aperture diameter of the diaphragm varies from a fully open aperture diameter (Part (a) of FIG. 1) to a small aperture diameter ((Part (b) of FIG. 2).

However, in the above-described apparatus, if the aperture diameter becomes small as shown in Part (d) of FIG. 1, it is possible to obtain the effect of the ND filter 3 cemented to the diaphragm blade 1, but if the aperture diameter becomes larger than the diameter of the ND filter 3, diffraction or shading occurs due to the difference between a light beam passing through a gap "a" between the ND filter 3 and the diaphragm blade 2 as shown in Part (c) of FIG. 1 and a light beam passing through the ND filter 3, so that the problem of deterioration in image quality occurs.

FIG. 2 shows the relation between subject illuminance and aperture diameter in the conventional image pickup apparatus. As is apparent from FIG. 2, as the subject illuminance becomes higher, the aperture diameter becomes smaller, and when the subject illuminance reaches a predetermined brightness level P1, the aperture diameter reaches a minimum limit below which diffraction occurs. However, when the subject illuminance reaches a brightness level P0 lower than the brightness level P1, the aperture diameter becomes the diameter shown in Part (c) of FIG. 1 and the aforesaid problem such as shading or diffraction occurs.

In addition, since the ND filter 3 is fixed to the diaphragm blade 1, even if the aperture is sufficiently open as shown in Parts (a) and (b) of FIG. 1, the ND filter 3 lies in the optical path and causes a number of problems, for example, the defocus effect of a picked-up image is impaired.

Furthermore, as is apparent from the diagram of FIG. 2, the conventional image pickup apparatus has the disadvantage that even if the ND filter 3 covers the aperture of the diaphragm, it is impossible to fully obtain the effect of extending the range of subject illuminance which enables high-quality photography to a far brighter side.

BRIEF SUMMARY OF THE INVENTION

The invention has been made to solve the above-described problems, and its first object is to provide an image pickup apparatus capable of effecting exposure control which realizes high image quality free from small-aperture diffraction, shading or the like.

A second object of the present invention is to provide an image pickup apparatus and an exposure control device both of which are capable of smoothly executing control of an optical member such as an ND filter.

To achieve the above objects, in accordance with a preferred embodiment of the present invention, there is provided an image pickup apparatus which comprises diaphragm means for varying a size of a diaphragm aperture which determines a light quantity to be made incident on image pickup means, a light-attenuating filter which is capable of moving between an insertion position at which the light-attenuating filter covers the whole of the diaphragm aperture and a retraction position at which the light-attenuating filter is retracted from the whole of the diaphragm aperture, and control means for both controlling the diaphragm means and controlling a movement of the light-attenuating filter, according to a subject illuminance detected through the image pickup means, wherein when the size of the diaphragm aperture reaches a first predetermined value with the light-attenuating filter being positioned at the retraction position, the control means executes control which moves the light-attenuating filter to the insertion position and, at the same time, causes the diaphragm means to make the diaphragm aperture larger than the first predetermined value.

A third object of the present invention is to optimize a relative movement between a diaphragm and an optical member such as an ND filter.

To achieve the above object, in accordance with a preferred embodiment of the present invention, there is provided a light quantity adjusting device which comprises first light quantity adjusting means for adjusting a light quantity which is transmitted through a lens, by varying an aperture diameter, second light quantity adjusting means for adjusting a light quantity which is transmitted through the lens, by a method different from the first light quantity adjusting means, and control means for controlling, when varying a transmitted light quantity which is passing through the lens, the first light quantity adjusting means and the second light quantity adjusting means so that the first light quantity adjusting means and the second light quantity adjusting means provide a target light quantity by operating at the same time so that a direction of variation in the transmitted light quantity due to the first light quantity adjusting means and a direction of variation in the transmitted light quantity due to the second light quantity adjusting means are made opposite to each other.

The above and other objects, features and advantages of the present invention will become apparent from the following detailed description of preferred embodiments of the present invention, taken in conjunction with the accompanying drawings.

BRIEF DESCRIPTION OF THE SEVERAL VIEWS OF THE DRAWING

FIG. 9 is an explanatory view showing the operations of diaphragm blades and an ND filter in the image pickup apparatus according to the second embodiment of the present invention;

FIG. 22 is a view showing a relation between aperture values and MTF;

FIGS. 23(A) to 23(D) are views showing the operations of a diaphragm and an ND filter in a conventional example;

DETAILED DESCRIPTION OF THE INVENTION

Preferred embodiments of the present invention will be described below in detail with reference to the accompanying drawings.

FIRST EMBODIMENT

Figure 1:
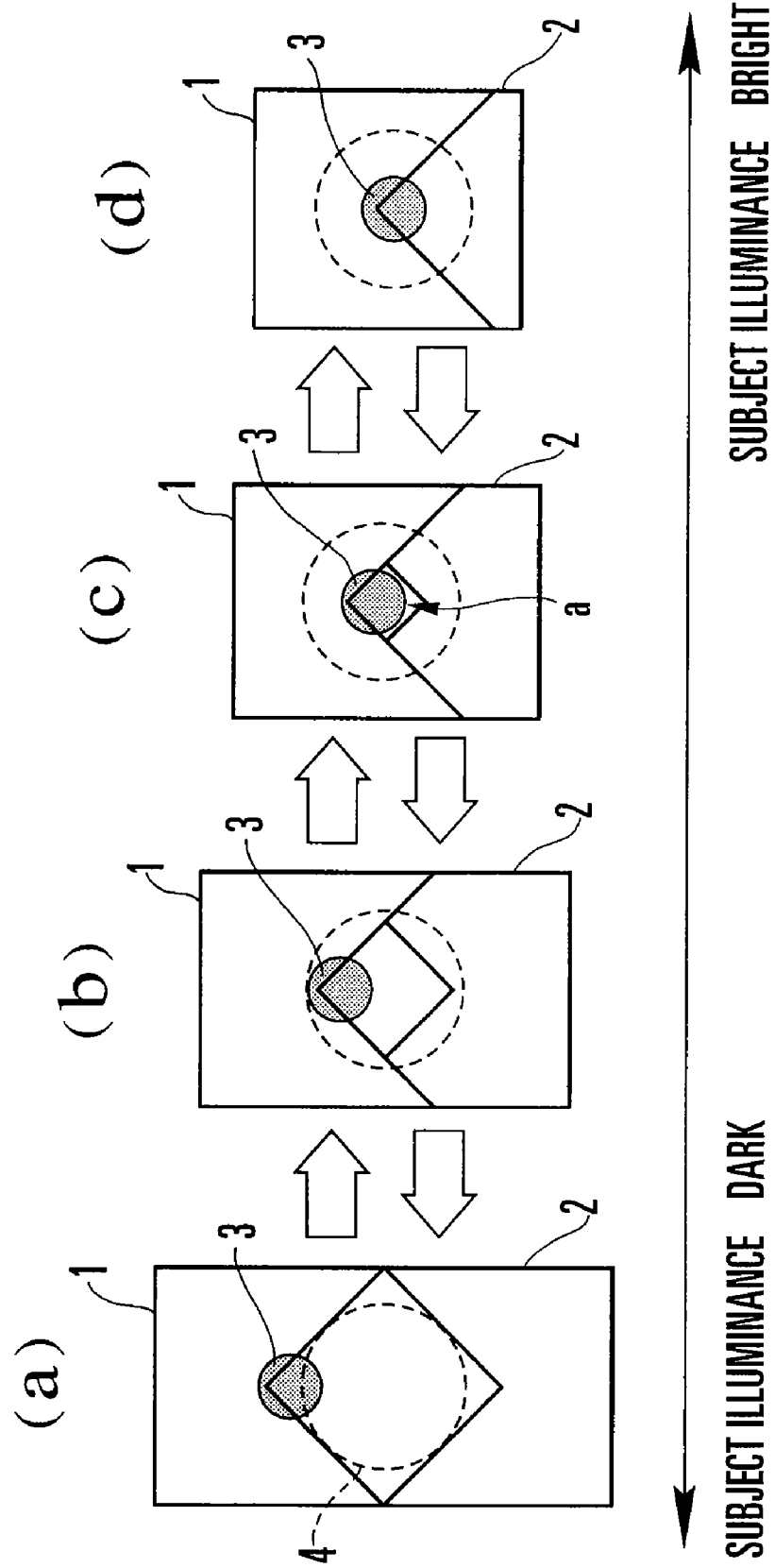
FIG. 1 is an explanatory view showing the operations of a diaphragm blade and an ND filter in a conventional image pickup apparatus.
Figure 2:
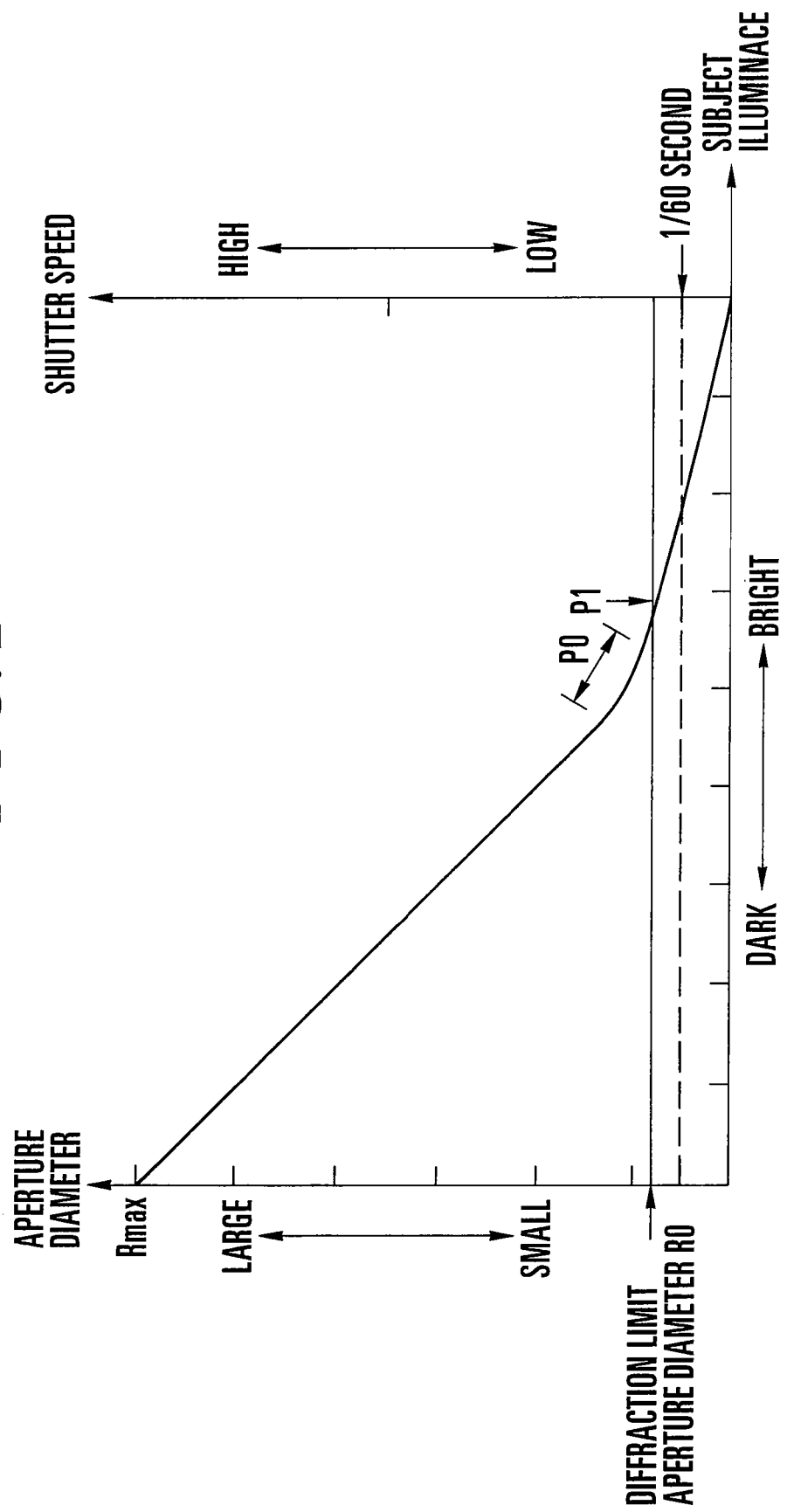
FIG. 2 is a program diagram used in the conventional image pickup apparatus.
Figure 3:
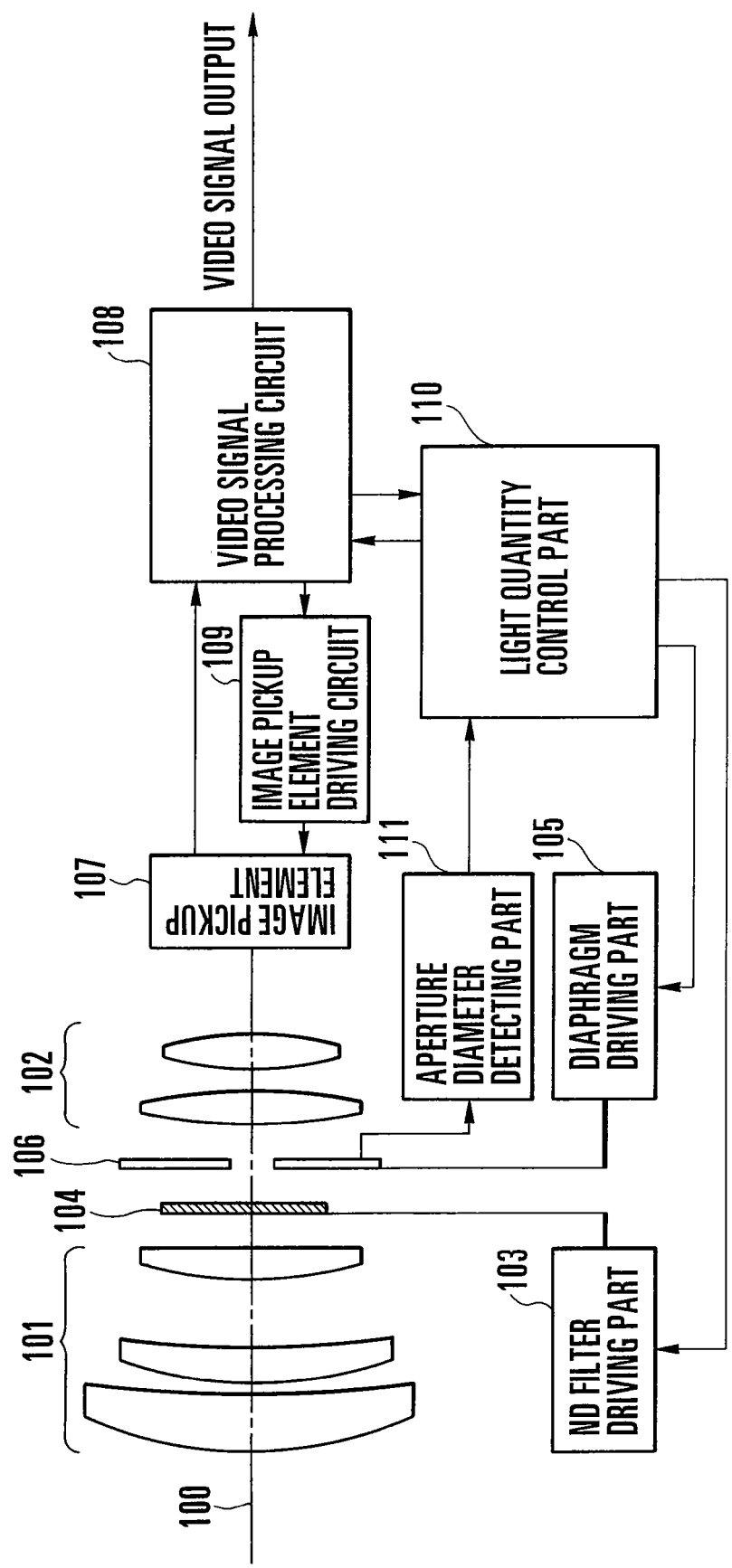
FIG. 3 is a block diagram showing an image pickup apparatus according to a first embodiment of the present invention.

FIG. 3 shows an image pickup apparatus according to a first embodiment of the present invention. In the image pickup apparatus, lenses 101 and 102 constitute a photographing optical system having an optical axis 100, and an ND filter (neutral-density filter) 104 and a diaphragm device 106 are disposed along the optical axis 100. The ND filter 104 is arranged to be inserted into or retracted from an optical path in which the ND filter 104 completely covers the aperture of the diaphragm device 106, by an ND filter driving part 103, and the diaphragm device 106 is controlled by a diaphragm driving part 105. The ND filter 104 and the diaphragm device 106 are controlled independently of each other.

A subject image which has passed through this photographing optical system is focused on an image pickup element 107. The signal outputted from the image pickup element 107 is converted into a standard television signal by a video signal processing circuit 108, and the video signal processing circuit 108 outputs the standard television signal to an external recording part, a television monitor or the like (not shown). An image pickup element driving circuit 109 which can vary the shutter speed (storage time) of the image pickup element 107 in accordance with a control signal supplied from the video signal processing circuit 108 is connected to the image pickup element 107.

A luminance signal of the subject image is inputted to a light quantity control part 110 from the video signal processing circuit 108. A signal indicative of a current aperture diameter (aperture value) is also inputted to the light quantity control part 110 from an aperture diameter detecting part 111. The light quantity control part 110 reads an appropriate diaphragm control signal and ND filter control signal from the program diagram shown in FIG. 5, in accordance with these signals, and outputs the read signals to the diaphragm driving part 105 and the ND filter driving part 103, respectively. The light quantity control part 110 reads a shutter speed from a program diagram in accordance with the luminance signal and the aperture value signal, and outputs a shutter speed control signal to the video signal processing circuit 108. The video signal processing circuit 108 drives the image pickup element driving circuit 109 to determine the shutter speed of the image pickup element 107, in accordance with the input shutter speed control signal.

The operation of the light quantity control part 110 incorporated in the image pickup apparatus according to the first embodiment will be described below with reference to the flowchart shown in FIG. 4. First, in Step S201, the light quantity control part 110 initializes its built-in microcontroller and peripheral circuits. Then, in Step S202, the light quantity control part 110 executes feedback control of the diaphragm device 106 so that the level of a luminance signal which is inputted to the light quantity control part 110 from the video signal processing circuit 108 on a field-by-field basis is adjusted to a predetermined luminance level.

Then, in Step S203, the light quantity control part 110 compares a current aperture diameter R supplied from the aperture diameter detecting part 111 with a filter retraction diameter R2 (second predetermined value). If the light quantity control part 110 determines that the current subject illuminance is low and the current aperture diameter R is not less than the filter retraction diameter R2, the process proceeds to Step S204, in which the light quantity control part 110 determines whether the ND filter 104 is inserted in the optical path in which the ND filter 104 completely covers the aperture of the diaphragm device 106.

If the ND filter 104 is inserted in such optical path, the process proceeds to Step S205, in which the light quantity control part 110 outputs a control signal for retracting the ND filter 104 from the optical path to the ND filter driving part 103. At the same time, in Step S206, the light quantity control part 110 causes the diaphragm driving part 105 to close the diaphragm device 106 by an amount DR2 equivalent to a light quantity which has increased due to the retraction of the ND filter 104.

On the other hand, if the light quantity control part 110 determines in Step S204 that the ND filter 104 is retracted from the optical path, the process returns to Step S202, in which the light quantity control part 110 performs the next exposure control operation.

If the light quantity control part 110 determines in Step S203 that the current aperture diameter R is smaller than the filter retraction diameter R2, the process proceeds to Step S207, in which the light quantity control part 110 makes a comparison between the current aperture diameter R and a filter insertion diameter R1 (first predetermined value). If the light quantity control part 110 determines that the current subject illuminance is high and the current aperture diameter R is not greater than the filter insertion diameter R1, the process proceeds to Step S208, in which the light quantity control part 110 determines whether the ND filter 104 is inserted in the aforesaid optical path. If the light quantity control part 110 determines that the ND filter 104 is retracted from the optical path, the process proceeds to Step S209, in which the light quantity control part 110 outputs a control signal for inserting the ND filter 104 into the optical path to the ND filter driving part 103. Then, in Step S210, the light quantity control part 110 causes the diaphragm driving part 105 to open the diaphragm device 106 by an amount DR1 equivalent to a light quantity which has decreased due to the insertion of the ND filter 104.

On the other hand, if the light quantity control part 110 determines in Step S208 that the ND filter 104 is inserted in the optical path, the process returns to Step S202, in which the light quantity control part 110 performs the next exposure control operation.

The aforesaid operation will be described below with reference to FIGS. 5 and 6. In FIG. 6, reference numerals 301 and 302 denote diaphragm blades incorporated in the diaphragm device 106, and reference numeral 304 denotes an optical-path diameter. When the diaphragm device 106 is in its initial state, if the subject illuminance is low and the aperture diameter of the diaphragm device 106 is a maximum diameter Rmax, the shape of the diaphragm aperture of the diaphragm device 106 is in a fully open state as shown in Part (a) of FIG. 6.

Figure 5:
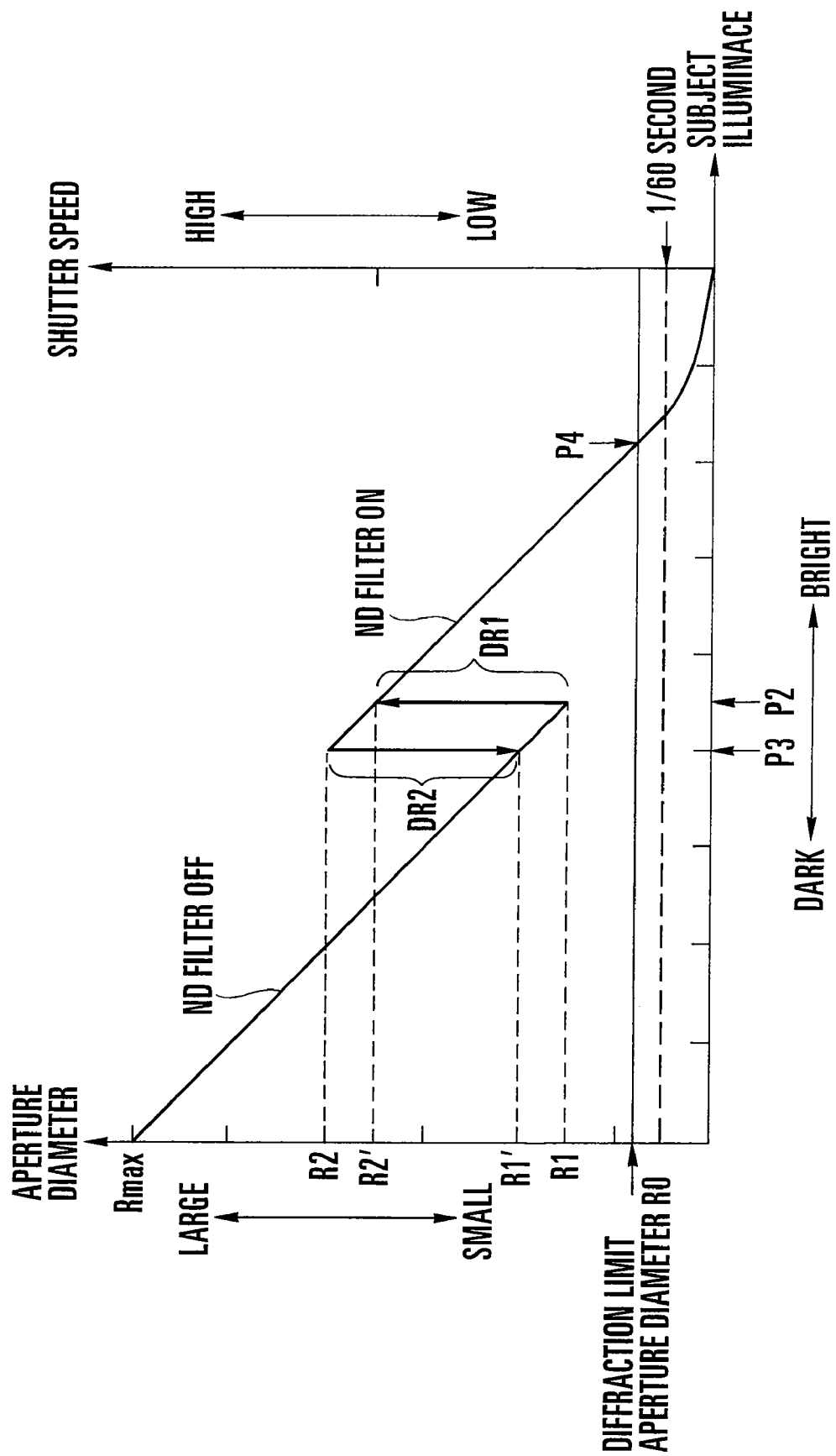
FIG. 5 is a program diagram of the light quantity control part according to the first embodiment of the present invention.
Figure 6:
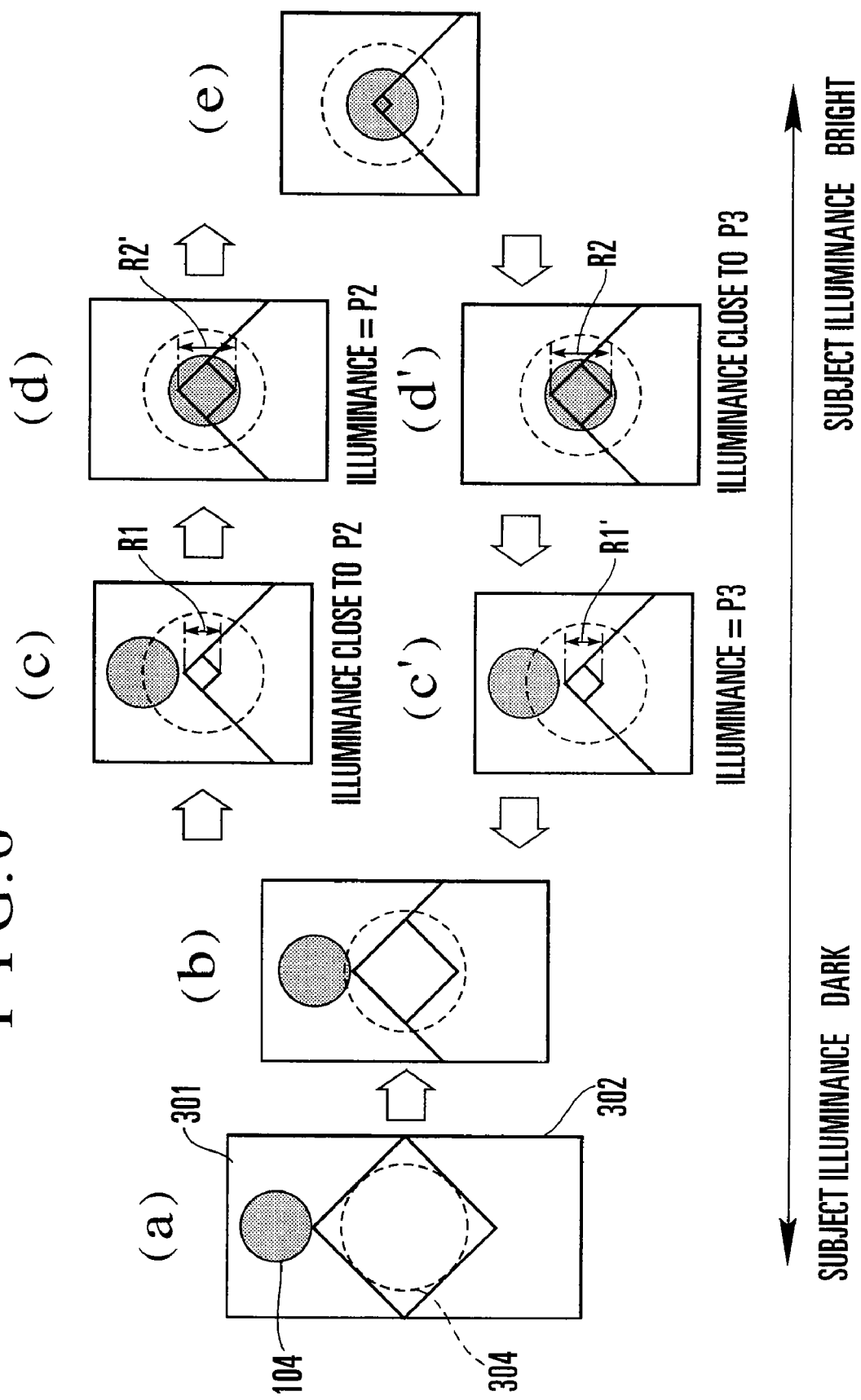
FIG. 6 is an explanatory view showing the operations of diaphragm blades and an ND filter in the image pickup apparatus according to the first embodiment of the present invention.

Then, as the subject illuminance becomes higher toward a value P2 of FIG. 5, the diaphragm device 106 is gradually closed and the aperture diameter becomes closer to the filter insertion diameter R1, and the shape of the aperture diameter varies from the state shown in Part (b) of FIG. 6 to the state shown in Part (c) of FIG. 6. During this time, the ND filter 104 is not at all inserted into the diaphragm aperture of the diaphragm device 106.

Figure 4:
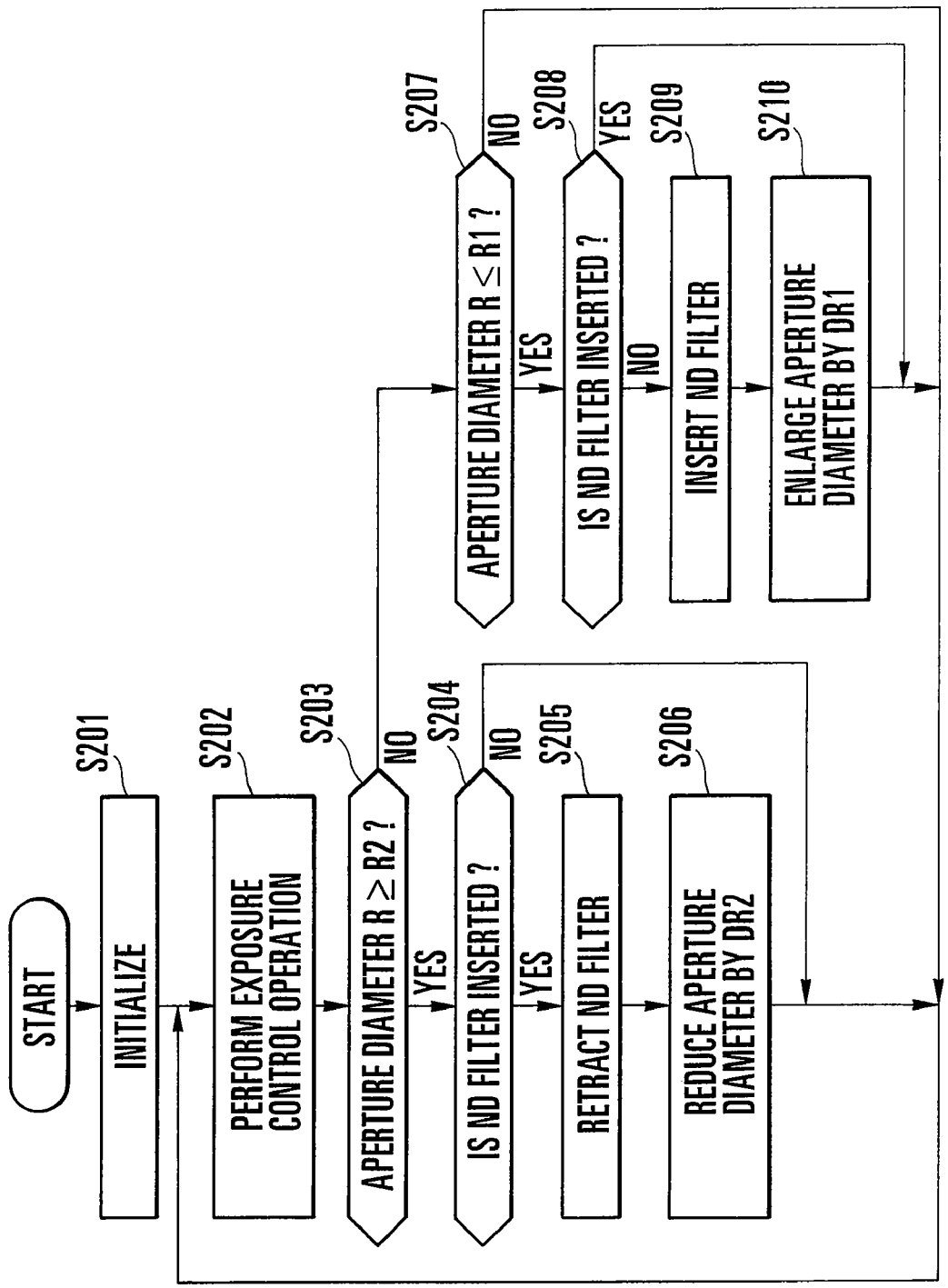
FIG. 4 is a flowchart showing the operation of a light quantity control part of the image pickup apparatus according to the first embodiment of the present invention.

Then, if the subject illuminance increases up to the value P2 of FIG. 5 and the aperture diameter reaches the filter insertion diameter R1, the ND filter 104 is inserted to completely cover the diaphragm aperture, by the processing of Steps S207 to S210 of FIG. 4, and, at the same time, the aperture diameter is opened by the amount DR1 and reaches a diameter R2'. At this time, the shape of the aperture diameter assumes the state shown in Part (d) of FIG. 6.

Then, if the subject illuminance becomes higher to a further extent, the diaphragm device 106 is closed and the shape of the aperture diameter assumes the state shown in Part (e) of FIG. 6.

On the other hand, when the diaphragm device 106 is in the state shown in Part (e) of FIG. 6, as the subject illuminance becomes gradually lower, the diaphragm device 106 is gradually opened with the ND filter 104 being inserted, until the subject illuminance reaches a value P3 (at which the subject illuminance is lower than that at the value P2) and the shape of the aperture diameter assumes the state shown in Part (d') of FIG. 6.

Then, if the subject illuminance reaches the value P3 and the aperture diameter reaches a diameter R2 which is slightly larger than the diameter R2', the ND filter 104 is completely retracted from the optical path in which the ND filter 104 completely covers the diaphragm aperture, and, at the same time, the aperture diameter is reduced by the amount DR2 and reaches a diameter R1' which is slightly larger than the filter insertion diameter R1, and the shape of the aperture diameter assumes the state shown in Part (c') of FIG. 6.

According to the above-described image pickup apparatus according to the first embodiment, the ND filter 104 is controlled to move only between a position (insertion position) at which the ND filter 104 completely covers the diaphragm aperture and a position (retraction position) at which the ND filter 104 is completely retracted from the aperture diameter. Accordingly, it is possible to prevent the ND filter 104 from incompletely covering the diaphragm aperture, whereby it is possible to prevent diffraction or shading and improve the quality of picked-up images.

In addition, if the diaphragm aperture becomes smaller and reaches the filter insertion diameter R1 with the ND filter 104 being located in the retraction position, the ND filter 104 is made to move to the insertion position and, at the same time, the diaphragm aperture is made larger, whereby it is possible to pick up an image without causing diffraction or the like over a wide range of subject illuminance. It is to be noted that if an ND filter having a low light transmittance is used as the ND filter 104, a subject illuminance which corresponds to a diffraction limit aperture diameter can also be made far higher so that an image pickup operation can be performed over a far wider range of subject illumination.

Furthermore, hysteresis is imparted to the movement of the ND filter 104 in such a way that the subject illuminance P2 which causes the ND filter 104 to move from the retraction position to the insertion position is made higher than the subject illuminance P3 which causes the ND filter 104 to move from the insertion position to the retraction position. Accordingly, it is possible to prevent the ND filter 104 from traveling frequently in the neighborhood of the subject illuminances P2 and P3.

SECOND EMBODIMENT

Figure 7:
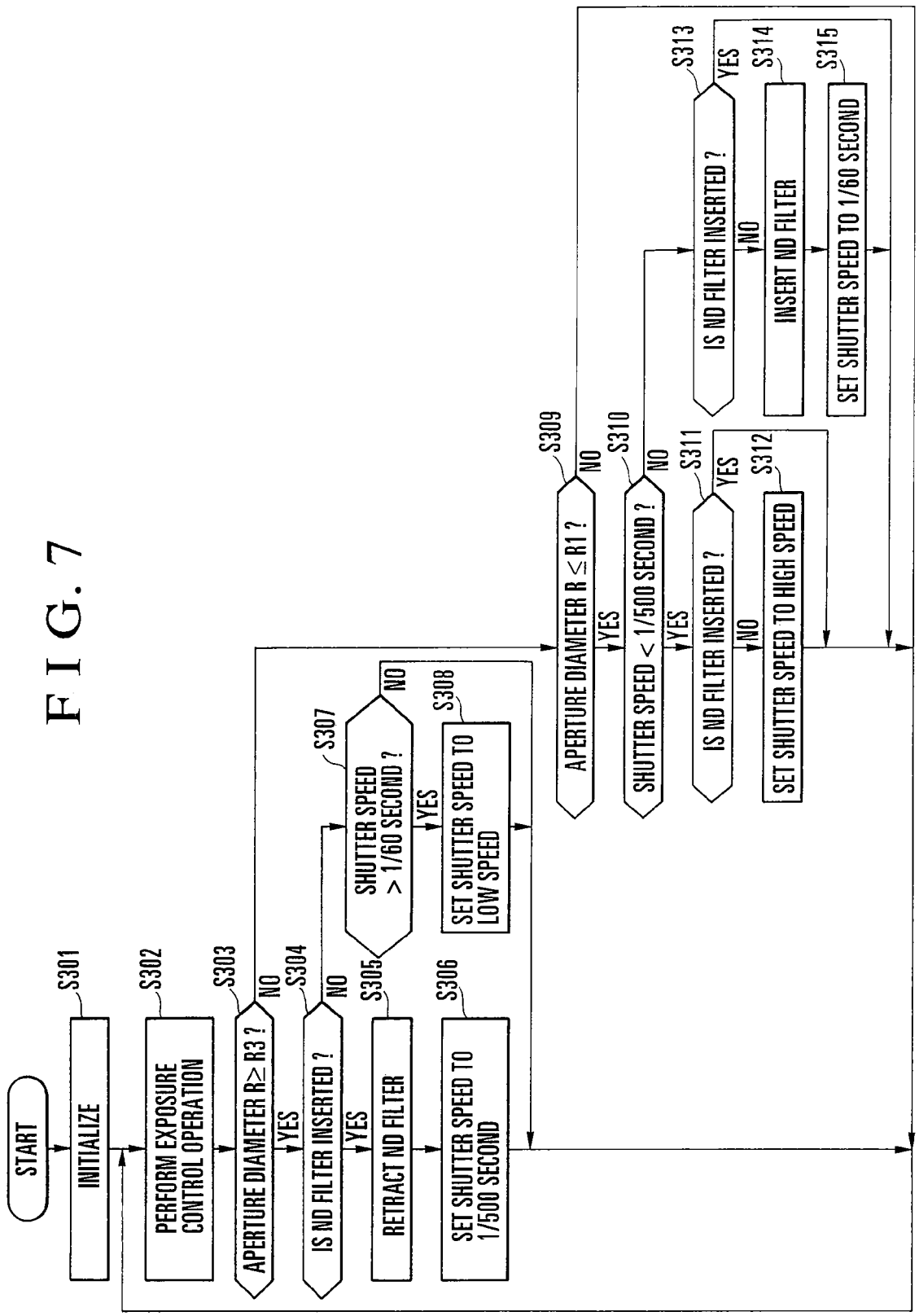
FIG. 7 is a flowchart showing the operation of a light quantity control part of an image pickup apparatus according to a second embodiment of the present invention.

FIG. 7 shows a flowchart of the operation of an image pickup apparatus (a light quantity control part) according to a second embodiment of the present invention. The basic construction of the image pickup apparatus according to the second embodiment is approximately identical to that of the image pickup apparatus according to the first embodiment of the present invention, and in FIG. 7, common constituent elements are denoted by reference numerals identical to those used in the first embodiment.

The second embodiment differs from the first embodiment in that the shutter speed (storage time) of the image pickup element 107 is increased or decreased at the same that the ND filter 104 is inserted or retracted. In addition, in the second embodiment, the light quantity control part 110 reads a shutter speed from the program diagram shown in FIG. 8 in accordance with a luminance signal of a subject image or an aperture value signal, and outputs a shutter speed control signal to the video signal processing circuit 108.

Referring to FIG. 7, first, in Step S301, the light quantity control part 110 initializes its built-in microcontroller and peripheral circuits. Then, in Step S302, the light quantity control part 110 executes feedback control of the diaphragm device 106 so that the level of a luminance signal which is inputted to the light quantity control part 110 from the video signal processing circuit 108 on a field-by-field basis is adjusted to a predetermined luminance level.

Then, in Step S303, the light quantity control part 110 compares the current aperture diameter R supplied from the aperture diameter detecting part 111 with a filter retraction diameter R3 (second predetermined value). If the light quantity control part 110 determines that the current subject illuminance is low and the current aperture diameter R is not less than the filter retraction diameter R3, the process proceeds to Step S304, in which the light quantity control part 110 determines whether the ND filter 104 is inserted in the optical path in which the ND filter 104 completely covers the aperture of the diaphragm device 106. As can be seen from the program diagram shown in FIG. 8, if the current aperture diameter R is not less than the filter retraction diameter R3, the shutter speed is set to 1/60 second (predetermined low-speed shutter time).

If the ND filter 104 is inserted in such optical path, the process proceeds to Step S305, in which the light quantity control part 110 outputs a control signal for retracting the ND filter 104 from the optical path to the ND filter driving part 103. At the same time, in Step S306, the light quantity control part 110 causes the video signal processing circuit 108 to increase the shutter speed of the image pickup element 107 by an amount equivalent to a light quantity which has increased due to the retraction of the ND filter 104, thereby setting the shutter speed to 1/500 second (setting the image pickup time of the image pickup element 107 to a high-speed shutter time). The video signal processing circuit 108 drives the image pickup element driving circuit 109 to set the image pickup element 107 to the input shutter speed.

Incidentally, although the above description has referred to the case in which the shutter speed is increased to 1/500 second, the shutter speed need not necessarily be limited to 1/500 second and may be any other shutter time that can ensure correct exposure.

Figure 8:
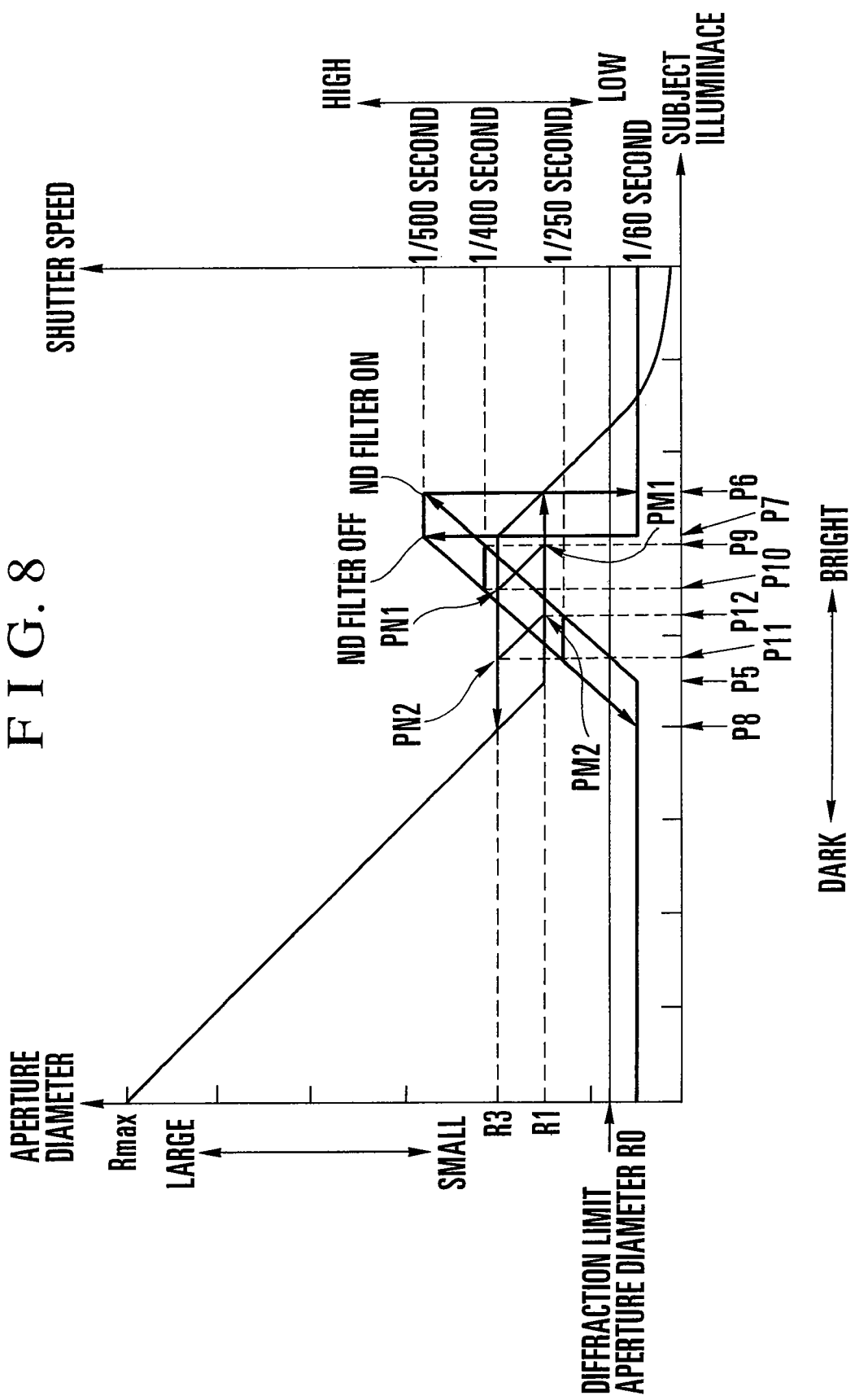
FIG. 8 is a program diagram of the light quantity control part according to the second embodiment of the present invention.

On the other hand, if the light quantity control part 110 determines in Step S304 that the ND filter 104 is retracted from the optical path, i.e., the subject illuminance is lower than the value P8 shown in FIG. 8, the process proceeds to Step S307, in which the light quantity control part 110 determines whether the current shutter speed is higher than 1/60 second.

If the current shutter speed is higher than 1/60 second, the process proceeds to Step S308, in which the light quantity control part 110 executes the control of gradually decreasing the shutter speed according to a gradual lowering in the subject illuminance. In this case, when the subject illuminance is becoming gradually lower from a value P7 to the value P8 as viewed in FIG. 8, the light quantity control part 110 executes the exposure control operation of Step S302 while maintaining the aperture diameter at the filter retraction diameter R3.

On the other hand, if the shutter speed is 1/60 second, the process returns to Step S302, in which the light quantity control part 110 varies the aperture diameter to perform the exposure control operation.

If the light quantity control part 110 determines in Step S303 that the current subject illuminance is high and the current aperture diameter R is smaller than the filter retraction diameter R3, the process proceeds to Step S309, in which the light quantity control part 110 makes a comparison between the current aperture diameter R and the filter insertion diameter R1 (first predetermined value). If the light quantity control part 110 determines that the current subject illuminance is high and the current aperture diameter R is not greater than the filter insertion diameter R1, the process proceeds to Step S310, in which the light quantity control part 110 determines whether the current shutter speed of the image pickup element 107 is lower than 1/500 second (predetermined high-speed shutter time).

If the current shutter speed is lower than 1/500 second, the process proceeds to Step S311, in which the light quantity control part 110 determined whether the ND filter 104 is inserted in the aforesaid optical path. If the ND filter 104 is not inserted in the optical path, the process proceeds to Step S312, in which the light quantity control part 110 gradually increases the shutter speed. In this case, when the subject illuminance is becoming gradually higher from a value P5 to a value P6 as viewed in FIG. 8, the light quantity control part 110 executes the exposure control operation of Step S302 while maintaining the aperture diameter at the filter insertion diameter R1.

On the other hand, if the light quantity control part 110 determines in Step S310 that the current shutter speed of the image pickup element 107 is $1/500$ second, the process proceeds to Step S313, in which the light quantity control part 110 determines whether the ND filter 104 is inserted in the optical path. If the ND filter 104 is retracted from the optical path, the process proceeds to Step S314, in which the light quantity control part 110 outputs a control signal for inserting the ND filter 104 from the optical path to the ND filter driving part 103. At the same time, in Step S315, the light quantity control part 110 executes the control of decreasing the shutter speed of the image pickup element 107 by an amount equivalent to a light quantity which has decreased due to the insertion of the ND filter 104, thereby returning the shutter speed to $1/60$ second.

Incidentally, although the above description has referred to the case in which the shutter speed is decreased to $1/60$ second, the shutter speed need not necessarily be limited to $1/60$ second and may be any other shutter time that can ensure correct exposure.

On the other hand, if the light quantity control part 110 determines in Step S313 that the ND filter 104 is inserted in the optical path, i.e., the subject illuminance is higher than the value P1 shown in FIG. 8, the process returns to Step S302, in which the light quantity control part 110 executes an exposure control operation by varying the aperture diameter.

The aforesaid operation will be described below with reference to FIGS. 8 and 9. When the diaphragm device 106 is in its initial state, if the subject illuminance is low and the aperture diameter of the diaphragm device 106 is the maximum diameter Rmax, the shape of the diaphragm aperture of the diaphragm device 106 is in a fully open state as shown in Part (a) of FIG. 9.

Since the current aperture diameter R remains not less than the filter retraction diameter R3 until the subject illuminance becomes gradually higher and reaches the value P8 shown in FIG. 8, the light quantity control part 110 operates in the order of Steps S302, S303, S304, S307, S309 and S302, and the diaphragm device 106 is gradually closed with the shutter speed being set to $1/60$ second. Thus, the shape of the diaphragm aperture is brought to the state shown in Part (b) of FIG. 9.

As the subject illuminance becomes closer to a value P5 beyond the value P8, the light quantity control part 110 operates in the order of Steps S302, S303, S309 and S302 because the current aperture diameter R is smaller than the filter retraction diameter R3 and larger than the filter insertion diameter R1, and the aperture diameter is gradually reduced to the filter insertion diameter R1 with the shutter speed remaining $1/60$ second.

Until the subject illuminance reaches a value P6 beyond the value P5, the current aperture diameter R remains the filter insertion diameter R1, and the ND filter 104 is located in the retraction position and the shutter speed is lower than $1/500$ second. Accordingly, the light quantity control part 110 operates in the order of Steps S302, S303, S309, S310, S311, S312, and S302, and executes exposure control while maintaining the aperture diameter at the filter insertion diameter R1, whereby the shape of the diaphragm aperture is brought to the state shown in Part (c) of FIG. 9.

When the subject illuminance reaches the value P6 shown in FIG. 8, the shutter speed reaches $1/500$ second, and the light quantity control part 110 operates in the order of Steps S310, S313, S314, S315 and S302 so that the ND filter 104 is inserted into the optical path and the shutter speed is set to $1/60$ second. The shape of the diaphragm aperture is brought to the state shown in Part (c) of FIG. 9.

If the subject illuminance becomes higher to a further extent, the light quantity control part 110 executes the control of closing the diaphragm device 106 to a further extent, and the shape of the aperture diameter assumes the state shown in Part (e) of FIG. 9.

On the other hand, when the diaphragm device 106 is in the state shown in Part (e) of FIG. 9, as the subject illuminance becomes gradually lower, the aperture diameter is gradually enlarged with the shutter speed remaining $1/60$ second because the ND filter 104 is inserted, until the aperture diameter reaches the filter retraction diameter R3 (the subject illuminance reaches a value P7). Thus, the shape of the aperture diameter assumes the state shown in Part (d') of FIG. 9.

If the subject illuminance becomes lower to a further extent and reaches the value P7, the aperture diameter tends to become larger than the filter retraction diameter R3, and the light quantity control part 110 operates in the order of Steps S303, S304, S305, S306 and S302 so that the ND filter 104 is retracted from the optical path and the shutter speed is set to $1/500$ second.

After that, the aperture diameter is maintained at the filter retraction diameter R3 until the subject illuminance reaches the value P8, i.e., the shutter speed decreases to $1/60$ second, so that the shape of the diaphragm aperture is brought to the state shown in Part (c') of FIG. 9.

A control operation to be executed by the light quantity control part 110 when the subject illuminance varies at an intermediate point in the program diagram will be described below. For example, reference will be made to the case in which the subject illuminance increases up to the value P9 shown in FIG. 8 and varies at a point PM1 of FIG. 8 in the decreasing direction. At the point PM1, the aperture diameter is equal to the filter insertion diameter R1 and the shutter speed is $1/400$ second. If the subject illuminance starts decreasing at the point PM1, as the subject illuminance reaches a value P10, the light quantity control part 110 gradually opens the diaphragm device 106 with the shutter speed remaining $1/400$ second, until the aperture diameter reaches the filter retraction diameter R3. Thus, the shutter speed and the aperture diameter are brought to the state indicated at a point PN1. As the subject illuminance further decreases to a value P11, the light quantity control part 110 executes control to make the shutter speed gradually lower toward $1/250$ second with the aperture diameter remaining the filter retraction diameter R3 (a point PN2). If the subject illuminance decreases to a value P11 and again increases, the light quantity control part 110 executes control so that the aperture diameter is reduced from the point PN2 to a point PM2 at which the aperture diameter reaches the filter insertion diameter R1, with the shutter speed remaining $1/250$ second.

According to the above-described image pickup apparatus according to the second embodiment, the ND filter 104 is controlled to move only between the position (insertion position) at which the ND filter 104 completely covers the diaphragm aperture and the position (retraction position) at which the ND filter 104 is completely retracted from the aperture diameter. Accordingly, it is possible to prevent the ND filter 104 from incompletely covering the diaphragm aperture, whereby it is possible to prevent diffraction or shading and improve the quality of picked-up images.

In addition, if the diaphragm aperture becomes smaller and reaches the filter insertion diameter R1 with the ND filter 104 being located in the retraction position and the shutter speed reaches a high speed of $1/500$ second, the ND filter 104 is made to move to the insertion position and the shutter speed is reduced to 1/60 second, whereby it is possible to pick up an image without causing diffraction or the like over a wide range of subject illuminance.

In addition, although in the first embodiment the aperture diameter is greatly varied with insertion or retraction of the ND filter 104, the second embodiment can also eliminate such a large variation in the aperture diameter.

Furthermore, hysteresis is imparted to the movement of the ND filter 104 in such a way that the subject illuminance P6 which causes the ND filter 104 to move from the retraction position to the insertion position is made higher than the subject illuminance P7 which causes the ND filter 104 to move from the insertion position to the retraction position. Accordingly, it is possible to prevent a large variation in shutter speed from occurring frequently in the neighborhood of the subject illuminances P6 and P7.

As is apparent from the above description, it is possible to prevent the conventional problem that shading or diffraction is caused by the difference between a beam of light which passes through a gap portion between a light-attenuating filter and diaphragm blades and a beam of light which passes through a portion of the light-attenuating filter. In addition, it is possible to pickup up a high-quality image over a wider range of high subject illuminance than a conventional range.

It is to be noted that if hysteresis is imparted to the movement of the light-attenuating filter in such a way that a subject illuminance which causes the light-attenuating filter to move from a retraction position to an insertion position is made higher than a subject illuminance which causes the light-attenuating filter to move from the insertion position to the retraction position, it is possible to prevent a variation from occurring frequently in image pickup time or the control of movement of the light-attenuating filter. Accordingly, it is possible to realize an image pickup apparatus which can be easily operated by a user.

A third embodiment of the present invention will be described below.

The third embodiment is intended to provide an image pickup apparatus capable of effecting a smooth ND-filter inserting operation by preventing a transient variation in brightness, which affects the quality of a picked-up image, from occurring due to factors such as an ND-filter inserting operation and the accompanying variation in the aperture size of a diaphragm when an ND filter is to be inserted into an optical path with the aperture of the diaphragm being small.

The third embodiment as well as the structure of a lens unit according to the third embodiment will be described below in order.

Figure 10A:
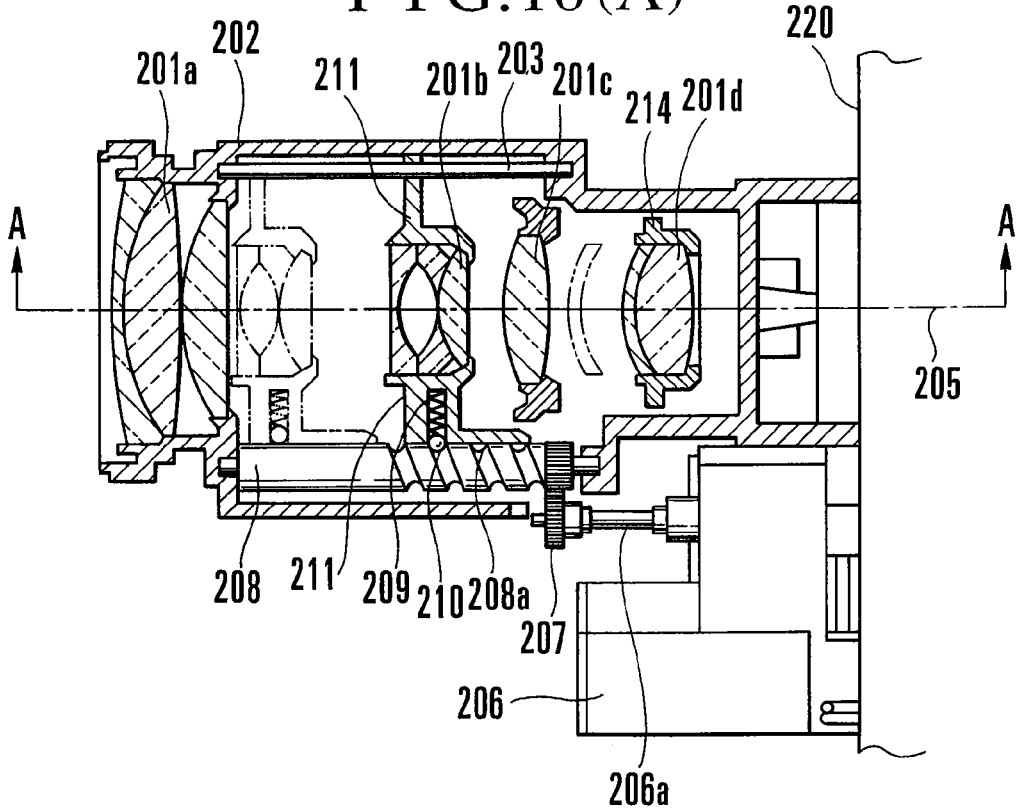
FIGS. 10(A) and 10(B) are views showing the construction of a general zoom lens.
Figure 10B:
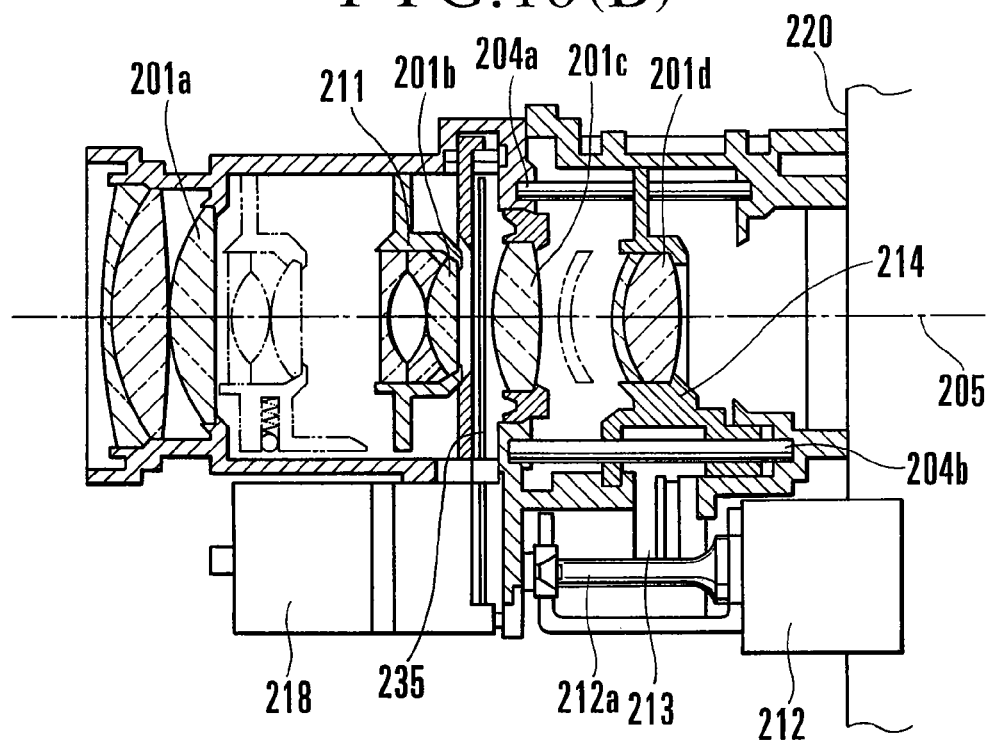

FIGS. 10(A) and 10(B) are sectional views showing the structure of the lens barrel of a zoom lens for use in a video camera or the like, which zoom lens includes four lens groups. FIG. 10(A) shows a longitudinal sectional view, and FIG. 10(B) is a longitudinal sectional view taken along line A-A of FIG. 10(A). In the zoom lens barrel shown in FIGS. 10(A) and 10(B), four lens groups 201a to 201d constitute a photographing zoom lens, and the lens group 201a is a fixed front lens, the lens group 201b is a variator lens group which moves along an optical axis 205 to effect a magnification varying operation, the lens group 201c is a fixed afocal lens, and the lens group 201d is a focusing lens group which moves along the optical axis 205 to maintain the position of a focal plane and effect a focusing operation during a magnification varying operation.

Reference numerals 203, 204a and 204b denote guide bars which are disposed in parallel with the optical axis 205 to guide the movable lens groups while stopping their rollings during their movements.

A DC motor 206 serves as a drive source for moving the variator lens group 201b. The DC motor 206 may also be replaced with a stepping motor.

The variator lens group 201b is held by a holding frame 211. The holding frame 211 has a pressure spring 209 and a ball 210 which is engaged with a screw groove 208a formed around a screw rod 208, by the force of the pressure spring 209. In this arrangement, if the screw rod 208 is rotationally driven by the DC motor 206 through an output shaft 206a and a gear train 207, the holding frame 211 is moved along the guide bar 203 in the direction of the optical axis 205.

In FIG. 10(B), reference numeral 212 denotes a stepping motor. The focusing lens group 201d is held by a holding frame 214. A screw member 213 is integrally secured to a sleeve portion of the holding frame 214, and during the rotation of the stepping motor 212, the screw member 213 can cause the holding frame 214 to move along the guide bars 204a and 204b in the direction of the optical axis 205

In FIG. 10(B), reference numeral 218 denotes an IG meter which drives a diaphragm unit 235, and reference numeral 220 denotes a camera body to which the zoom lens barrel is secured.

Figure 11:
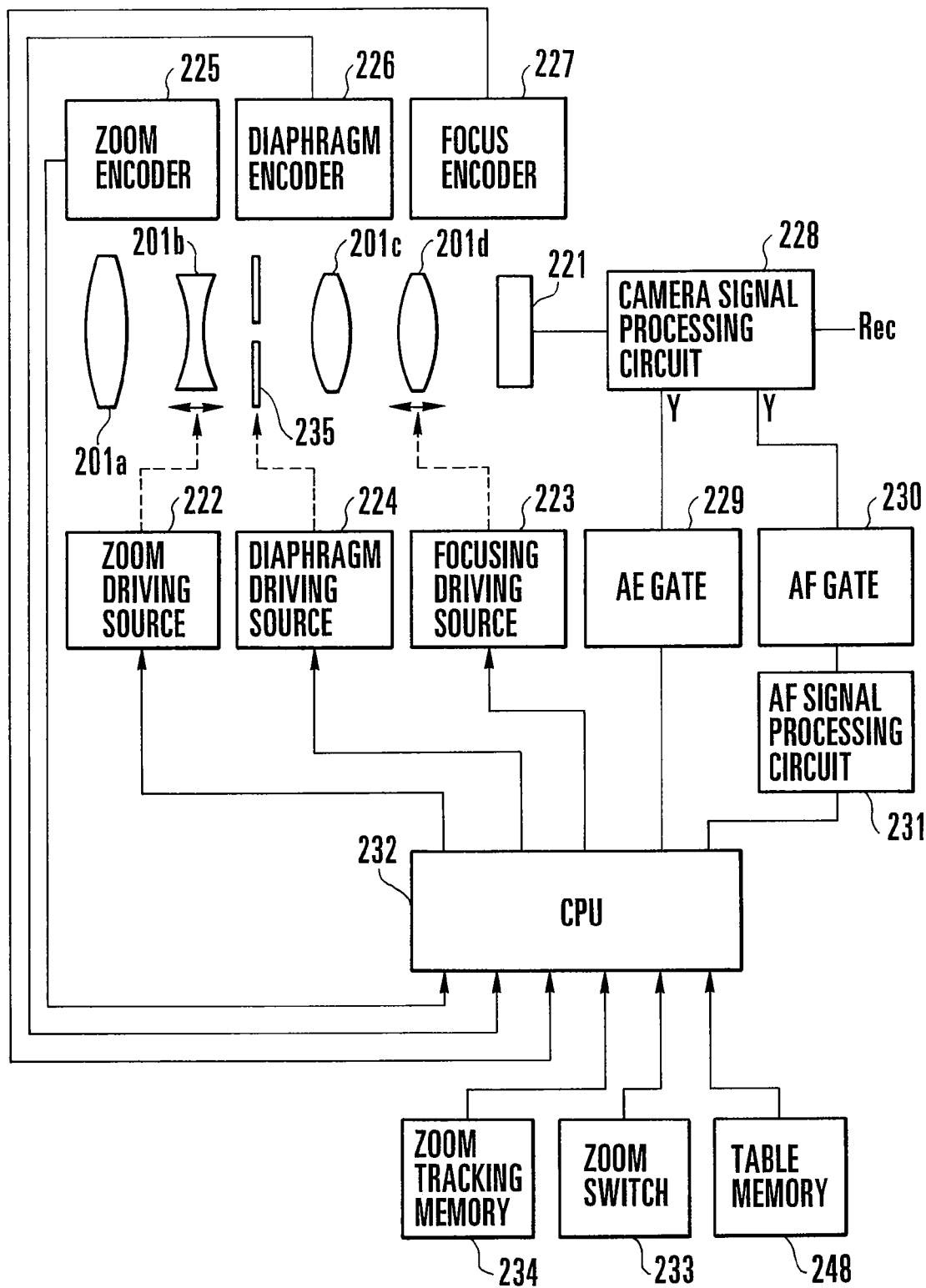
FIG. 11 is a block diagram showing the construction of a video camera body.

The electrical construction of the camera body having the above-described lens barrel structure will be described below. FIG. 11 is a block diagram showing the electrical construction of the camera body.

Referring to FIG. 11, the lens barrel includes four lens groups 201a to 201d, as described above. The lens group 201b constitutes a variator lens group (or variator) for varying magnification, and the lens group 201d constitutes a focusing lens group which effects focusing and also plays the role of a compensator for maintaining an image of a subject located at the same distance, in an in-focus state in an image forming plane during a magnification varying (zooming) operation accompanied by the movement of the variator lens group 201b.

A solid-state image pickup element 221 such as a CCD is disposed in the image forming plane. A drive source 222 for the variator lens group 201b includes the motor 206, a gear train interlocked with the motor 206, the screw rod 208 and the like. A driving source 223 for the focusing lens group 201d is composed of a stepping motor or the like. Incidentally, the zoom driving source 222 may also be composed of a stepping motor similarly to the focusing driving source 223 for the focusing lens group 201d.

Reference numeral 224 denotes a diaphragm driving source, reference numeral 225 denotes a zoom encoder, and reference numeral 227 denotes a focus encoder. If stepping motors are used as the respective driving sources 222 and 223, each of the zoom encoder 225 and the focus encoder 227 is generally arranged to continuously count the number of operation pulses which are inputted to the corresponding one of the stepping motors after the corresponding lens group 201b or 201d starts to move from its origin position to which the lens group 201b or 201d is previously moved at an initial preparatory stage of operation by means of a sensor (not shown). Another method using a potentiometer, a magnetic system or the like is also known.

A diaphragm encoder 226 is, for example, of a known type which detects the relation in rotational position between a rotor and a stator by means of a Hall element disposed in a meter which constitutes the diaphragm driving source 224.

A camera signal processing circuit 228 applies predetermined processing such as amplification and gamma correction to the output of the CCD 221. The contrast signal of a video signal subjected to such predetermined processing passes through an AE gate 229 and an AF gate 230. Specifically, areas from which to extract signals best suited to exposure decision and distance measurement are set within the entire picture by the respective gates 229 and 230. Each of the gates 229 and 230 may be variable in the size of the area from which to extract the corresponding signal, or a plurality of gates may be disposed to constitute either of the gates 229 and 230, but the detailed description of such a gate is herein omitted for the sake of simplicity.

An AF (autofocus) signal processing circuit 231 generates one or a plurality of outputs relative to a high-frequency component of the video signal. Reference numeral 233 denotes a zoom switch, and reference numeral 234 denotes a zoom tracking memory. The zoom tracking memory 234 stores position information indicative of positions to be taken by the focusing lens group 201$d$ according to different subject distances during a magnification varying operation, and the focusing lens group 201$d$ serves to maintain an in-focus state by tracking a variation in an in-focus position which varies according to the magnification varying operation. Incidentally, a memory incorporated in a CPU 232 may be used as the zoom tracking memory 234. The CPU 232 globally controls the entire image pickup system shown in FIG. 11.

For example, if a photographer manipulates the zoom switch 233, the CPU 232 calculates a predetermined positional relation on the basis of the information stored in the zoom tracking memory 234, and drives and controls the zoom driving source 222 and the focusing driving source 223 so that the deviation of the output of the zoom encoder 225 from a target position to be taken by the variator lens group 201$b$ and the deviation of the output of the focus encoder 227 from a target position to be taken by the focusing lens group 201$d$ are made values "0s", respectively, so as to retain the predetermined positional relation.

In an autofocus operation, the CPU 232 drives and controls the focusing driving source 223 so that the output of the AF signal processing circuit 231 shows a peak.

Furthermore, to obtain a correct exposure, the CPU 232 drives and controls the diaphragm driving source 224 so that the deviation of an average value of Y-signal outputs passing through the AE gate 229 from a predetermined value is made a value "0" so that the average value of Y-signal outputs passing through the AE gate 229 becomes equal to the predetermined value.

In an image pickup apparatus using the above-described type of zoom lens, its diaphragm has approximately two to six diaphragm blades to be driven by an IG meter so that the aperture diameter of the diaphragm is controlled by the IG meter.

It is well known that during the control of the aperture diameter, if the aperture diameter of the diaphragm becomes small, the image forming performance (MTF) of the zoom lens deteriorates due to a so-called small-aperture diffraction phenomenon.

As described previously, to obtain correct exposure, such an image pickup system is arranged to control the aperture diameter of the diaphragm aperture so that a video signal extracted from a predetermined area of an image pickup element such as a CCD is made to have a predetermined value.

For this reason, if a subject is bright, the aperture diameter easily becomes small, so that the above-described image deterioration occurs.

To solve this problem, the following means (A), (B) and (C) have heretofore been practised selectively or in combination.

(A) If overexposure cannot yet be controlled even when a diaphragm aperture is reduced to a diameter with which an image deterioration due to small-aperture diffraction starts occurring, the shutter speed of a CCD is increased (the charge storage time of the CCD is shortened).

(B) An ND filter or filters are cemented to one or a plurality of diaphragm blades which constitute a diaphragm, and if the aperture of the diaphragm is smaller than, for example, F5.6, the ND filter or filters cover the entire aperture diameter of the diaphragm.

As compared with a diaphragm in which no ND filters are cemented to diaphragm blades, the brightness of a subject image that corresponds to an aperture value which causes small-aperture diffraction is shifted to a higher side by three or four steps according to the density of the ND filter or filters used.

(C) Although an ND filter is not cemented to a diaphragm blade, an ND-filter driving mechanism which is capable of inserting or retracting an ND filter into or from an optical path is provided in an image pickup apparatus. For example, when the ND filter is not inserted in the optical path, if overexposure cannot yet be controlled even if the aperture of a diaphragm is reduced to a diameter which causes small-aperture diffraction, the image pickup apparatus warns a photographer to insert the ND filter, by using a display such as an in-viewfinder display. If the photographer inserts the ND filter in accordance with the display, an image deterioration due to small-aperture diffraction can be avoided.

However, the above-described countermeasures (A), (B) and (C) have the following disadvantages.

In the countermeasure (A), if the shutter speed, i.e., the storage time of the image pickup element, is $\frac{1}{250}$ second or $\frac{1}{500}$ second or higher, an image of a moving subject is not recorded as a smoothly moving subject, and the image thus recorded is reproduced like a series of still images which are continuously reproduced, i.e., a visually unnatural moving image is recorded and reproduced. For this reason, in general, many image pickup systems based on the countermeasure (A) are arranged so that the shutter speed can be automatically increased to a maximum of approximately $\frac{1}{250}$ second.

In the countermeasure (B), if an image pickup system using a diaphragm having six diaphragm blades brings a subject into focus particularly when the diaphragm is set to an aperture between an F value at which the ND filter covers the entire aperture diameter and a fully open aperture, a bright spot present in the background of the in-focus subject will be viewed as, for example, a hexagonal defocused pattern due to the six diaphragm blades, but part of the pattern will be covered by the ND filter. Particularly if a photographer has a creative intention which takes into account the defocused state of a background, he/she will not be able to obtain a desired defocus effect which satisfies the creative intention.

In the countermeasure (C), it is possible to compensate for the above-described disadvantage of the countermeasure (B), but at the moment when the photographer inserts the ND filter, the contrast component of a video signal obtained from a CCD instantaneously becomes low, so that a time delay is needed to obtain a correct exposure. In other words, when the ND filter is inserted or retracted, the continuity of photography is lost for a predetermined time.

The third embodiment is intended to solve the above-described problems.

To solve the above-described problems, in accordance with the third embodiment, there is provided a light quantity adjusting device which comprises first light quantity adjusting means for adjusting a light quantity which is transmitted through a lens, by varying an aperture diameter, second light quantity adjusting means for adjusting a light quantity which is transmitted through the lens, by a method different from the first light quantity adjusting means, and control means for controlling, when varying a transmitted light quantity which is being transmitted through the lens, the first light quantity adjusting means and the second light quantity adjusting means so that the first light quantity adjusting means and the second light quantity adjusting means provide a target light quantity by operating at the same time so that a direction of variation in the transmitted light quantity due to the first light quantity adjusting means and a direction of variation in the transmitted light quantity due to the second light quantity adjusting means are made opposite to each other.

THIRD EMBODIMENT

Figure 12:
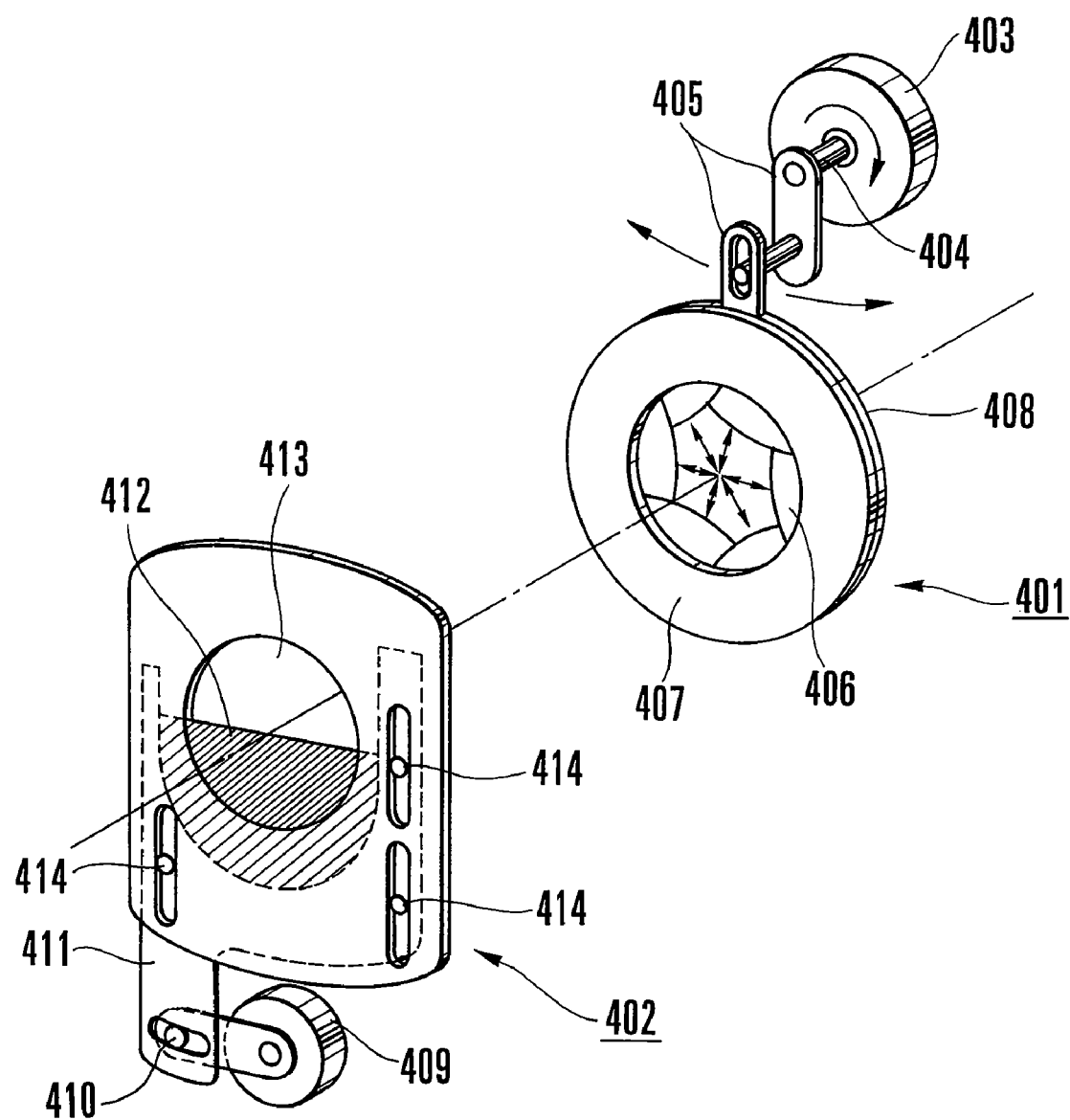
FIG. 12 is a perspective view showing the construction of a light quantity adjusting device according to a third embodiment of the present invention.

FIG. 12 is a view showing two light quantity adjusting means which is suitable for carrying out the third embodiment of the present invention.

Referring to FIG. 12, a diagram device 401 includes constituent components 403 to 407. The constituent component 403 is a diaphragm driving meter, the constituent component 404 is an output shaft of the diaphragm driving meter 403, and the constituent component 405 is an interlocking portion which interlocks the diaphragm driving meter 403 and a windmill component which turns about an optical axis in interlocking relation to the rotation of the output shaft 404. This windmill component has blades and an interlocking pin (none of which is shown) and is arranged to move the blades by the turning of a windmill.

The constituent components 406 are blades. The example shown in FIG. 6 uses six blades so that a hexagonal aperture can be formed, but the number of blades is not limited to six.

As is well known, a diaphragm device of the type in which no windmill is used and two blades are directly hooked on an interlocking pin which extends from the output shaft of a meter is widely used particularly in domestic video cameras.

A base plate 408 has both the rotational axis of the blades 406 and the rotational axis of the windmill. The blades 406 are held by a component 407.

An ND-filter driving device 402 includes a meter 409, an interlocking pin 410 which interlocks with the output shaft of the meter 409, an interlocking plate 411, an ND filter part 412 cemented to the interlocking plate 411, an aperture 413, and guides 414 for the interlocking plate 411 each of which is made of a slot formed in a plate and a pin formed on a base plate. In this construction, the ND filter part 412 is arranged to move into and out of an optical path in interlocking relation to the meter 409. Needless to say, although the ND-filter driving device 402 has a structure which makes the interlocking plate 411 slide, it is also possible to adopt another structure such as a structure in which a plate moves into and out of an optical path by turning in interlocking relation to the rotation of a meter.

Figure 13:
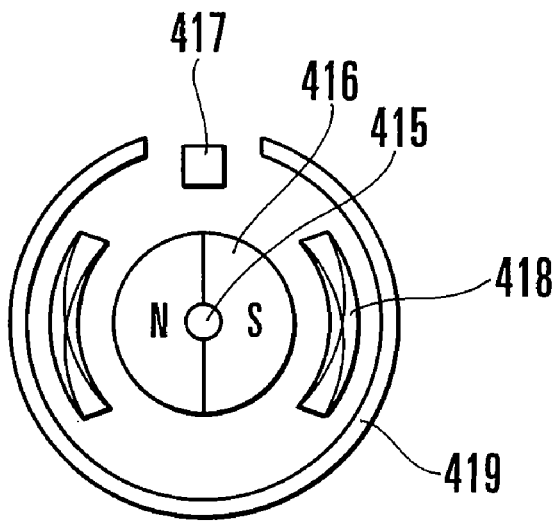
FIG. 13 is a schematic view of the construction of a meter which serves as detecting means for detecting the moving quantity of light quantity adjusting means.

FIG. 13 shows the construction of Hall detecting means which is provided in the meter 409 as detecting means for detecting the state of the light quantity adjusting means. The Hall detecting means shown in FIG. 13 includes a rotational axis 415 of the meter 409, a magnet (rotor) 416, a Hall element 417, a coil 418 and a case (yoke) 419.

Figure 14:
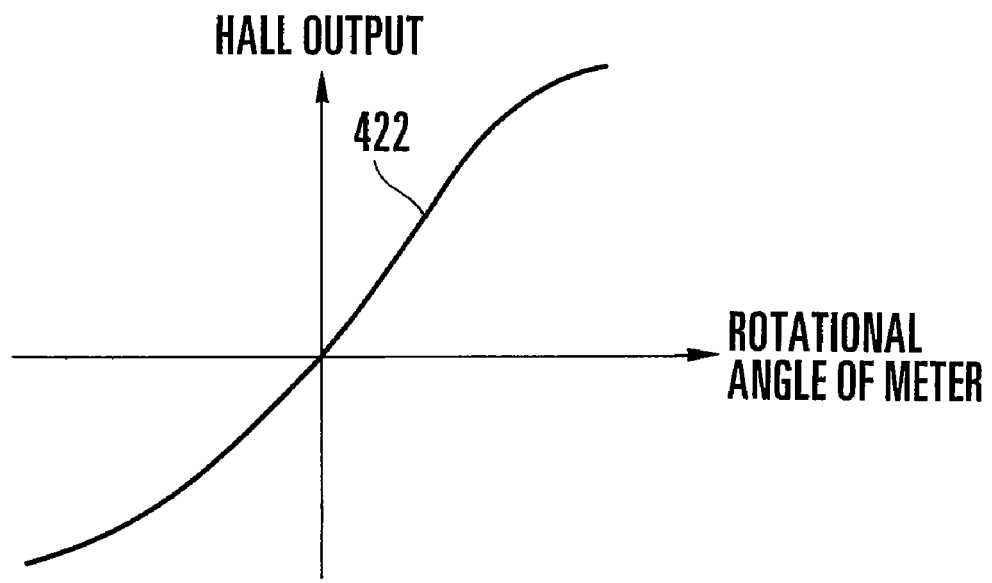
FIG. 14 is a view showing the detection characteristic of the meter shown in FIG. 13.

If current flows through the coil 418, the current flows perpendicularly to the magnetic field of the coil 418 to produce a force, thereby rotating the rotor 416. The Hall element 417 is disposed in the vicinity of the boundary between opposite poles of the rotor 416 which is magnetized in a polarized manner. For this reason, as shown in FIG. 14, since the Hall element 417 shows an output characteristic 422 with respect to the rotational angle of the meter 409, an approximately linear variation in the output of the Hall element 417 can be obtained during the rotation of the meter 409. In FIG. 14, the horizontal axis represents the meter-rotation angle, while the vertical axis represents the Hall output of the Hall element 417.

Figure 15:
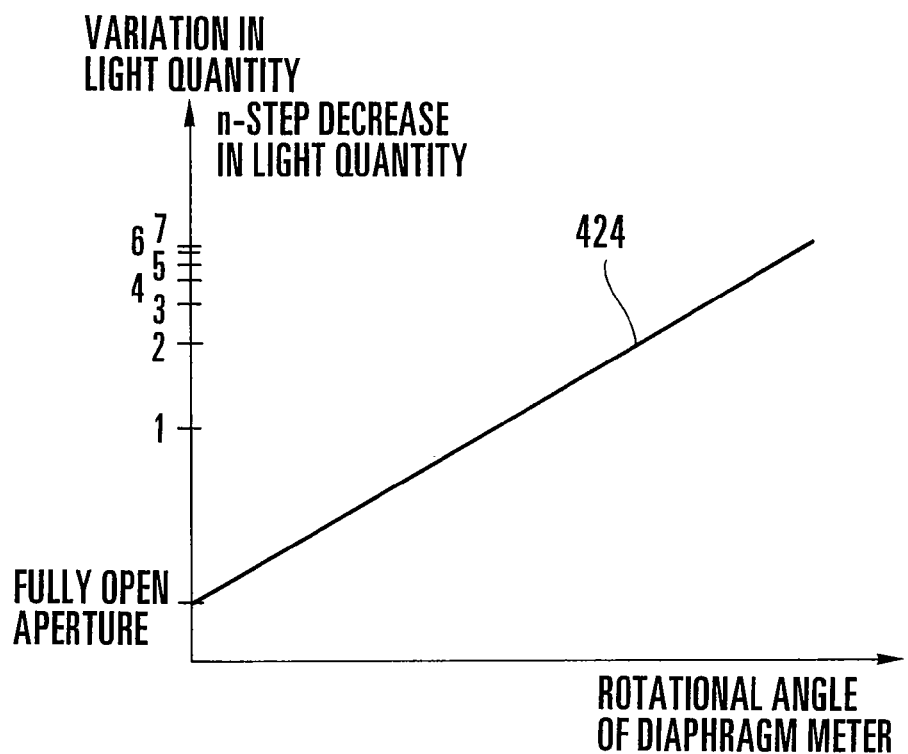
FIG. 15 is a view showing a relation between light quantity and the rotational angle of a meter of a diaphragm device shown in FIG. 12.

FIG. 15 is a view showing a relation 424 between a variation in light quantity and the meter-rotation angle of the diagram device 401 shown in FIG. 12. In FIG. 15, the horizontal and vertical axes represent the rotational angle and the light quantity, respectively, and the numbers "1" to "7" of the vertical axis represent that the light quantity is decreased by n steps (n=1 to 7).

For example, if the fully open aperture value of the diagram device 401 is F1.4, the numbers "1", "2" and "3" represent F2, F2.8 and F4, respectively. In a polygonal diaphragm used in a domestic video camera, as shown in FIG. 15, as the aperture of the diaphragm becomes smaller, a larger variation in light quantity tends to occur for a smaller rotational angle, depending on the shape of the interlocking portion between the blades and the pin.

Figure 16:
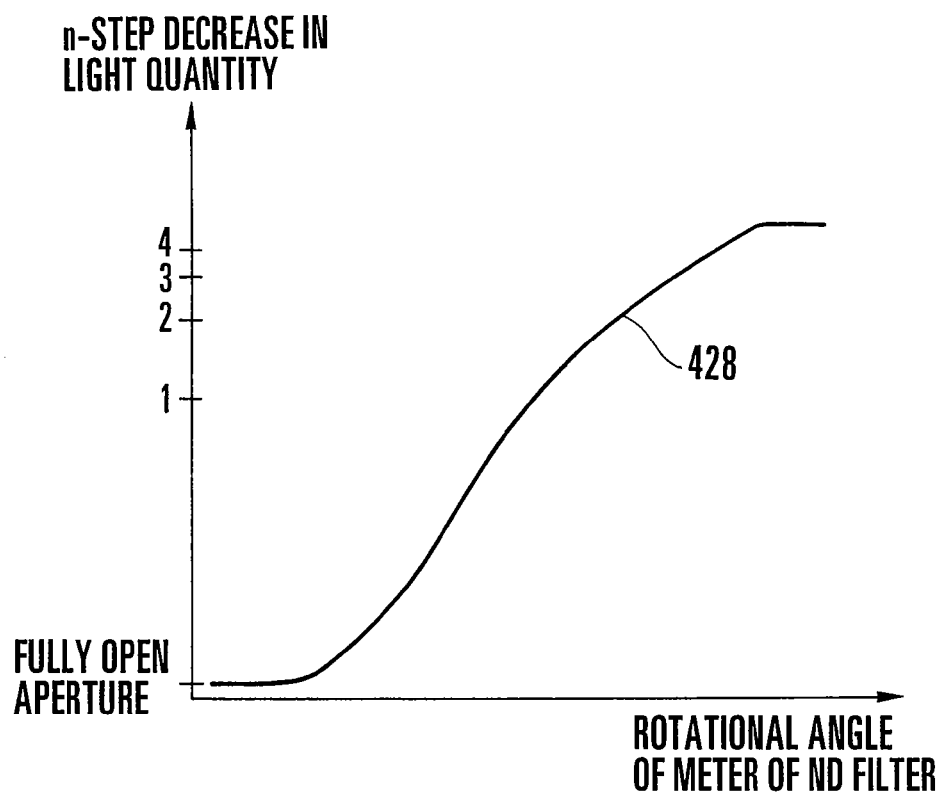
FIG. 16 is a view showing a relation between a variation in light quantity and the rotational angle of a meter of the ND-filter driving device shown in FIG. 12.

FIG. 16 is a view showing a relation 428 between a variation in light quantity and the meter-rotation angle of the ND-filter driving device 402 shown in FIG. 12. In the example shown in FIG. 16, the aperture is fully open, and the density of the ND filter is selected so that the light quantity transmitted through the same varies in the range of four steps.

Figure 17:
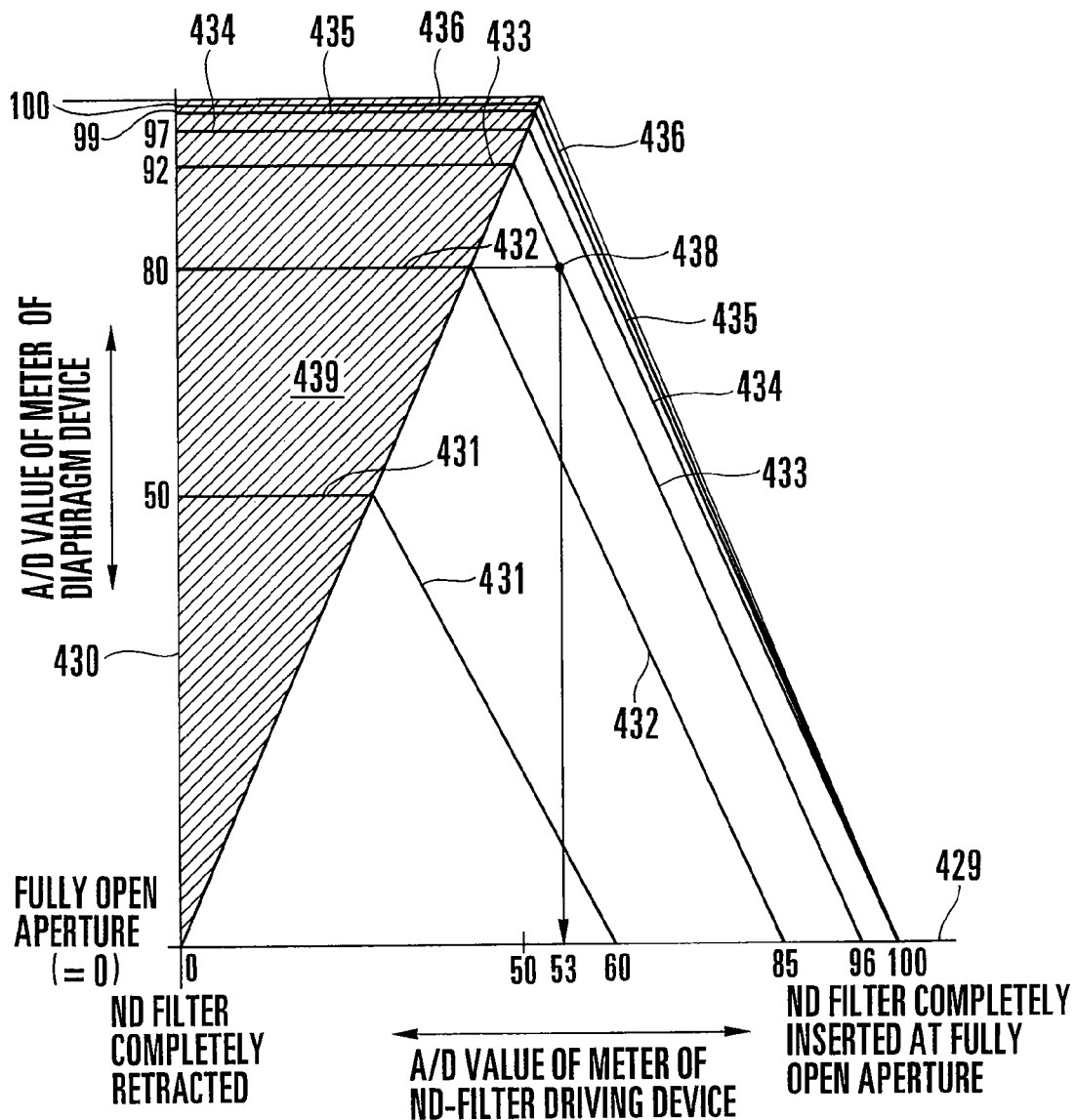
FIG. 17 is a characteristic chart showing a relation between the rotational angles of the respective meters of the ND-filter driving device and the diaphragm device in terms of the AD value of a Hall element.

In FIG. 17, a horizontal axis 429 represents the A/D value of the Hall output of the ND-filter driving device 402 shown in FIG. 16, and a vertical axis 430 represents the A/D value of the Hall output of the meter 409 of the diagram device 401 shown in FIG. 15, and curves 431 to 436 represent relations between the two A/D values (aperture and ND filter) each of which provides the same transmitted light quantity. Incidentally, if a variable density ND filter is used, the voltage applied to this variable density ND filter may be plotted against the horizontal axis. The curve 431 represents an interlocking relation which achieves a transmitted light quantity equivalent to an aperture which is reduced by one step from a fully open aperture. The curve 432 represents an interlocking relation which achieves a transmitted light quantity which is reduced by two steps from the fully open aperture. The other curves 434 to 436 represent similar interlocking relations. The rotational angle of the meter of the ND-filter driving device is A/D-converted into values "1" to "100" by control means, and, as viewed along the horizontal axis, "0" represents the state in which the ND filter is completely retracted from the optical path and "100" represents the state in which the ND filter is completely inserted in the optical path. Similarly, as viewed along the vertical axis, "0" represents the fully open aperture and "100" represents an aperture reduced by six steps from the fully open aperture.

For example, a position (a point 438) defined by the number "53" on the horizontal axis and the number "80" on the vertical axis is a point present on the curve 433 and equivalent to an aperture which is reduced by three steps from the fully open aperture, and a similar transmitted light quantity can be obtained even if the ND filter is completely retracted from the optical path and the aperture of the diaphragm device is reduced by three steps from the fully open aperture, or even if the aperture of the diaphragm device is fully open and the ND filter is inserted into the optical path by an amount equivalent to three steps. Incidentally, in FIG. 17, a shaded area 439 of each of the curves in which the A/D value of the meter of the diaphragm device is constant is an area in which even if the meter of the ND filter is operated, the ND filter does not overlap the aperture.

Figure 18:
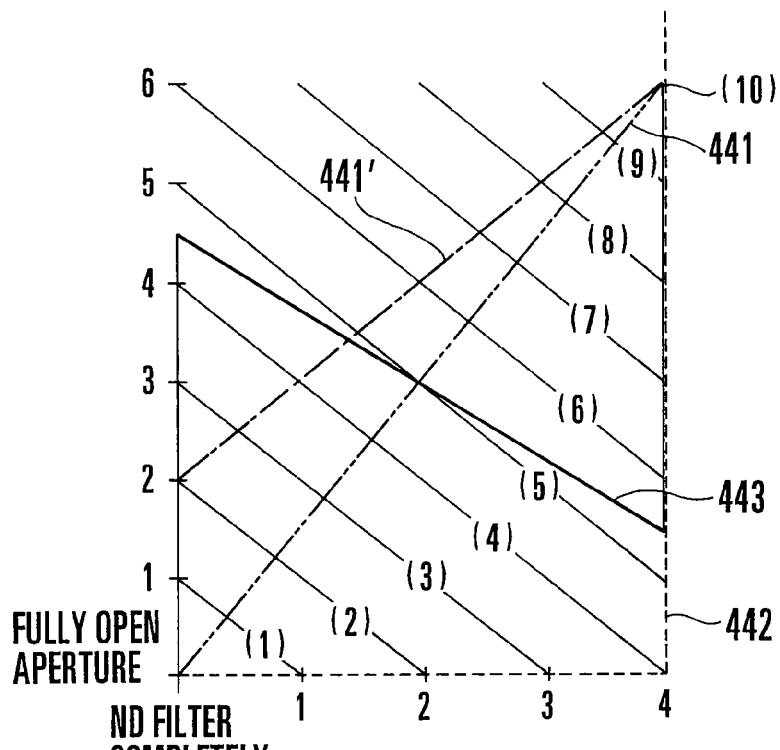
FIG. 18 is a simplified view of the characteristics shown in FIG. 17.

FIG. 18 is a simplified view in which a constant transmitted light quantity curve is shown as a linear line having an inclination of −45° for ease of understanding of FIG. 17.

In FIG. 18, the vertical axis represents that the aperture is reduced by n steps from the fully open aperture, and the horizontal axis represents numerical values relative to the states of the respective apertures, which numerical values represent that the ND filter reduces the light quantity by n (0-4) steps from the light quantity obtained when the ND filter is not inserted.

Accordingly, an actual meter-rotation angle differs for each position on the horizontal axis, depending on the value on the vertical axis.

In FIG. 18, a two-dot chain line 441 represents a relation between the two light quantity adjusting means according to the third embodiment of the present invention during, for example, a mode for an average photographic scene (a mode generally called "automatic mode" or "green mode").

In FIG. 18, lines (1) to (10) represent total incident light quantities determined by the aperture and the ND filter, and show an example capable of providing a light quantity which is reduced by a maximum of ten steps from the light quantity of the fully open aperture.

In other words, a light quantity which is reduced by n/2 steps from the fully open aperture is obtained by being reduced by n/2 steps by the diaphragm and by n/2 steps by the ND filter.

The control means stores in its memory the above-described relation in the form of a combination map of A/D converted values to be taken by the above-described two meters of the diaphragm and the ND filter, and obtains an optimum exposure according to a variation in the illuminance of a subject by making adjustment of light quantity while approximately maintaining the characteristic shown by the two-dot chain line in FIG. 18, in accordance with the stored relation.

According to this characteristic, in the case of the fully open aperture, the ND filter does not overlap the aperture and a natural defocus effect is obtained, and as a subject becomes brighter with respect to the fully open aperture, the diaphragm is gradually closed. Accordingly, as the subject becomes brighter, a depth of field becomes deeper, whereby it is possible to reduce visual unnaturalness and it is possible to avoid small-aperture diffraction over a wide range of subject illuminance.

This control may also be applied to an arrangement in which light quantity control which gives preference to the aforesaid defocus effect is executed by using only diaphragm means in the aperture range between the fully open aperture and an approximately two-step reduced aperture, and in an aperture range exceeding the approximately two-step reduced aperture, light quantity is executed by operating both the diaphragm and the ND filter. In this case, as shown by a dot-dashed line in FIG. 18, a characteristic curve may be set as a characteristic curve 441' which rises along the vertical axis from the fully open aperture to the two-step reduced aperture and obliquely connects the two-step reduced aperture and the position indicated at (10) which corresponds to an aperture reduced by ten steps from the fully open aperture.

Figure 20:
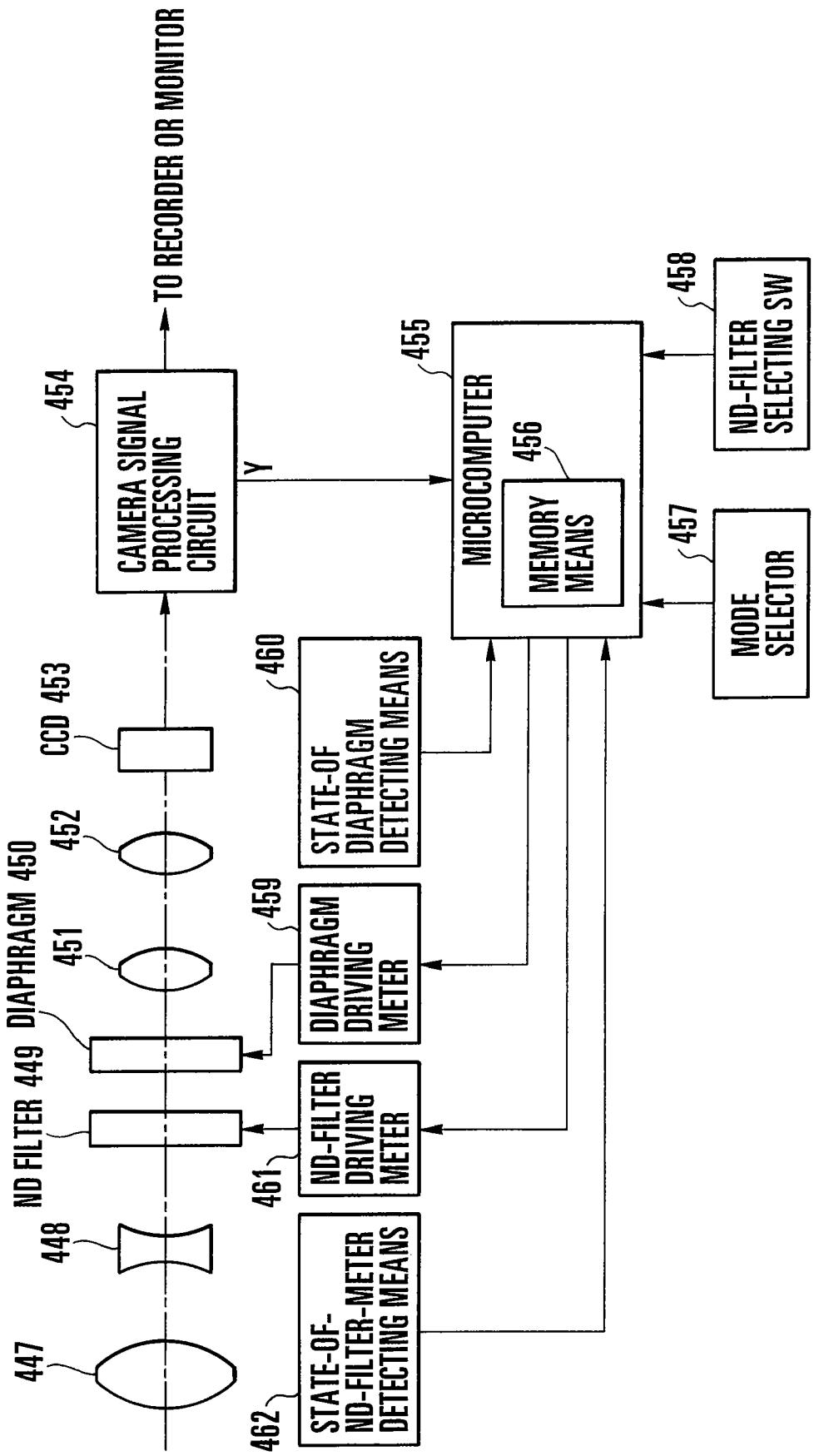
FIG. 20 is a block diagram showing the construction of a video camera body to which the fourth and fifth embodiments of the present invention are applied.

FIG. 20 is a block diagram showing the construction of an image pickup apparatus which is suitable for carrying out the third embodiment of the present invention. In the image pickup apparatus shown in FIG. 20, first to fourth lens groups 447, 448, 451 and 452 constitute a zoom lens. The second lens group 448 serves as a variator, and the fourth lens group 452 serves as a focusing compensator group. Reference numerals 449 and 450 denote an ND filter device and a diaphragm device, respectively.

The shown image pickup apparatus also includes a CCD 445, a camera signal processing circuit 454, a microcomputer 455 which serves as control means, and memory means 456 which is provided in the microcomputer 455. The relation between two light quantity adjusting means, which is described previously with reference to FIG. 18, is stored in the memory means 456.

A luminance signal component of the output from the camera signal processing circuit 454 is read into the microcomputer 455. Incidentally, the microcomputer 455 reads only a luminance signal extracted from a predetermined area of a picture via a gate (not shown).

The shown image pickup apparatus also includes a mode selector 457 for selecting a photographing mode (program mode), a manual ND filter selecting switch 458, a diaphragm driving meter 459, a detecting means 460 for detecting the state of diaphragm means, an ND-filter driving meter 461 (or variable density driving means for driving a variable density ND filter), and detecting means 462 for detecting the state of the rotational angle of an ND meter (or means for detecting the density of a variable density ND filter).

In operation, if a photographing mode called a green mode, an automatic mode or the like is selected, the microcomputer 455 reads from the memory means 456 the relation shown by the two-dot chain line in FIG. 18, and operates the two light quantity adjusting means while maintaining the state of interlocking so that this relation can be maintained. In this case, needless to say, in a manner similar to a conventional manner, a correct exposure can be obtained by making adjustment of light quantity so that the average value of luminance signal components extracted from a predetermined area of the CCD becomes equal to a target value.

FOURTH EMBODIMENT

A fourth embodiment is intended to provide a control method capable of preventing an ND filter from overlapping an aperture, as completely as possible and increasing the probability that a natural defocus effect is obtained even if the ND filter is not manually switched over.

This control method will be described below with reference to a characteristic curve 443 shown by a solid line in FIG. 18. In the aperture range between a fully open aperture and a 4.5-step reduced aperture, adjustment of light quantity is made with only a diaphragm device, and in the aperture range between the 4.5-step reduced aperture and a 5.5-step reduced aperture, both the diaphragm device and the ND filter are interlockingly driven to make adjustment of light quantity. In the subsequent aperture range following the 5.5-step reduced aperture, only the diaphragm device is made to execute control of light quantity with the ND filter being completely inserted, thereby reducing light quantity.

Specifically, only in the one-step aperture range between the 4.5-step reduced aperture and the 5.5-step reduced aperture, control of light quantity is executed with the ND filter overlapping the aperture. Of course, this setting is for the purpose of illustration only and the aperture range is not limited to one step.

The feature of this arrangement is such that, during this interlocking period, the characteristic curve 443 exhibits a minus inclination as shown in FIG. 18. This minus inclination shows that the diaphragm device alone drives the diaphragm in the aperture-opening direction thereof while a light quantity adjusting device is operating so as to decrease light quantity from the 4.5-step reduced aperture to the 5.5-step reduced aperture.

It may be considered that this relation is selected according to the result of a mode selection which is made at the mode selector 457 shown in the block diagram of FIG. 20. Incidentally, in the case of a fully open aperture priority mode, it may be considered to adopt a control method of, as shown by a dashed line 442 in FIG. 18, reducing the aperture by four steps from the fully open aperture by using only the ND filter with the diaphragm device remaining fully open, and subsequently executing control of light quantity by using only the diaphragm device while keeping constant the light transmittance of the ND filter.

FIFTH EMBODIMENT

When an ND filter is to be inserted or retracted by a conventional manual operation, for example, the ND filter is first inserted, but since the entire picture instantaneously becomes dark at this time, a diaphragm device is driven in the aperture opening direction to correct the darkness, thereby recovering a correct exposure.

In a fifth embodiment, this problem is solved in the following manner. As shown by characteristic curves 444 and 445 in FIG. 19, during the insertion and retraction of the ND filter, the states of two light quantity adjusting means, i.e., the diaphragm device and the ND filter, are varied with a predetermined relation therebetween being maintained, thereby completing the insertion and retraction of the ND filter without the need to substantially vary the light quantity on the CCD.

Figure 19:
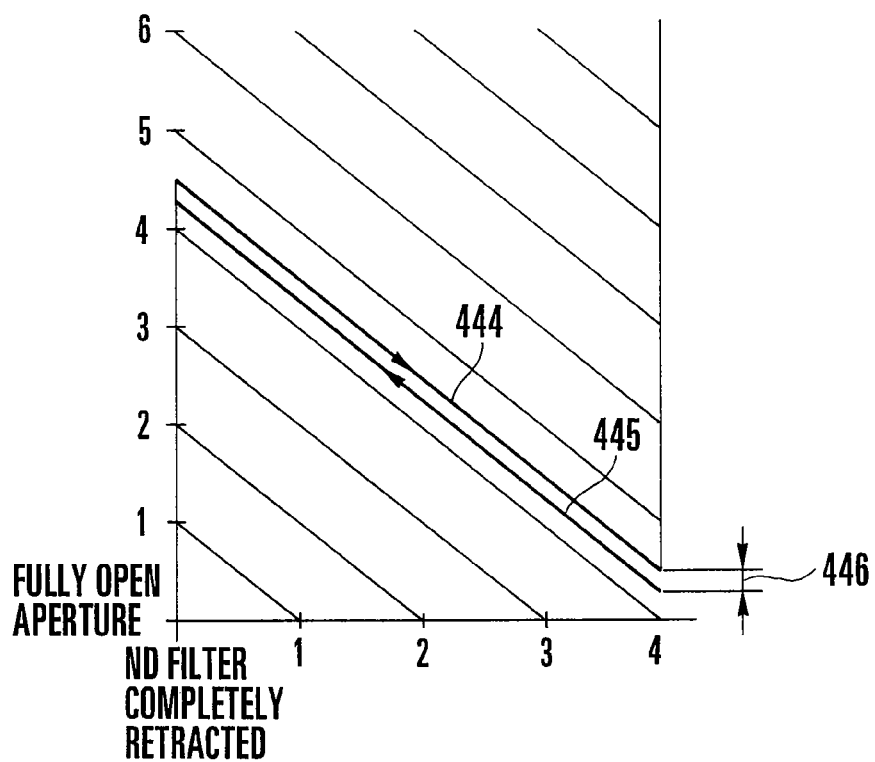
FIG. 19 is a view aiding in describing fourth and fifth embodiments of the present invention.

In FIG. 19, a difference 446 represents hysteresis, and may be set to an optimum value in terms of the density of the ND filter and so that the insertion and retraction of the ND filter are prevented from frequently occurring due to hunting or the like.

In this case, the microcomputer 455 executes control in response to the manipulation of the switch 458 shown in the block diagram of FIG. 20, and achieves the state of the ND filter indicated by a photographer, while operating the two light quantity adjusting means at the same time.

Incidentally, during an arbitrary aperture state, if the photographer indicates insertion and retraction of the ND filter through external manipulating means, it is possible to switch over the ND filter between the inserted state and retracted state thereof while maintaining the continuity of photography, by controlling the ND filter in accordance with information which is previously prepared by storing the interlocking relation between the diaphragm device and the ND filter which can obtain a transmitted light quantity identical to that obtainable in each of the states shown in FIG. 17.

According to the above-described third to fifth embodiments, the state of each of the light quantity adjusting means, for example, the state of the aperture diameter of the diaphragm device, the state of overlapping of the ND filter in the ND-filter driving device, or the state of density of a variable density ND filter, can be detected, for example, from the result of detection of the state of the rotational angle of the rotor of the Hall element provided in the driving meter in the diaphragm device or the ND-filter driving device, or from the number of driving steps counted from a reference position if these devices are driven by stepping motors, or from the result obtained by directly measuring a transmitted light quantity by means of a light-emitting element and a light-receiving element which are provided on the opposite sides of a variable density ND filter, or from the value of voltage applied to transparent electrodes of the variable density ND filter. The thus-obtained information is inputted to the control means. In addition, the control means previously stores one or a plurality of combinations of the states of the aforesaid means, and executes control of light quantity on the basis of such combination.

More specifically, during the state of a fully open aperture and a comparatively open aperture, the control means uses only the diaphragm device to make adjustment of light quantity so as not to impair a defocus effect, and after that, if a subject becomes brighter, the control means gradually inserts the ND filter into the optical path (or gradually increases the density of the variable density ND filter) before the deterioration of a subject image is caused by a diffraction phenomenon due to a small aperture. Although, in a conventional image pickup apparatus, the diaphragm device is driven in order to optimize a variation in light quantity in an image-forming plane due to the gradual insertion of the ND filter (a variation in the density of the variable density ND filter), the third to fifth embodiments are capable of achieving smooth control of light quantity by controlling the aperture diameter of the diaphragm not in accordance with feedback from the light quantity in the image-forming plane but in a predetermined relation to the state of insertion of the ND filter into the optical path (or the state of density of the variable density ND filter).

In addition, even during the insertion and retraction of the ND filter by a manual operation similar to a conventional one, since a combination or combinations of the states of the two light quantity adjusting means are determined so that a constant transmitted light quantity can be maintained, it is possible to manually complete the insertion and retraction of the ND filter with the light quantity in the image-forming plane being kept approximately constant. Accordingly, even if such a manual manipulation is performed, correct exposure can be maintained.

In addition, if the image pickup apparatus, such as a camera, is in, for example, an automatic mode which is arranged to automatically obtain average images from various photographic scenes, there is provided an aperture range in which either one of the two light quantity adjusting means operates between a low-illuminance subject and a bright subject, and if both of the two light quantity adjusting means operate at the same time, the directions of their movements are made the same. Specifically, if light quantity is to be decreased, the ND filter is driven in the direction in which the ND filter is inserted into the optical path (or the variable density ND filter is driven in the direction in which the density of the variable density ND filter increases), while the diaphragm device is driven in the direction in which its aperture becomes smaller. During another mode such as a portrait mode, in order to give preference to a defocus effect, while the diaphragm device is being opened, the ND filter is inserted into the optical path to complete shifting the state of the ND filter within the range of a small variation in subject illuminance so that the ND filter can avoid as completely as possible the state of partly covering the aperture diameter. Accordingly, it is possible to achieve light-quantity control suited to the intention of each selected mode of the camera.

As described above, the image pickup apparatus has, separately from a so-called diaphragm device for varying an aperture diameter, the second light quantity adjusting means for varying so-called T number, such as an ND filter which can be inserted into or retracted from an optical path or a variable density ND filter, and control means controls the two light quantity adjusting means in a predetermined relation, thereby solving the conventional various problems. Specific advantages are as follows.

(i) Transmitted light quantity adjusting means such as the ND filter can be continuously and automatically inserted into the optical path (or the variable density ND filter can be continuously and automatically increased in density) according to a variation in the brightness of a subject so that the occurrence of small-aperture diffraction can be prevented with a defocus effect being ensured on the side of a fully open aperture.

(ii) While the ND filter is being inserted (or the variable density ND filter is being increased in density), the ND filter (or the variable density ND filter) is operated in accordance with a predetermined relation between the extent of insertion (or the extent of increase in density) and the aperture diameter of a diaphragm, whereby it is possible to continue without interruption an optimum state of exposure which would have been interrupted instantaneously or for a few seconds in the case of the insertion and retraction of the ND filter by a conventional manual operation of a photographer.

(iii) If the relation between the plurality of light quantity adjusting means is made different according to the state of the mode of the camera, it is possible to achieve photography which more faithfully reflects the intention of the photographer.

As is apparent from the above description, since light-quantity control is executed by combining light quantity adjusting means for varying an aperture diameter and light quantity adjusting means for making adjustment of light quantity as by a method of varying not the aperture diameter but, for example, light transmittance, it is possible to achieve optimum light-quantity control which takes into account depth of field, diffraction and the like and gives preference to image quality, without causing an unnatural variation in not only light quantity but also an image.

SIXTH EMBODIMENT

Each of the first and second embodiments has disclosed an arrangement which covers the entire aperture with an ND filter before the occurrence of small-aperture diffraction in order to prevent the deterioration of image quality due to diffraction or shading due to a small aperture, an edge of the ND filter or the like. Each of the third to fifth embodiments has disclosed an arrangement which is capable of providing a natural image by preventing a variation in brightness during the insertion of an ND filter while controlling an aperture at the same time.

Sixth to eighth embodiments which will be described below discloses arrangements which realize exposure control including far more improved ND filter control which totally includes the functions of the above-described first to fifth embodiments.

The sixth to eighth embodiments as well as their background will be described below in order.

Figure 21:
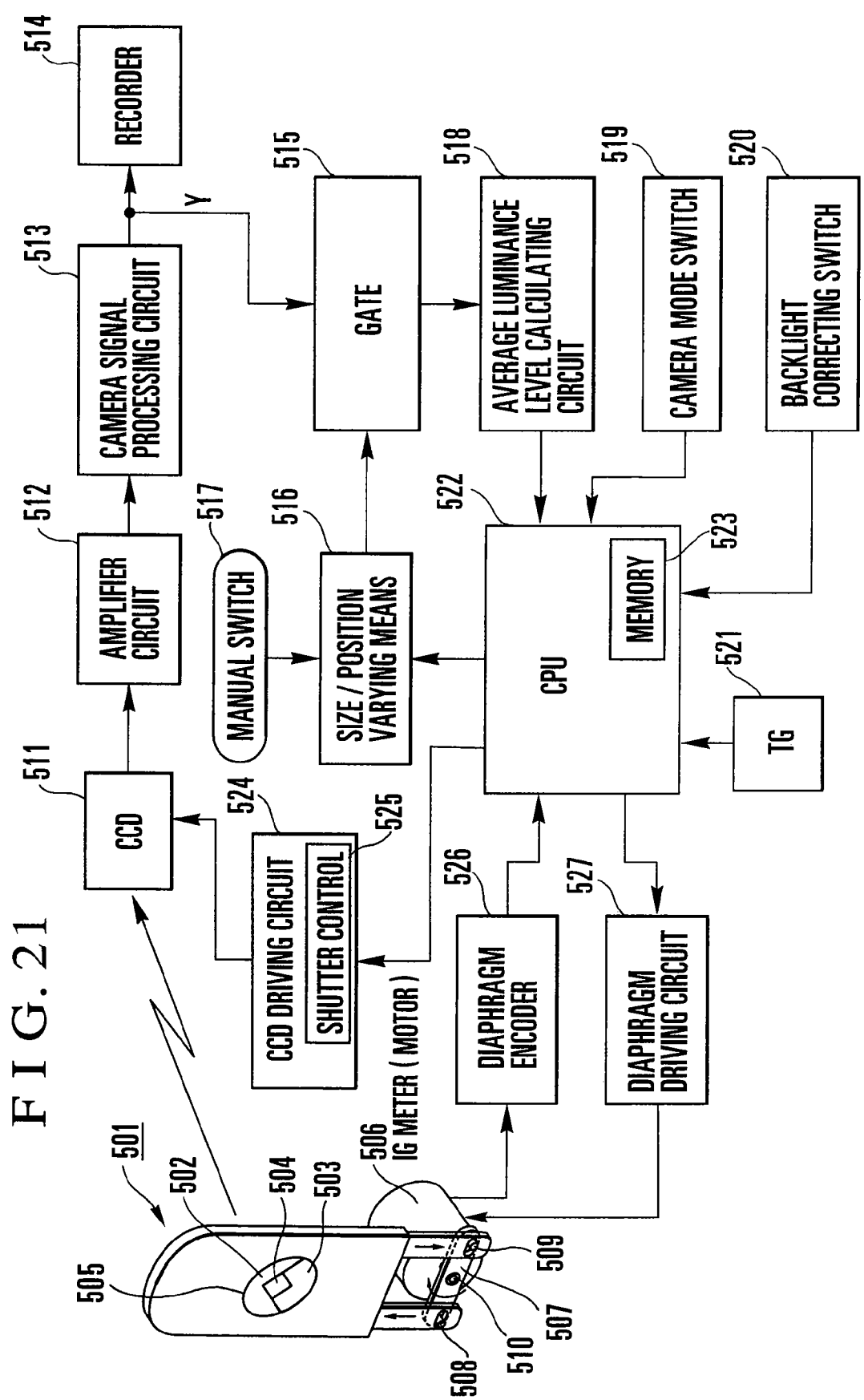
FIG. 21 is a view showing an exposure control block of an image pickup apparatus such as a video camera.

FIG. 21 is a block diagram aiding in describing a light quantity adjusting method which is used in a video camera or the like.

The image pickup apparatus shown in FIG. 21 includes a diaphragm device 501, diaphragm blades 502 and 503, an aperture 504, a fully open aperture 505, a diaphragm driving meter 506, an arm lever 507, interlocking portions 508 and 509 for interlocking the arm lever 507 and the diaphragm blades 502 and 503, and an output shaft 510 of the diaphragm driving meter 506. The diaphragm driving meter 506 rotates the output shaft 510 to turn the arm lever 507 and move the diaphragm blades 502 and 503 upward or downward, thereby varying the aperture 504. The image pickup apparatus shown in FIG. 21 also includes a solid-state image pickup element 511, an amplifier circuit 512, a camera signal processing circuit 513, a recorder 514, a gate 515 for setting a light measuring frame, size/position varying means 516 for varying the size or position of the gate 515 to vary the size or position of the light measuring frame, a manual switch 517 for manipulating the size/position varying means 516, and an average luminance level calculating circuit 518.

The image pickup apparatus shown in FIG. 21 also includes a mode selecting switch 519 for switching over the mode of the image pickup apparatus, a backlight correcting switch 520, a timing generator 521, a CPU 522 which serves as a system controller, a memory 523 which is incorporated in the CPU 522 (the memory 523 may be provided externally of the CPU 522), a CCD driving circuit 524 which includes a circuit for varying charge storage time (shutter speed) in the example shown in FIG. 21, a diaphragm encoder 526 and a diaphragm driving circuit 527.

In the above-described arrangement, an image of a subject formed on the CCD 511 is converted into an electrical signal as the amount of charge per pixel according to the intensity of the brightness of the image. The electrical signal is amplified by the amplifier circuit 512, and is then subjected to predetermined processing such as gamma correction in the camera signal processing circuit 513. This processing may also be performed in digital signal processing after A/D conversion.

The video signal produced in this manner is recorded in the recorder 514.

In the meantime, the gate 515 extracts a contrast signal (Y signal) of the video signal from the light measuring frame set at a predetermined position in a picture (for example, a small central area of the picture), and the average luminance level calculating circuit 518 calculates an average value of the extracted contrast signal. The calculated average value is supplied to the CPU 522.

The manual switch 517 can be switched by a photographer in relation to the size of the gate 515, and enables the photographer to designate a light measuring area such as a center-weighted measuring area or a spot measuring area. On the basis of the result of area designation by the photographer or the result of area designation by the CPU 522, the size/position varying means 516 can vary the position or size of the gate 515. (As a matter of course, the size/position varying means 516 and the manual switch 517 are not necessarily needed.)

The CPU 522 determines whether the magnitude of the supplied average luminance coincides with a numerical value corresponding to a correct exposure, which numerical value is memorized in the CPU 522. If there is a difference therebetween, the CPU 522 varies the aperture 504 of the diaphragm device 501 or varies the charge storage time of the CCD 511 according to the sign and the absolute value of the difference.

In the operation of the diaphragm device 501, the diaphragm driving circuit 527 causes current to flow through the coil of the solenoid type of diaphragm driving meter 506, thereby turning the output shaft 510 and hence the arm lever 507. Since pins which are provided at the opposite ends of the arm lever 507 are respectively fitted in slots which are formed in extending end portions of the respective diaphragm blades 502 and 503, the two diaphragm blades 502 and 503 slide upward or downward by the turning of the arm lever 507. Thus, the size of the aperture 504 is varied.

In the above-described manner, the area of the aperture 504 or the charge storage time is varied to make the aforesaid average luminance level equal to a predetermined level, whereby optimum exposure can be obtained. The mode selecting switch 519 allows the photographer to select a desired photographing mode such as a portrait mode or a green mode, so that the photographer can select a desired combination of an aperture value and a shutter speed according to the creative intention of the photographer with respect to one subject. To achieve this processing, a plurality of so-called program diagrams of an exposure program are stored in the memory 523. If the backlight correcting switch 520 is manipulated, the CPU 522 executes processing such as the processing of increasing the predetermined value for the average luminance level by two to three steps.

If the combination of apertures and shutter speeds to be stored in the memory 523 is to be determined, the following three constraint conditions (i), (ii) and (iii) occur.

(i) According to a standard television format (for example, NTSC), it is in general impossible to make the charge storage time longer than $\frac{1}{60}$ second.

(ii) If a moving subject is to be recorded as a moving image which shows a visually natural smooth movement, it is impossible to set an excessively high shutter speed (an excessively short charge storage time), for example, $\frac{1}{250}$ second.

In other words, under either of the constraint conditions (i) and (ii), it is only possible to make exposure adjustment by a maximum of approximately two steps in terms of shutter speed.

(iii) If an F value is larger than approximately F16 (when the size of the CCD 511 is ⅓ inch) or approximately F11 (when the size of the CCD 511 is ¼ inch), the aperture diameter of a diaphragm becomes small so that a lowering in image forming performance due to diffraction occurs.

FIG. 22 is an imaginary view aiding in describing the lowering in image forming performance due to diffraction. In FIG. 22, the horizontal axis represents the F value of an aperture and the vertical axis represents the MTF indicative of image forming performance. The MTF is a numerical value which indicates to what extent the contrast of a subject is maintained in an image forming plane, and it is more preferable that the numerical value is larger (actually, the numerical value varies according to spatial frequency). The MTF for a fully open aperture is slightly improved by reducing the aperture. This improvement in the MTF reflects the fact that spherical aberration is improved by reducing the aperture. In addition, if the aperture value becomes larger than a value Fth which causes diffraction due to the aforesaid small aperture, the MTF lowers due to the diffraction.

If numerical values smaller than the value Fth can only be used in aperture control, adjustment of light quantity can only be made within the range of approximately six steps in the case of a lens whose fully open aperture value is approximately F1.4, depending on the picture size of the CCD 511. As a result, only with the combination of apertures and shutter speeds, the range of adjustment of light quantity is limited to an insufficient number of steps as small as eight steps.

For this reason, in an actual image pickup apparatus, it is common practice that an ND filter is integrally cemented to a diaphragm blade.

FIGS. 23(A) to 23(D) show a case where an ND filter 530 is cemented to the diaphragm blade 503, and show a variation in the aperture of the diaphragm device 501 from the state of fully open aperture (FIG. 23(A)) to the state in which the ND filter 530 covers the entire aperture diameter (FIG. 23(D)). If the ND filter 530 has a density which reduces its transmitted light quantity by $(\frac{1}{2})^3=\frac{1}{8}$, i.e., three steps, it is possible to achieve adjustment of light quantity in the practical range of brightness of subjects because of the above 8+3=11.

However, this method still has the following problems.

(i) If the density of the ND filter is increased, shading occurs in the luminance of an upper or lower portion of a picture, so that a subject of uniform luminance may not be recorded as a subject image of uniform luminance.

(ii) A defocus effect is inferior in that the shape of the ND filter is viewed in the shape of an aperture (iii) If the aforesaid value Fth decreases to F8 or F5.6 with the development of a far smaller CCD having a far higher density, the current method will not be able to provide a sufficient range of adjustment of light quantity.

To cope with these problems, it is well known to adopt another method in which an ND filter is not cemented to a diaphragm blade but is disposed separately from the diaphragm blade in such a manner that the ND filter can be inserted into or retracted from an optical path. In this method, a CPU compares an aperture value with the value Fth and displays in an electronic viewfinder (EVF) or the like an instruction to insert or retract the ND filter, on the basis of the result of the comparison, and a photographer performs a manipulation for inserting or retracting the ND filter. However, this method has the problem that such inserting/retracting manipulation is awkward and the continuity of photography is lost during the time period from the moment when the ND filter is inserted or retracted until the moment when a correct exposure is again obtained.

To solve such problem, Japanese Patent Application No. Hei 10-179950 discloses a method which is capable of ensuring the continuity of photography and the naturalness of a defocus effect by maintaining a predetermined interlocking relation between a diaphragm device and an ND-filter driving device under the control of a CPU. However, if photography is performed with the aperture diameter of the diaphragm device being half covered by an ND filter having an increased density, even this method cannot avoid the problem of the above-described luminance shading (if the density of the ND filter is decreased to avoid the problem, the number of steps required for satisfactory adjustment of light quantity cannot be obtained).

Figure 24:
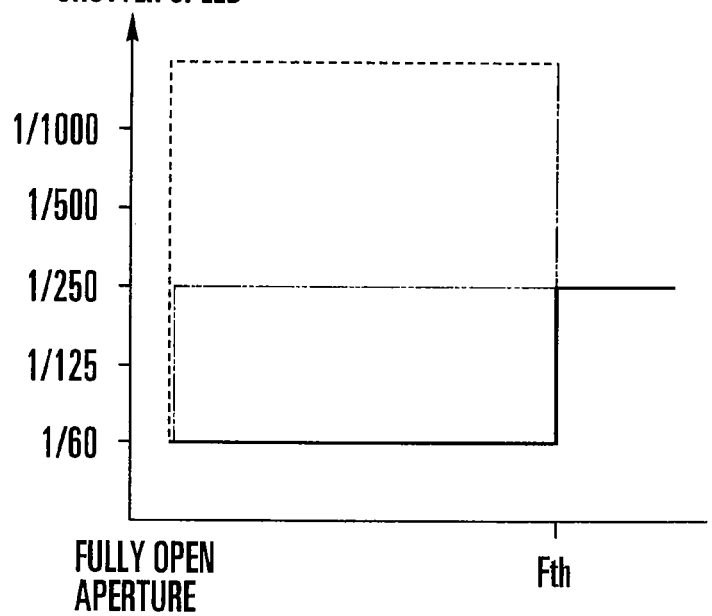
FIG. 24 is a view showing one example of exposure control using a combination of apertures and shutter speeds.

FIG. 24 shows one example of the program diagrams stored in the memory 523 shown in FIG. 21. In the case of a program line shown by a solid line, as long as the value of an aperture is smaller than the value Fth, a shutter speed (charge storage time) of $\frac{1}{60}$ second is maintained, and if the value of the aperture reaches the value Fth, the shutter speed is increased to $\frac{1}{250}$ second. However, if there still remains an overexposure, a far smaller aperture is used (although small-aperture diffraction occurs).

In FIG. 24, a two-dot chain line shows another program line which is intended to increase a depth of field as much as possible and is designed to increase the shutter speed to $\frac{1}{250}$ second from the beginning so that a fully open aperture can be used.

In a photographic scene which can be recorded as a moving image with no visual unnaturalness, if a photographer desires to open the aperture as fully as possible, the characteristic shown by the two-dot chain line will work.

The sixth embodiment is intended to achieve light-quantity adjustment which takes into account the prevention of shading in the upper and lower portions of a picture, and to provide an ND-filter driving device capable of restraining shading from occurring in the upper and lower portions of a picture.

Further, the sixth embodiment is intended to provide a method which is capable of adjusting light quantity without substantial diffraction due to small apertures nor substantial shading in the upper and lower portions of a picture, by using both an ND-filter driving device and a diaphragm device.

Further, the sixth embodiment is intended to provide a light-quantity adjusting method which is capable of reflecting the intention of a photographer.

Figure 25:
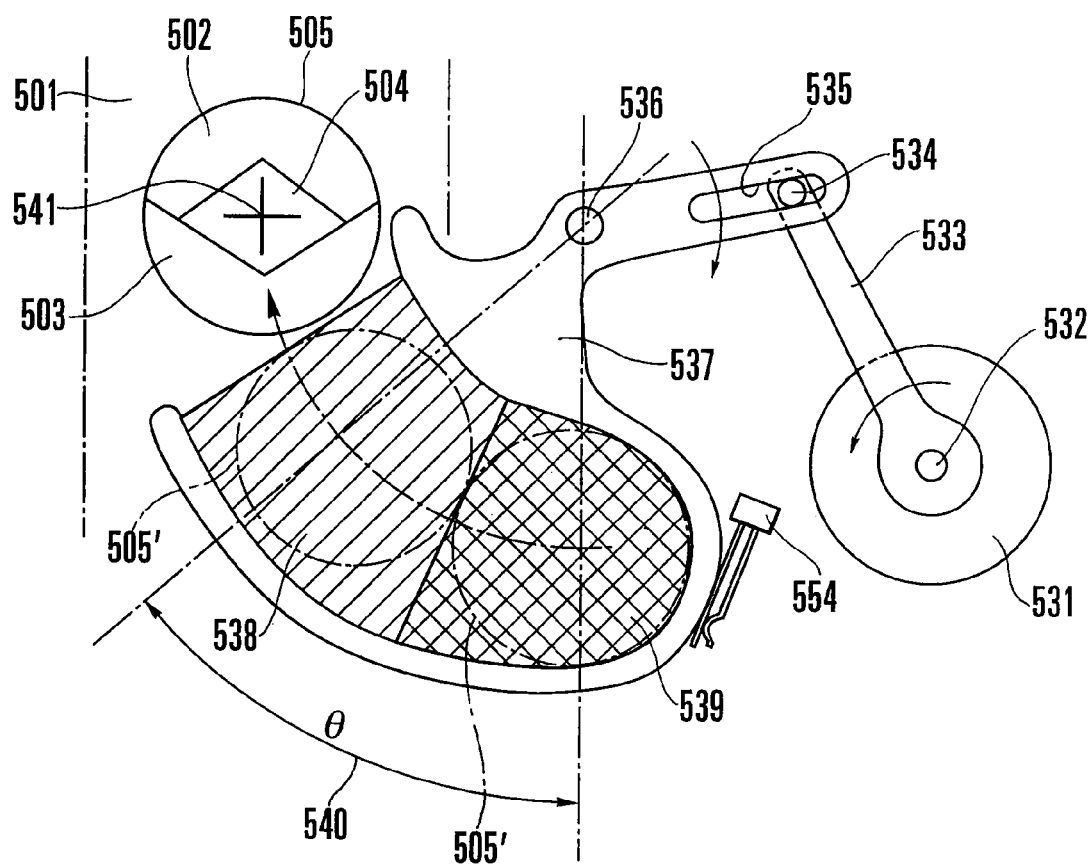
FIG. 25 is a view showing the construction of an ND-filter driving device according to a sixth embodiment of the present invention.
Figure 26:
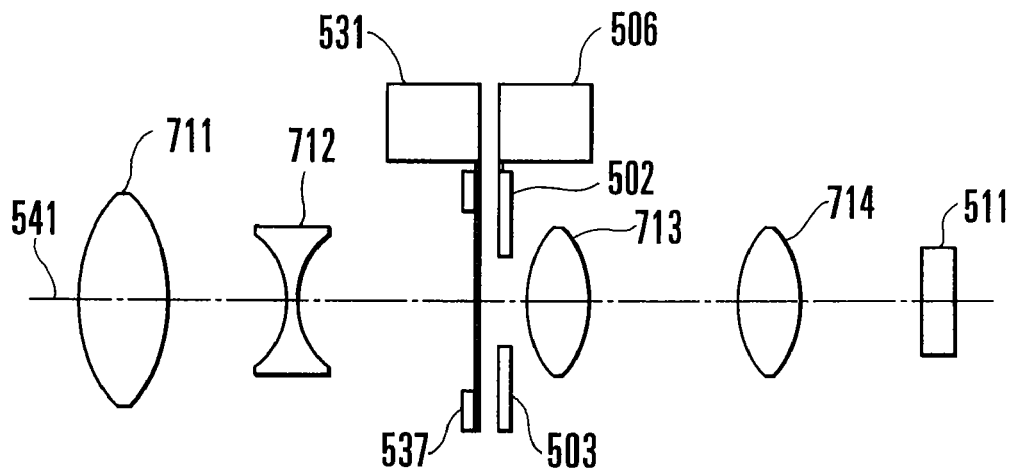
FIG. 26 is a schematic view showing the arrangement in a zoom lens of the ND-filter driving device according to the sixth embodiment of the present invention.

FIGS. 25 and 26 show the sixth embodiment, and FIG. 25 shows that ND filters are retracted from an optical path. In FIG. 25, identical reference numerals are used to denote constituent elements having functions identical to those of the corresponding ones shown in FIG. 21. ND filters 538 and 539 have different densities (different transmittances), and the ND filter 538 has a comparatively low density (a comparatively high transmittance), while the ND filter 539 has a high density (a low transmittance) compared to the ND filter 538. The ND filters 538 and 539 may be made of glass or formed as film. The ND filter 538 having a single density may also be used in such a manner as to overlap the ND filter 539, or one ND filter may be manufactured as an ND filter having two different densities. Each of the ND filters 538 and 539 is arranged to have an area which can completely cover the fully open aperture 505 of the diaphragm device 501. The ND-filter driving device shown in FIG. 25 includes a meter 531 which serves as driving means for the ND filters 538 and 539 and has an output shaft 532, an interlocking lever 533 having a pin 534 provided at its extending end, an ND filter frame 537 having a slot 535 and a rotational axis 536, an ND-OUT leaf switch 554 for detecting the retraction of the ND filters 538 and 539 by being turned on when the ND filters 538 and 539 are completely retracted from the optical path, and an ND-IN leaf switch 555 (shown in FIG. 27) for detecting the insertion of the ND filter 538 or 539 by being turned on when the ND filter 538 or 539 is inserted into the optical path.

Figure 27:
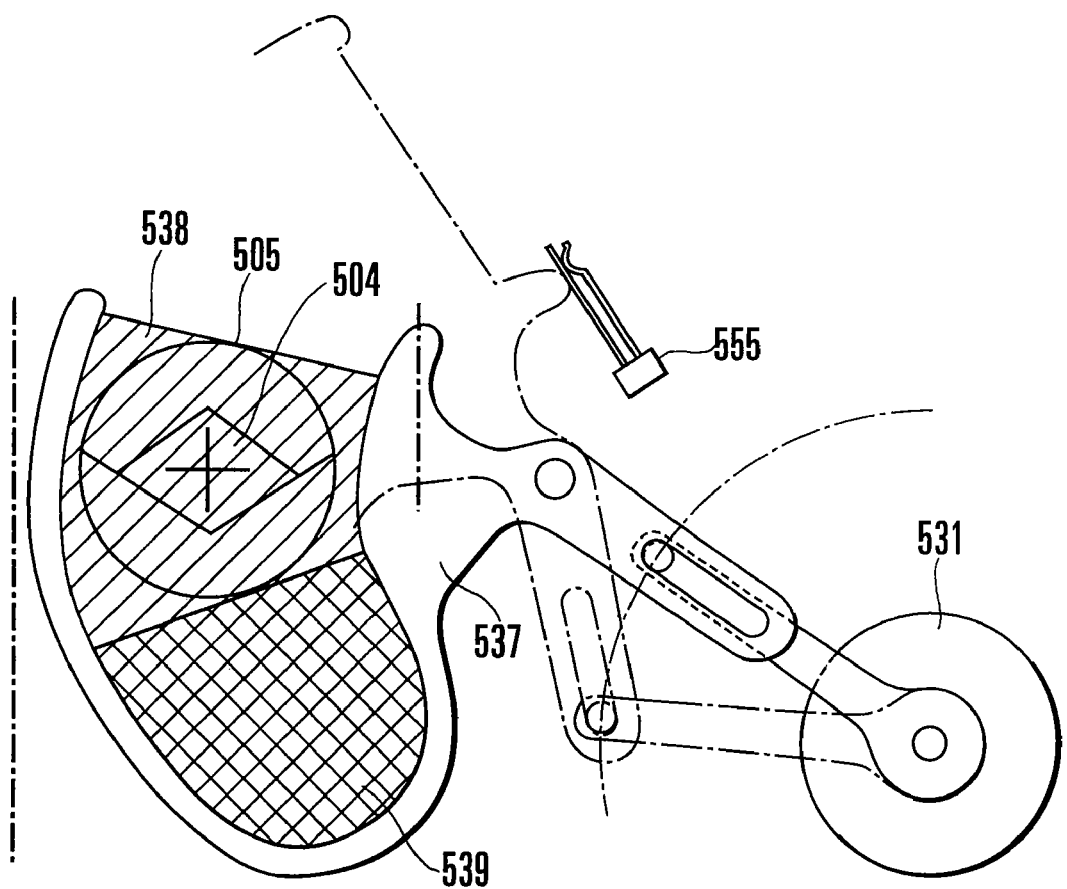
FIG. 27 is a view showing a state of operation of the ND-filter driving device according to the sixth embodiment of the present invention.

If the output shaft 532 of the meter 531 rotates toward the left as viewed in FIG. 25, the interlocking lever 533 turns in the direction indicated by the arrow shown on the interlocking lever 533 in FIG. 25. The ND filter frame 537 interlocks with the turning of the interlocking lever 533 via the slot 535 and the pin 534, and turns about the rotational axis 536 in the direction indicated by the arrow shown on the diaphragm blade 503 in FIG. 25 and the ND filter 538 or 539 is inserted into the optical path in the direction indicated by the arrow shown on the diaphragm blade 503 in FIG. 25. FIG. 26 is a side view schematically showing a manner in which the ND-filter driving device shown in FIG. 25 is disposed in a zoom lens. Lens groups 711 to 714 correspond to the respective lens groups 201a to 201d described previously with reference to FIGS. 10(A) and 10(B), and reference numeral 511 denotes a CCD. The diaphragm device (502, 503 and 506) and the ND-filter driving device (531 and 537) are arranged to operate in a plane perpendicular to an optical axis 541. FIG. 27 shows the state in which the ND filter frame 537 is turned from the state shown in FIG. 25 to a position where the ND filter 538 completely covers the fully open aperture 505.

As a matter of course, if the ND filter frame 537 further continues to turns, the ND filter 539 starts to partly cover the fully open aperture 505 and finally completely covers the fully open aperture 505. For example, if the ND filter 538 is designed to have a density which reduces a transmitted light quantity by 1.5 steps from that obtainable at the fully open aperture ($\frac{1}{2.8}$ in light quantity) and the ND filter 539 is designed to have a density which reduces a transmitted light quantity by 3 steps from that obtained at the fully open aperture ($\frac{1}{8}$ in light quantity), it is possible to greatly improve the effect of shading, as compared with a diaphragm device which inserts and retracts a single ND filter having the same density as the ND filter 539 into and from an optical path.

Figure 28:
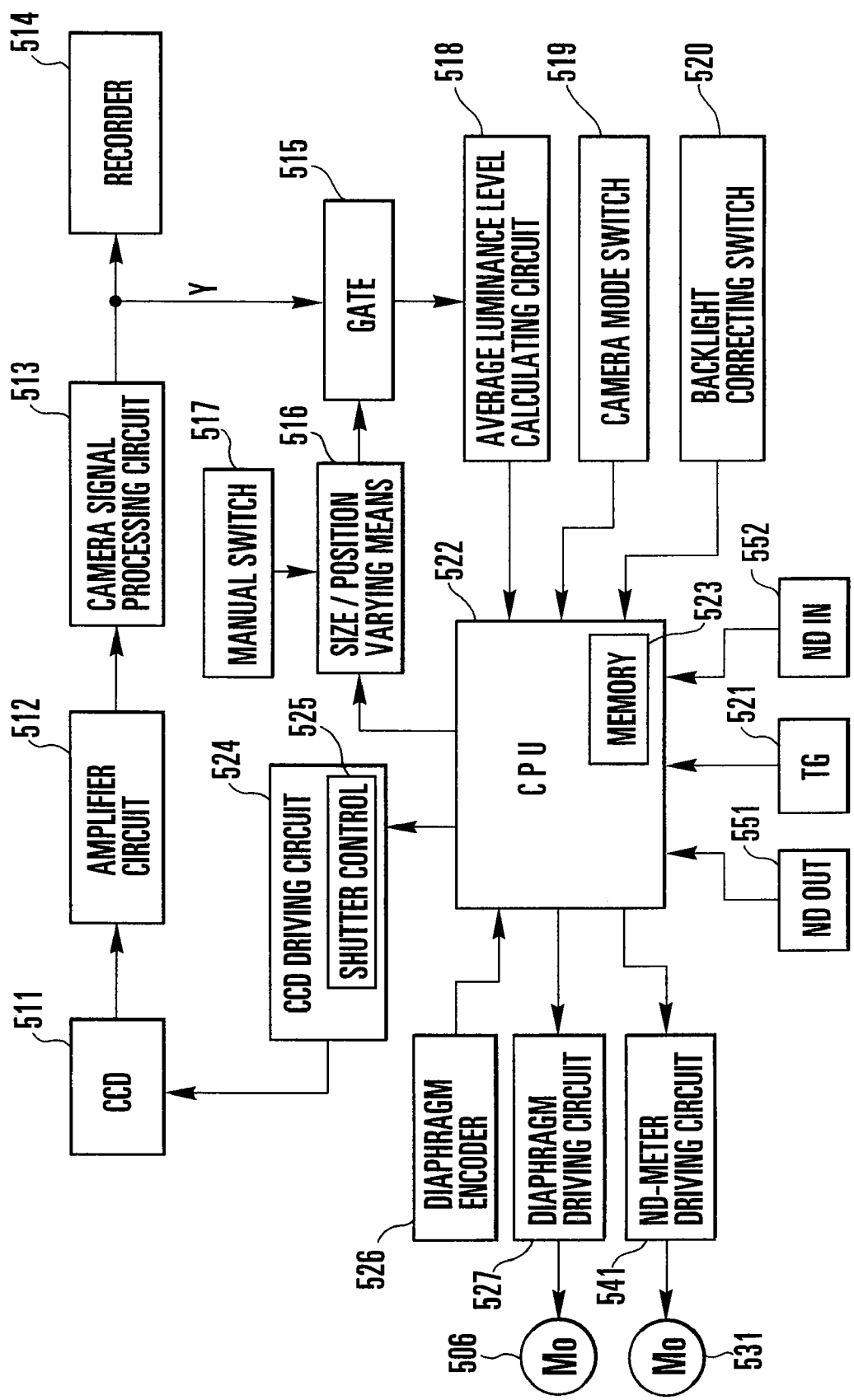
FIG. 28 is a block diagram of the ND-filter driving device according to the sixth embodiment of the present invention.

FIG. 28 is a block diagram showing the sixth embodiment. In FIG. 28, identical reference numerals are used to denote blocks identical to those shown in the block diagram of FIG. 21 which shows the conventional apparatus. The arrangement shown in FIG. 28 differs from that shown in FIG. 21 in that the CPU 522 controls the operation of the ND-filter driving actuator 531 (the meter 531 shown in FIG. 25) via an ND-meter driving circuit 541. A switch 551 serves to detect the state in which the ND filters 538 and 539 are completely retracted from the optical path as shown in FIG. 25, and a switch 552 serves to detect the state in which the ND filters 538 and 539 are completely inserted in the optical path.

Figure 29:
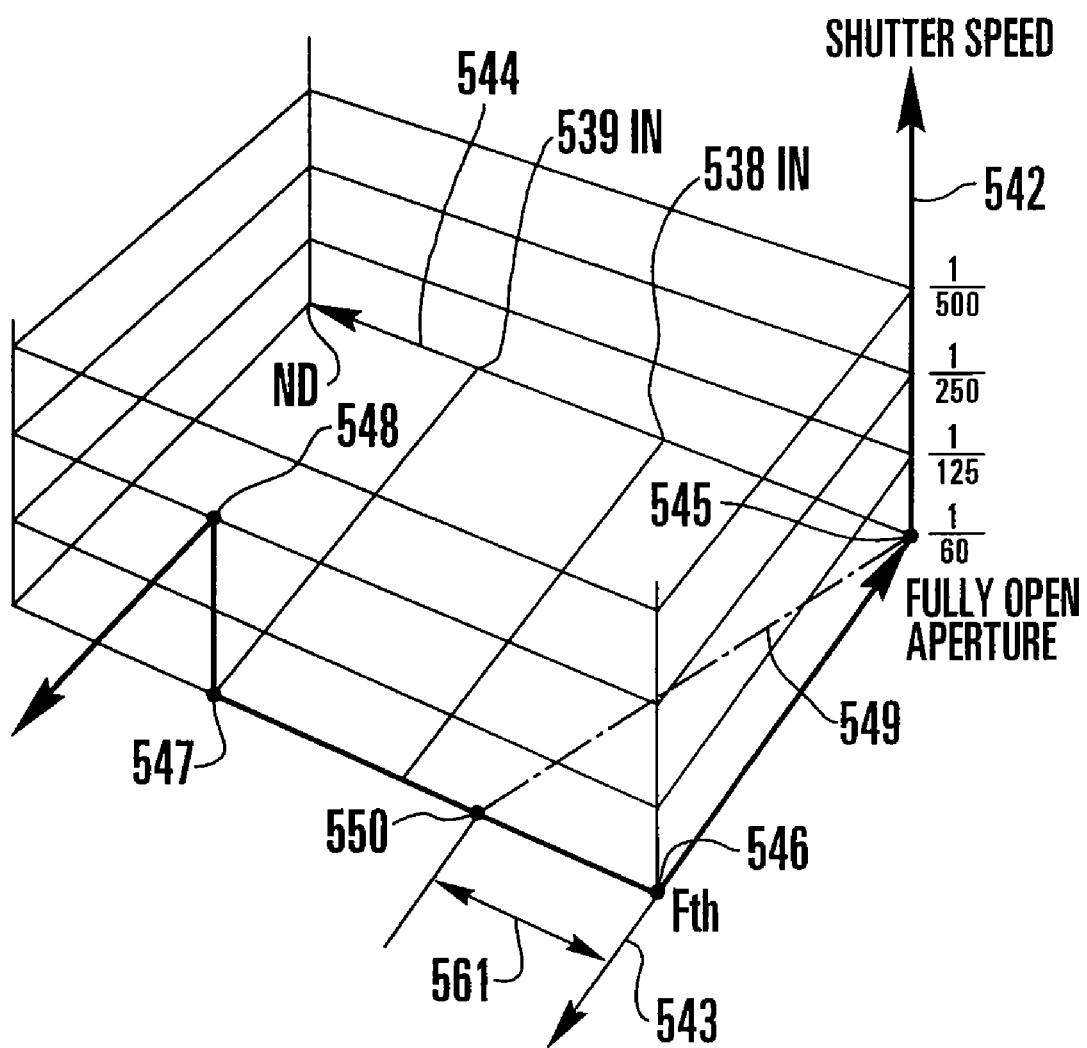
FIG. 29 is a graph of an exposure control operation of the ND-filter driving device according to the sixth embodiment of the present invention.

FIG. 29 shows a method of controlling exposure in the sixth embodiment. In FIG. 29, an axis 542 represents shutter speed (the charge storage time of the CCD 511), and the slowest shutter speed (a point 545) is $\frac{1}{60}$ second (vertical synchronizing period). An axis 543 represents the state of the aperture, and the point 545 indicates the fully open aperture and the aperture becomes smaller along the axis 543 which extends obliquely downward toward the left as viewed in FIG. 29. An axis 544 represents the state in which each of the ND filters 538 and 539 is inserted into the optical path. Intermediate points 538IN and 539IN respectively indicate positions at which the ND filters 538 and 539 completely cover arbitrary aperture diameters. The arbitrary aperture diameters differ for F values. For the sake of simplicity in the following description, it is assumed that the value Fth is determined as an F value which corresponds to a minimum aperture which does not cause an image deterioration due to small-aperture diffraction, and the positions at which the ND filters 538 and 539 respectively completely cover aperture diameters corresponding to the value Fth are indicated by the respective points 538IN and 539IN. In the graph of FIG. 29, a maximum transmitted light quantity (capable of coping with a darkest subject) can be obtained at the point 545 where the aperture is fully open and the shutter speed is $\frac{1}{60}$ second with no ND filters being inserted. Although not represented in the block diagram of FIG. 28, if a correct exposure is not obtained at the point 545, the amplifier circuit 512 may perform amplification (increase its gain) whose amplification factor exceeds a normal amplification factor.

In the graph of FIG. 28, thick lines represent the sequence of exposure control. (Incidentally, the manner of connection of the thick lines is not limited to one the shown example.) First, at the point 545, only the diaphragm device is operated to initiate exposure control. In a section which extends from the point 545 to a point 546, the aperture of the diaphragm device is adjusted between the fully open aperture value and the value Fth. If the aperture is reduced beyond the value Fth, an image deterioration due to a small aperture will occur as described previously. To avoid this phenomenon, in a section which extends from the point 546 to a point 547, the ND filter 538 is moved to reduce the current transmitted light quantity. In this section between the point 546 and the point 547, a section 561 corresponds to the idling period of the ND filter 538 (a period before the ND filter 538 starts overlapping an effective optical path). To avoid this idling, unlike the control executed in the section from the point 545 to the point 546, exposure control may be executed as shown by a line segment 549 which connects the point 545 to a point 550. In this case, position control of the extent of insertion of the ND filter needs to be executed, but such position control will be handled in the seventh embodiment and so on.

After the control reaches a point 547, the shutter speed is increased to $\frac{1}{250}$ second and the control reaches a point 548.

Figure 30:
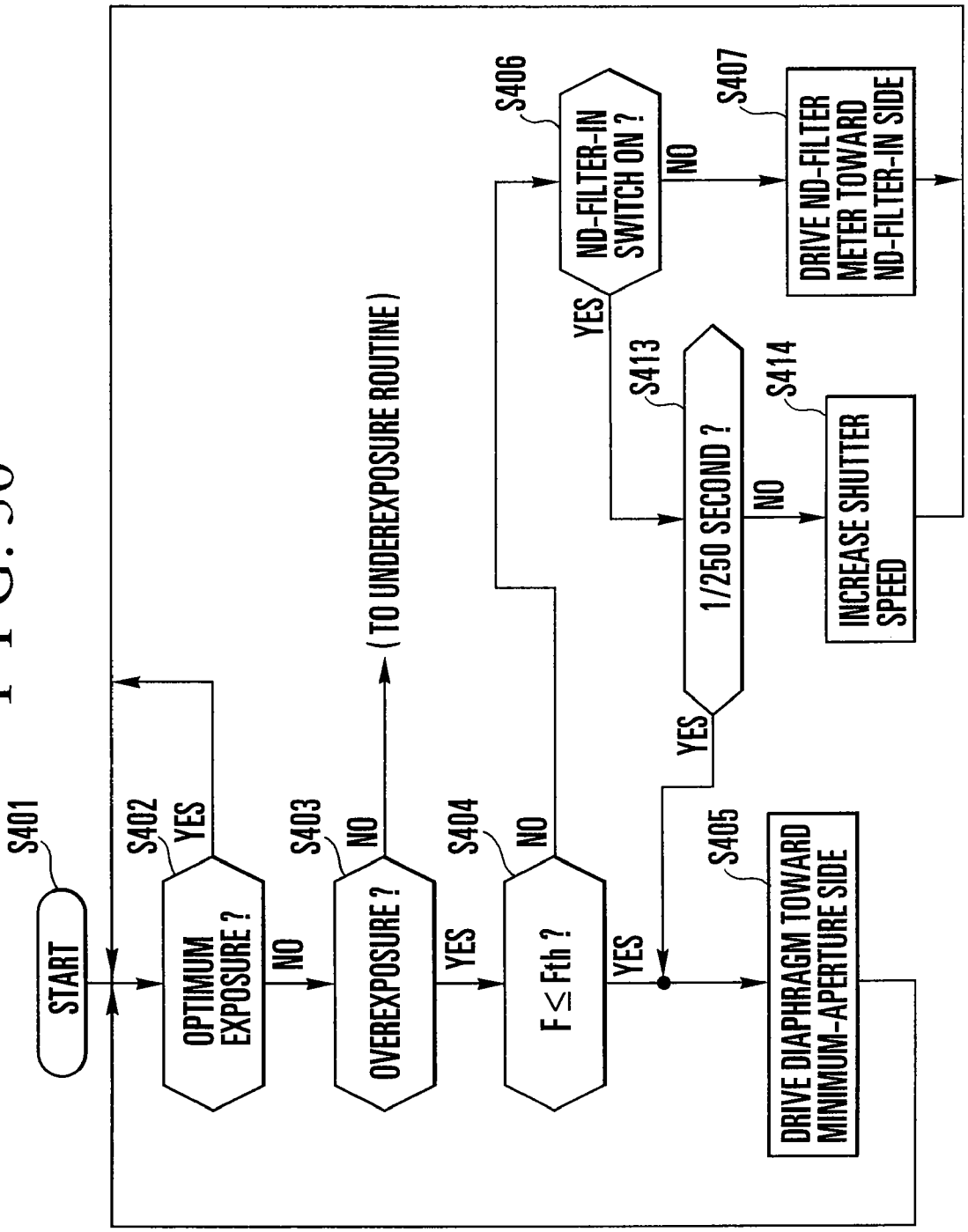
FIG. 30 is a flowchart of the operation of the ND-filter driving device according to the sixth embodiment of the present invention.
Figure 31:
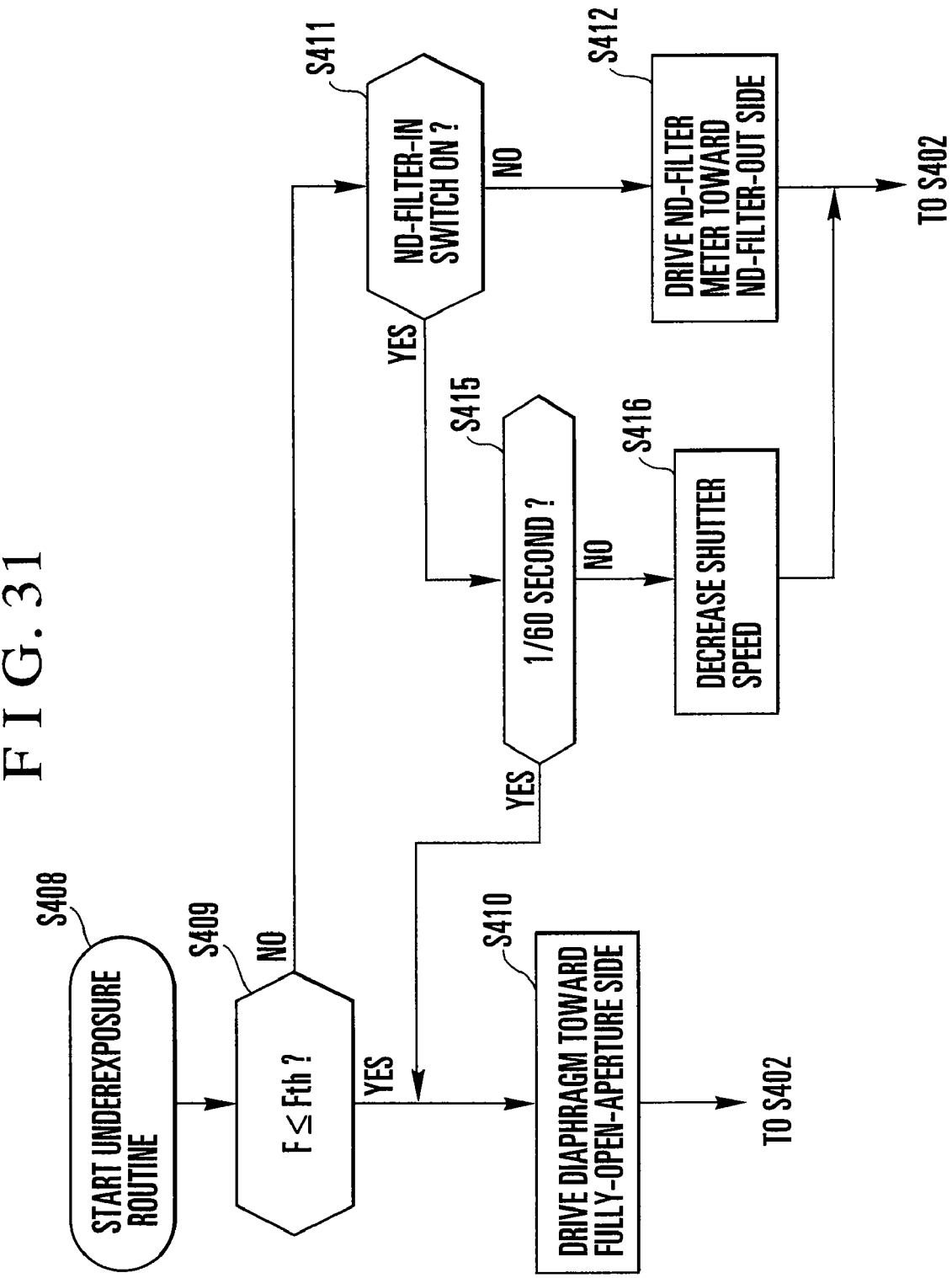
FIG. 31 is a flowchart of the operation of the ND-filter driving device according to the sixth embodiment of the present invention.

FIGS. 30 and 31 are flowcharts of the operation of the sixth embodiment. First, in Step S401, the process is started. In Step S402, it is checked whether the current exposure is optimum exposure. If the current is not optimum exposure, it is detected in Step S403 whether the current exposure is overexposure or underexposure. In the case of overexposure, the process proceeds to Step S404, whereas in the case of underexposure, the process proceeds to Step S408 of FIG. 31. In Step S404, it is checked whether the current F value is smaller than the value Fth. If the current F value is smaller than the value Fth, it is determined that the control is proceeding between the point 545 and the point 546 in FIG. 29, and the process proceeds to Step S405, in which the diaphragm device is driven in a smaller-aperture direction.

Incidentally, although not shown in this flowchart, if it is necessary to more reliably check whether the control is proceeding between the point 545 and the point 546 in FIG. 29, it may be checked whether the leaf switch 554 shown in FIG. 25 for detecting the retraction of the ND filters 538 and 539 is reliably turned on.

If the answer in Step S404 is NO, it is determined that the control is proceeding between the point 546 and the point 547, or between the point 547 and the point 548 or between the point 548 and a small aperture. In Step S406, the state of the ND-IN switch 552 is detected. If the ND filters 538 and 539 are not completely inserted, the process proceeds to Step S407, in which the ND filter meter 531 is driven in the ND-filter inserting direction. If the ND filters 538 and 539 are already completely inserted in the optical path, the answer in Step S406 is Y, and the shutter time is increased in Step S414 while the shutter time is being monitored in Step S413 to check whether the shutter speed does not exceed 1/250 second.

If an optimum exposure is not obtained when it is determined in Step S413 that the shutter time reaches 1/250 second, the process proceeds to Step S405, in which the aperture is reduced to a further extent to obtain an optimum exposure at the sacrifice of an image deterioration due to a small aperture.

If it is determined in Step S403 that the current exposure is underexposure, the process proceeds to Step S408 of the flowchart of FIG. 31.

As described above, the thick lines shown in FIG. 29 represent that the exposure control is started at the fully open aperture with a shutter time of 1/60 second with the ND filters 538 and 539 being retracted from the optical path and transmitted-light-quantity limiting means is operated in the order of aperture→ND filter→shutter time→aperture. However, this order may be changed according to the selection of a camera mode. If a photographer selects at the mode selecting switch 519 a mode for making the depth of field as shallow as possible, such as a portrait mode, the aforesaid order is changed to the order of shutter time→ND filter→aperture, thereby reflecting the intention of the photographer.

Incidentally, the switch 551 for detecting the retraction of the ND filters 538 and 539 and the switch 552 for detecting the insertion of the ND filters 538 and 539 may use photointerrupters or the like instead of leaf switches. In addition, although the sixth embodiment uses ND filters which turn back and forth as shown in FIGS. 25 and 27, ND filters which slide back and forth may also be used.

SEVENTH EMBODIMENT

In the above-described sixth embodiment, the state of insertion or retraction of the ND filters 538 and 539 into or from the effective optical path is only detected in such a way that the inserted state of the ND filters 538 and 539 is detected by the switch 555 shown in FIG. 27, while the retracted state of the ND filters 538 and 539 is detected by the switch 554 shown in FIG. 25.

The feature of the seventh embodiment resides in the use of encoding means (ND encoder) capable of detecting the rotational angle of an ND filter as an absolute position. The construction of the seventh embodiment is shown in FIGS. 32 and 33.

Figure 32:
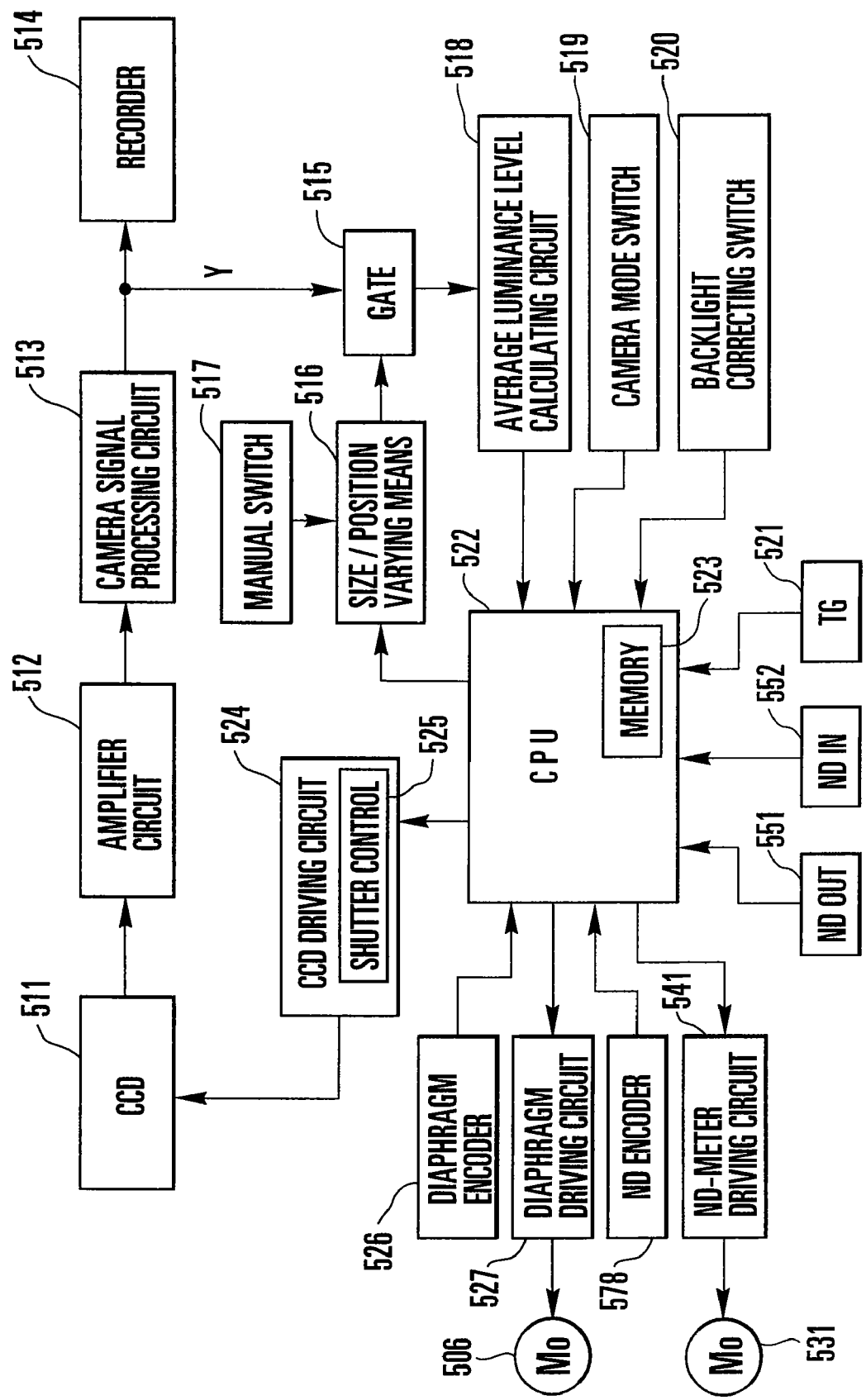
FIG. 32 is a block diagram of a seventh embodiment of the present invention.
Figure 33:
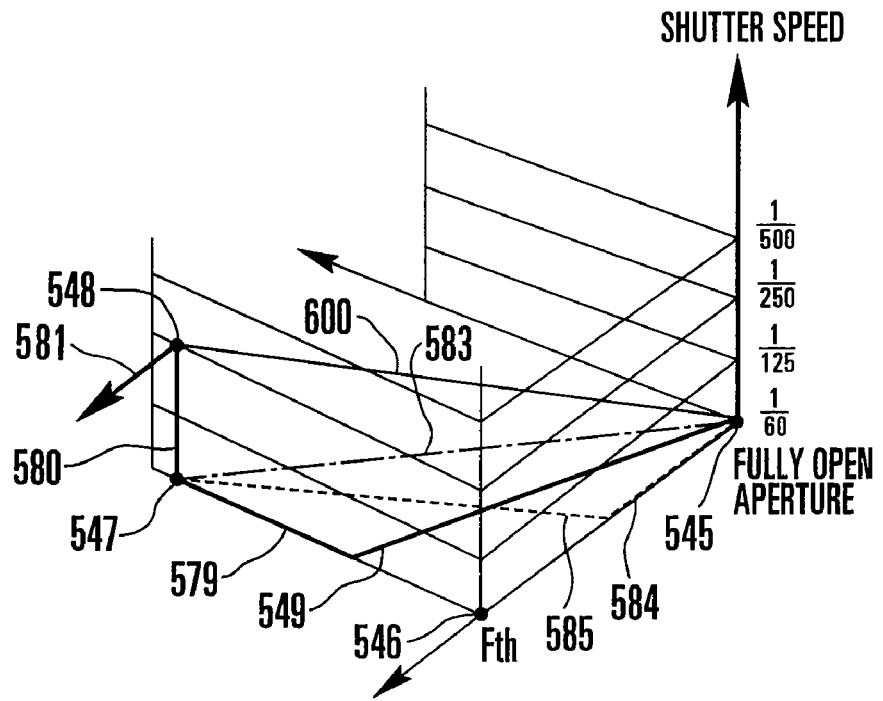
FIG. 33 is a graph of an exposure control operation of the sixth embodiment of the present invention.

In FIG. 32, identical reference numerals are used to denote constituent elements identical to the corresponding ones shown in FIG. 28, and the description of the identical constituent elements is omitted. In the seventh embodiment, an ND encoder 578 detects the absolute position of the ND filter meter 531, and the detection result is supplied to the CPU 522. Various interlocking relations between the meter 531 and the diaphragm driving meter 506 are stored in the memory 523 of the CPU 522, and the two meters are interlocked on the basis of the stored data.

Similarly to conventional diaphragm encoder means, the ND encoder 578 may adopt, for example, a method of detecting a variation in magnetic flux in the vicinity of the boundary between the south pole and the north pole of a rotor magnet by means of a Hall element provided in a meter which is an ND-filter driving source, or a method of using an ND-filter driving source composed of not a meter but a stepping motor and continuously counting the number of driving pulses inputted to the stepping motor from a reference position.

The arrangement of the sixth embodiment can be realized by preparing an interlocking relation which excludes the idling section 561 of FIG. 29 as shown by the dot-dashed line 549, in the form of program data stored in the memory 523. FIG. 33 shows several examples of such an interlocking relation. A method which is represented by the solid line 549 extending from the point 545, a solid line 579, a solid line 580 and a solid line 581 is similar to the method according to the sixth embodiment shown in FIG. 29 in that light quantity control is started at the point 545 and is executed in the order of aperture→ND filter→shutter time→aperture. However, in the seventh embodiment, in the section of the solid line 549, the ND meter 531 can be placed in a standby state so that the ND filters 538 and 539 are located at a position as close to the aperture as possible without overlapping the aperture, with respect to each aperture value from the fully open aperture to the value Fth. Accordingly, it is possible to exclude the idling section 561 shown in FIG. 29. A dot-dashed line 583 represents a method of causing the diaphragm device 501 and the ND filters 538 and 539 to perform a predetermined interlocking operation between the point 545 and the point 547, i.e., between the state in which a shutter time of 1/60 second and the fully open aperture are selected with the ND filters 538 and 539 being completely retracted from the optical path and the state in which a shutter time of 1/60 second and the fully open aperture are selected with the ND filters 538 and 539 being completely inserted in the optical path.

A dashed line represents a method which, in a section 584 closer to the fully open aperture, inhibits the ND filters 538 and 539 from being inserted into the optical path so that a natural defocus effect can be obtained, and, in the next section 585, causes the diaphragm device 501 and the ND filters 538 and 539 to perform an interlocking operation. Incidentally, the section 584 may be superimposed on the section 549.

A solid line 600 which directly connects the point 545 and the point 548 represents a method which causes the diaphragm device 501 and the ND filters 538 and 539 to perform predetermined movements while changing the shutter time.

It is also possible to adopt an arrangement which is capable of switching these methods from one method to another to meet a desired object and effect according to the state of a mode of the camera.

In the seventh embodiment as well as the other embodiments, the value Fth itself may be changed as required. The value Fth may also be changed according to the required quality of images to be recorded.

EIGHTH EMBODIMENT

Figure 34:
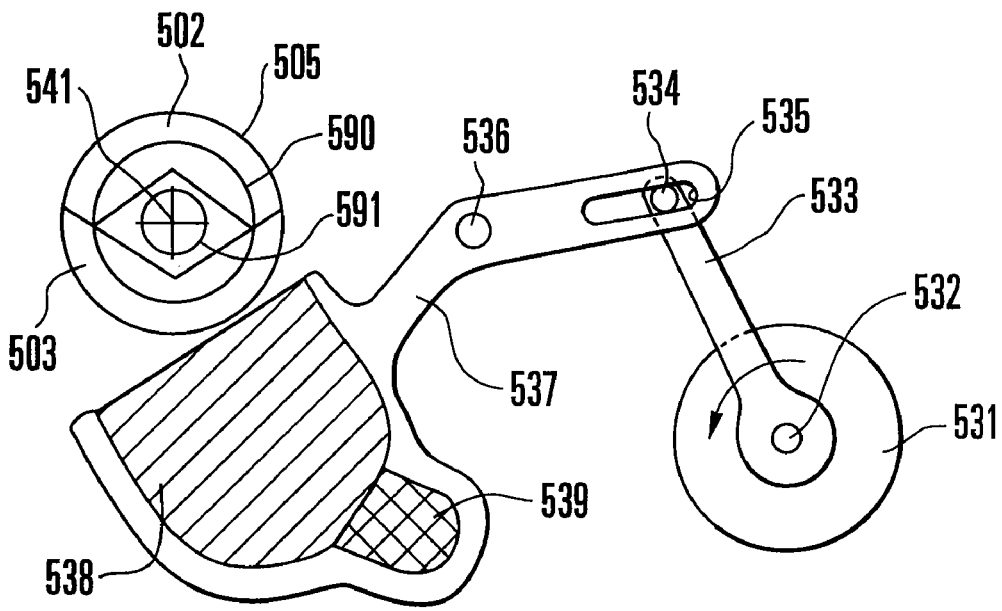
FIG. 34 is a view showing the construction of an ND-filter driving device according to an eighth embodiment of the present invention.
Figure 35:
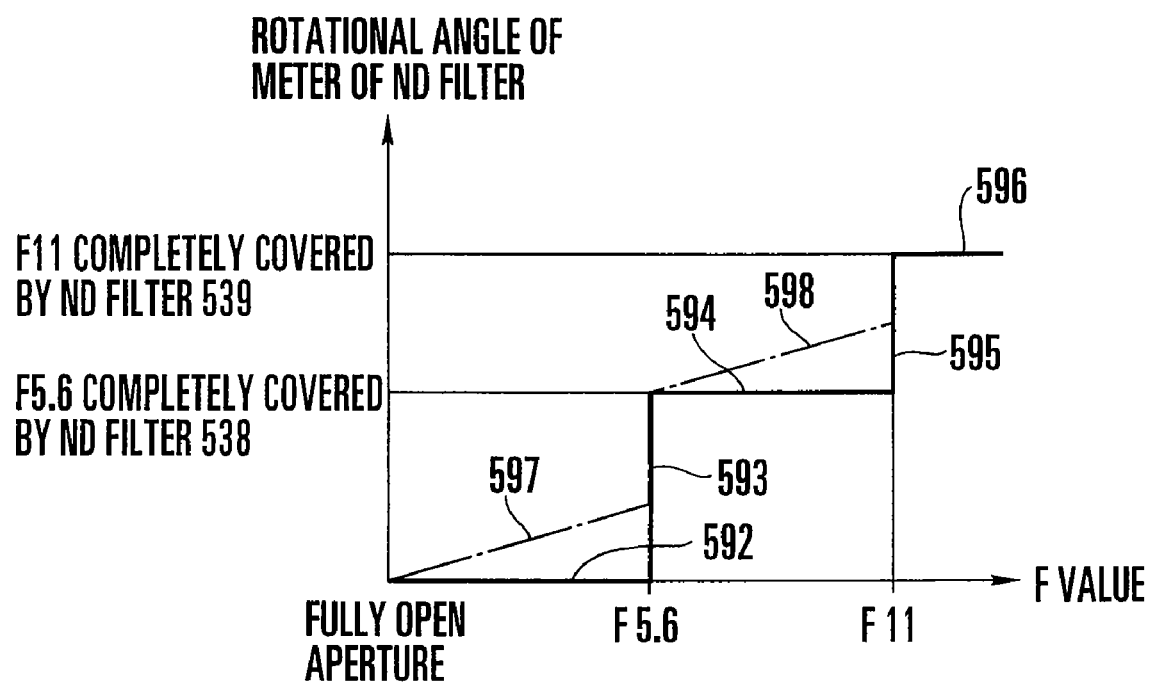
FIG. 35 is a graph of an exposure control operation of the eighth embodiment of the present invention.

FIGS. 34 and 35 show an eighth embodiment. The eighth embodiment is intended to realize a reduction in the size of an ND-filter driving mechanism, as compared with the sixth and seventh embodiments. As shown in FIG. 34, the ND filter 538 having a lower density has an area which can completely cover an aperture 590 smaller than the fully open aperture 505, while the ND filter 539 having a higher density has an area which can completely cover an aperture 591 smaller than the aperture 590. As is apparent from FIG. 34, it is possible to reduce the rotational angle of the ND filters 538 and 539. In addition, although the interlocking lever portion shown in FIG. 34 is shown to have approximately the same dimensions as those shown in FIGS. 25 and 27, the dimensions of the interlocking lever portion shown in FIG. 34 can be reduced.

Although the mechanism shown in FIG. 34 is arranged so that the ND filter 538 covers the aperture 590 and the ND filter 539 covers the aperture 591, both of the ND filters 538 and 539 may also be arranged to completely cover the aperture 590 or the ND filter 539 may also be arranged to cover an aperture smaller than the fully open aperture 505 with the ND filter 538 covering the fully open aperture 505. As described previously in connection with the sixth embodiment, the ND-filter driving mechanism may be arranged to slide back and forth instead of turning back and forth about its rotational axis.

FIG. 35 shows the interlocking relation between a diaphragm device and an ND-filter driving device such as that shown in FIG. 34. If the ND filter 538 and the ND filter 539 are respectively set to completely cover an aperture of F5.6 and an aperture of F11, the two ND filters 538 and 539 are controlled in accordance with the interlocking relation shown by solid lines 592, 593, 594, 595 and 596. With this control, it is possible to eliminate the problem that a frame portion of the ND filters 538 and 539 covers the aperture. To exclude the idling period, the respective ND filters 538 and 539 may be controlled as shown by dot-dashed lines 597 and 598 similarly to the seventh embodiment.

Incidentally, although each of the above-described embodiments uses a diaphragm device composed of two diaphragm blades, the present invention can also be applied to a so-called iris composed of five or more blades.

As described above, according to the above-described sixth to eighth embodiments, it is possible to realize an optimum exposure control device which is capable of optimally coping with various modes of a camera and which is capable of eliminating small-aperture diffraction and greatly reducing the extent of shading or the like in upper and lower portions of a picture due to an ND filter in an image pickup apparatus using a CCD or the like and which is capable of ensuring the continuity of photography or the naturalness of a defocus effect at a fully open aperture.

In addition, the eighth embodiment makes it possible to reduce the size of the exposure control device.

An ND filter inserting/retracting mechanism for inserting or retracting an optical member such as an ND filter into or from an optical path will be described below as ninth and tenth embodiments of the present invention.

As described previously, in general, in an arrangement which varies an aperture diameter by means of diaphragm blades, the diaphragm blades are used with an ND filter to prevent the aperture diameter from being made excessively small, because if the aperture diameter is made excessively small, image quality deteriorates due to diffraction. The smaller the aperture diameter, the smaller a variation in the aperture diameter with respect to a variation in light quantity, so that errors easily occur if the diaphragm blades are controlled by a meter which constitutes a solenoid-driven actuator. To cope with this problem, there have been provided arrangements of the type in which an ND filter is cemented to a diaphragm blade so that the ND filter is automatically inserted when the aperture diameter is not greater than a predetermined aperture diameter.

Some types of photographing lenses of comparatively high performance have a diaphragm device which drives diaphragm blades by means of a meter, and a mechanism which is capable of manually or automatically inserting into an optical path an ND filter which operates independently of a diaphragm. In the case of such a photographing lens, the brightness of a subject is detected, and a request to insert or retract the ND filter to prevent the deterioration of image quality is displayed in a viewfinder and a photographer manipulates the mechanism in accordance with the request. Otherwise, the photographer may manipulate the mechanism to intentionally vary a photographic effect, for example, to control the amount of defocus.

However, in the above-described example, if the ND filter is to be inserted or retracted into or from the optical path independently of the diaphragm, there is no choice but to completely insert the ND filter into the optical path or to completely retract the ND filter from the optical path. This leads to the problem that if the ND filter is inserted or retracted during photography, automatic exposure control in a camera body cannot track a steep variation in light quantity and the brightness of a picture varies instantaneously.

Another problem is that since the ND filter is mounted in a circular opening portion of a holding member, part of the holding frame, when inserted, is reflected in an image to visually impair the quality of the image.

In view of the above-described problems, each of the ninth and tenth embodiments of the present invention is intended to provide a light quantity adjusting device which is capable of inserting and retracting an optical member such as an ND filter in such a manner that no steep variation occurs in an image even during photography.

For this purpose, an optical member which adjusts a light quantity which passes through a photographing optical system is held on a mounting portion having a U-shaped aperture which is opened in the moving direction of a moving holding member.

NINTH EMBODIMENT

According to the ninth embodiment, there is provided a light quantity adjusting device which is arranged in a camera or the like and which includes an optical member for adjusting a light quantity which is transmitted through a photographing lens, a holding member which holds the optical member, and an operating member for manually or automatically operating the holding member to insert and retract the optical member into and from an effective light beam of a photographing optical system. The holding member has a U-shaped optical member mounting portion which is opened in the moving direction of the optical member, and a rotating shaft which is disposed approximately horizontally of an optical axis. Since the holding member for the optical member is opened in the moving direction, if the optical member such as an ND filter is inserted or retracted into or from an optical path, it is possible to prevent the holding frame from being reflected in a picture even during photography, thereby realizing photography without a steep variation in an image. In addition, since the center of rotation of the holding member is positioned approximately horizontally of the optical axis, the end face of the optical member such as the ND filter can be positioned horizontally in the vicinity of the center of the picture. Accordingly, during autofocus control, no detection errors occur because the luminance of a subject is detected in the horizontal direction and a best focus position is determined from the obtained contrast information.

The ninth embodiment of the present invention will be described below with reference to FIGS. 36 and 37.

Figure 36:
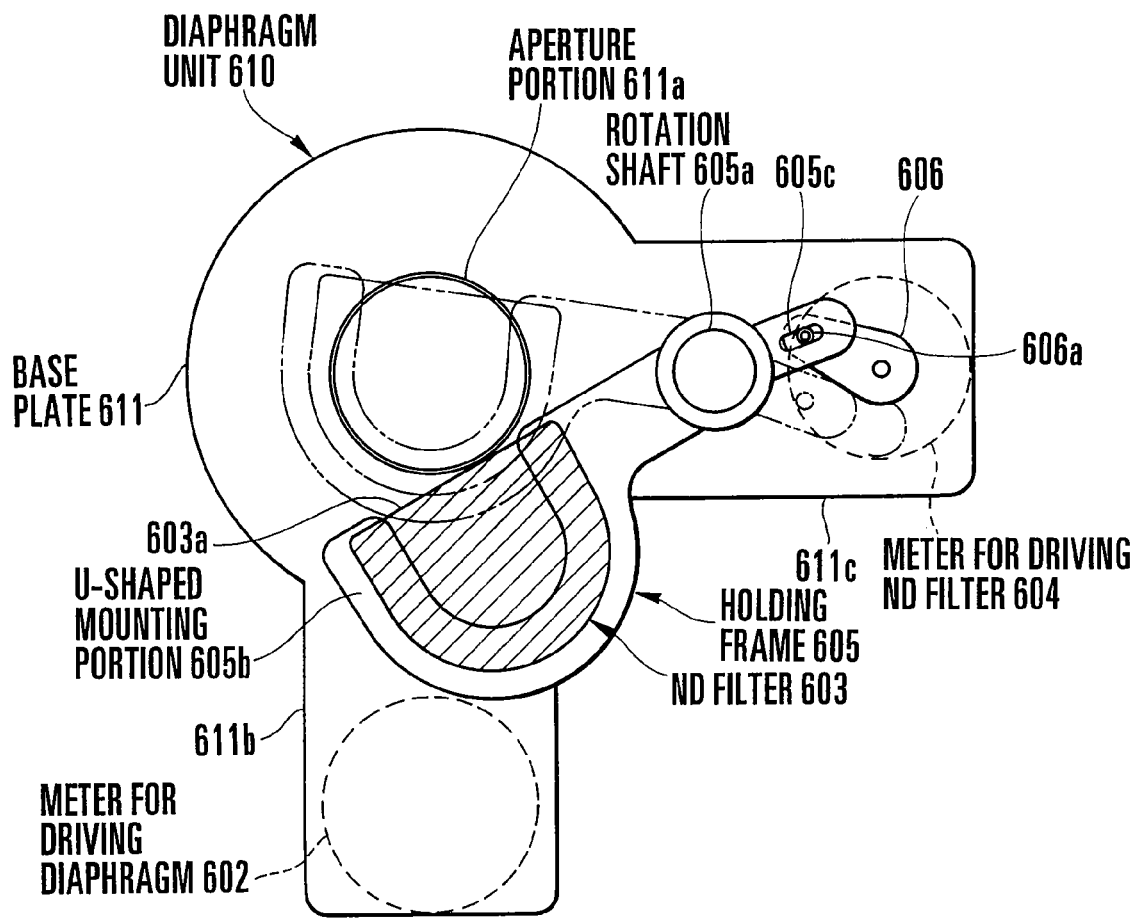
FIG. 36 is a view showing the construction of a light quantity adjusting device according to a ninth embodiment of the present invention.
Figure 37:
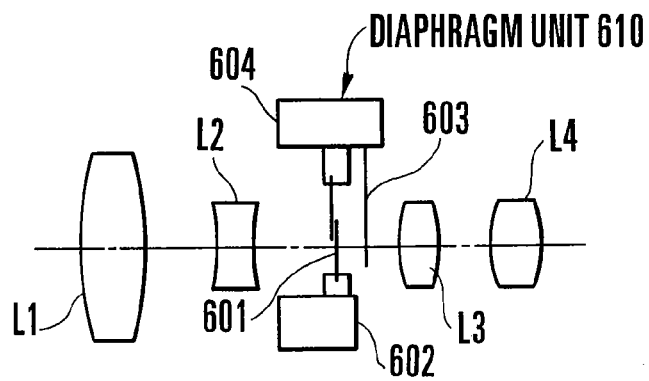
FIG. 37 is a cross-sectional view of a photographing lens for a video camera, which includes a diaphragm unit according to the ninth embodiment of the present invention in a built-in form.

FIG. 36 is a front view of a diaphragm unit which serves as the light quantity adjusting device according to the ninth embodiment, and FIG. 37 is a cross-sectional view of a photographing lens for a video camera, in which the diaphragm unit is incorporated.

The photographing lens shown in FIG. 37 includes a fixed first lens group L1, a movable lens L2 for effecting zooming, a fixed lens L3 which constitutes an afocal system, and a focusing movable lens L4. A diaphragm unit 610 is disposed between the zooming lens L2 and the afocal lens L3, and has diaphragm blades 601, a meter 602 which is a solenoid actuator for driving the diaphragm blades 601, an ND filter 603 which is disposed between the diaphragm blades 601 and the afocal lens L3, and a meter 604 for inserting and retracting the ND filter 603 into and from an optical path.

The structure of the diaphragm unit 610 will be described below in detail with reference to FIG. 36.

In the diaphragm unit 610 shown in FIG. 36, a base plate 611 is held by a fixed portion of a lens barrel (not shown). A circular aperture 611a through which a light beam passes is formed in the central portion of the base plate 611, and a projection 611b is formed below the aperture 611a and holds the meter 602 for driving the diaphragm blades 601. The meter 602 moves the two or more diaphragm blades 601 in the aperture 611a of the base plate 611 and, as is well known, varies the aperture area formed by the edge shapes of the respective diaphragm blades 601, thereby varying a light quantity which passes through the aperture 611a.

The base plate 611 also has a lateral projection 611c which holds the meter 604 for driving the ND filter 603. A holding frame 605 for inserting and retracting the ND filter 603 into and from the aperture 611a of the base plate 611 is turnably supported on the base plate 611 by a rotating shaft 605a which is provided approximately in parallel with an optical axis which extends through the aperture 611a of the base plate 611. The holding frame 605 has a U-shaped mounting portion 605b at one end, and the ND filter 603 is fixed by adhesion to the rim portion of an open end of the U-shaped mounting portion 605b with an end face 603a of the ND filter 603 extending straightforward toward the rotating shaft 605a, so that rays pass through the area inside the U-shaped mounting portion 605b. A slot 605c is formed at the other end of the holding frame 605, and is engaged with a pin 606a provided at one end of an arm 606 which is integrally secured to the rotating shaft of the meter 604, whereby the angular moment of the meter 604 is transmitted to the holding frame 605 to turn the ND filter 603. It is to be noted that while the ND filter 603 is moving, the open end of the U-shaped mounting portion 605b of the holding frame 605 faces in the moving direction of the ND filter 603 so that the holding frame 605 does not hinder a light beam when the ND filter 603 is being inserted into the optical path.

The control operation of the ND filter 603 in the ninth embodiment having the above-described construction will be described below.

The diaphragm blades 601 are driven according to luminance information relative to a light beam which passes through the photographing lens, and reduce the aperture area to a smaller area in the case of a brighter light beam or enlarge the aperture area to a larger area in the case of a darker light beam. However, if a very bright subject is to be photographed, such exposure control using only the diaphragm blades 601 makes the aperture area excessively small and an entire image becomes unsharp due to a diffraction phenomenon.

To prevent the occurrence of such an unsharp image, the ND filter is inserted into the optical path to decrease the whole light quantity so that the aperture area is prevented from becoming excessively small.

Incidentally, a similar effect can be obtained with a lens barrel having a mechanism capable of inserting and retracting the ND filter 603 by manual external manipulation, but if the mechanism is manipulated during photography, a steep variation in light quantity occurs. Since automatic exposure control in a camera body cannot track such steep variation, an image being photographed suddenly becomes dark or bright, and is restored to a normal state after a few seconds. Even if the holding frame 605 can be manually moved slowly, part of the shadow of the holding frame 5 is reflected in the image during the insertion of the ND filter 603 because a circular aperture, which does not take into account any manipulation to be manually performed during photography, is simply formed in the portion of the holding frame 605 which holds the ND filter 603.

However, in the ninth embodiment, the holding frame 605 is driven by the meter 604 so that the holding frame 605 can be controlled to move slowly from its retraction position to its insertion completion position in approximately two to three seconds, Accordingly, it is possible to realize photography without a large variation in an image nor visual unnaturalness.

The rotating shaft 605a is positioned horizontally of the optical axis and the end face 603a of the ND filter 603 extends straightforward toward the rotating shaft 605a, so that if the holding frame 605 turns, the end face 603a of the ND filter 603 is positioned approximately horizontally in the vicinity of the center of the optical axis. Normally, the autofocus function of a video camera is arranged to determine that a focus position which shows a highest contrast is a best focus position, on the basis of horizontal luminance information in the vicinity of the center of the optical axis. Accordingly, it is possible to reduce detection errors by inserting the ND filter 603 into the aperture 611a of the base plate 611 in such a manner that the end face 603a of the ND filter 603 is positioned approximately horizontally in the vicinity of the center of the optical axis.

Then, the ND filter 603 turns to the position shown by two-dot chain lines in FIG. 36 and completely covers a predetermined diameter.

TENTH EMBODIMENT

Figure 38:
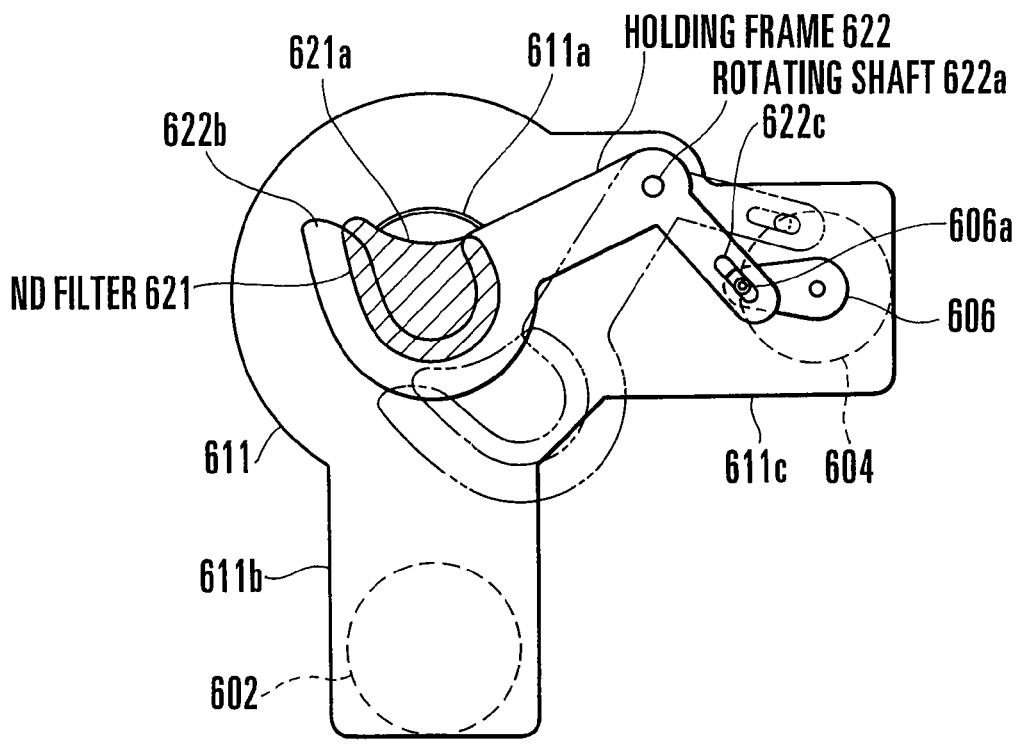
FIG. 38 is a front view of a diaphragm unit according to a tenth embodiment of the present invention.
Figure 39:
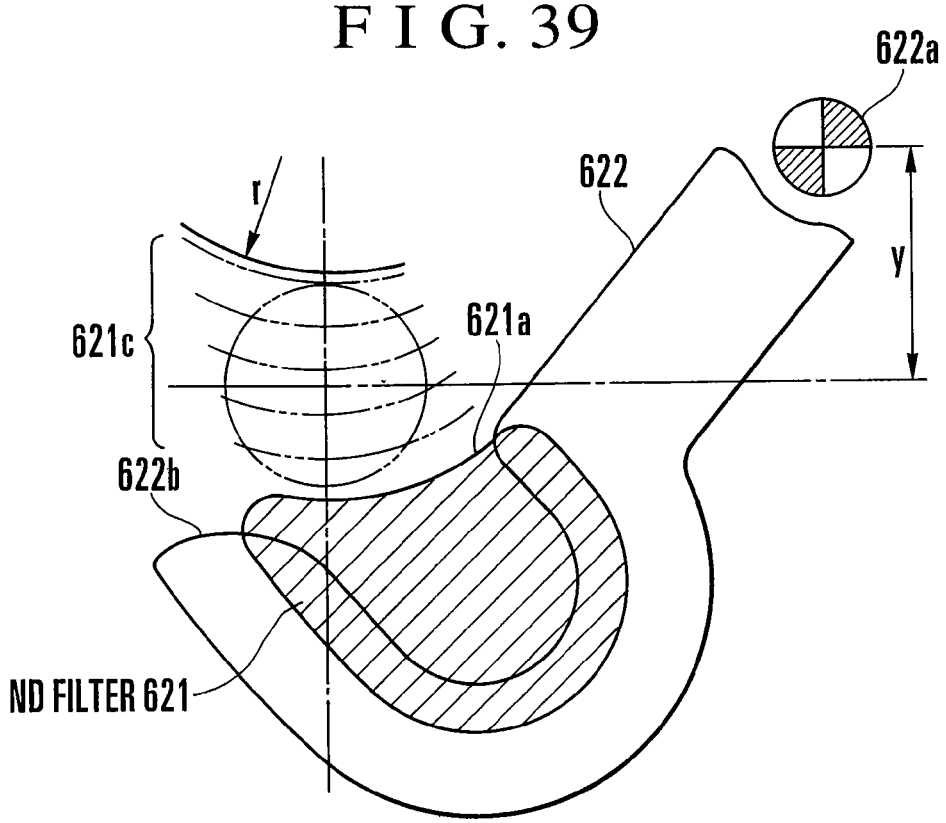
FIG. 39 is an explanatory view of an ND-filter driving device of the diaphragm unit according to the ninth embodiment of the present invention.

FIGS. 38 and 39 show the tenth embodiment of the present invention.

According to the tenth embodiment, the optical member has an arcuate end face, and the optical member is inserted into the effective light beam of a photographing lens with the arcuate end face of the optical member being positioned approximately horizontally until the optical member completely covers an effective light beam.

Accordingly, during photography, it is possible to insert and retract the optical member such as an ND filter into and from an optical path while decreasing the influence of the optical member on autofocus control. In addition, since the optical member moves with the end face being positioned approximately horizontally until the optical member completely covers the effective light beam, it is possible to photograph spot light sources without causing visually unnatural defocus patterns due to the shape of an aperture.

In FIGS. 38 and 39, since the constituent elements other than an ND filter and a frame for holding the same are identical to the corresponding ones shown in FIGS. 36 and 37, identical reference numerals are used to denote the identical constituent elements, and the description thereof is omitted for the sake of simplicity.

FIG. 38 is a front view of a diaphragm unit which serves as a light quantity adjusting device according to the tenth embodiment, and FIG. 39 is a schematic view aiding in describing the manner of driving of the ND filter of the diaphragm unit.

Referring to FIG. 38, an ND filter 621 is cemented to one end of a holding frame 622 which will be described later, and has an arcuate end face 621a. As the ND filter 621 is inserted into the optical path, the end face 621a moves over the optical path. The holding frame 622 for holding the ND filter 621 has a U-shaped mounting portion 622b at the one end similarly to the holding frame 605 used in the ninth embodiment, and is turnably supported by a rotating shaft 622a at a position which is upward offset from a horizontal line passing through the optical axis of the aperture 611a of the base plate 611. The other end portion of the holding frame 622 is bent in an L-like shape in the vicinity of the rotating shaft 622a, and a slot 622c which is formed at the other end of the holding frame 622 is engaged with the pin 606a provided at one end of the arm 606 which is integrally held by the rotating shaft of the meter 604.

The operation of inserting the ND filter 621 having the above-described arrangement into the optical path will be described below with reference to FIG. 39.

As the ND filter 621 moves into the optical path while being turned by the holding frame 622, the end face 621a moves as indicated by the loci shown by two-dot chain lines 621c. By setting the position of the rotating shaft 622a, which serves as the center of rotation of the holding frame 622, to a predetermined position, it is possible to maintain the end face 621a of the ND filter 621 at an approximately horizontal position throughout the process of completely covering the aperture 611a.

In FIG. 39, letting r be the radius of the end face 621a of the ND filter 621, the amount of offset, "y", of the center of rotation of the rotating shaft 622a from the horizontal line which passes through the optical axis is set to the radius r or a value close to the radius r, whereby the above-described effect can be obtained. Incidentally, as the value of the radius r and the amount of offset, "y", are made larger, the shape of the end face 621a can be made closer to a straight light, but, as a matter of course, the value of the radius r and the amount of offset, "y", are limited by the size of the light quantity adjusting device.

As described above, until the ND filter 621 completely covers the whole light beam, the ND filter 621 moves in the optical path with the end face 621a being positioned approximately horizontally. Accordingly, during photography, it is possible to insert and retract the ND filter 621 into and from the optical path while decreasing the influence of the ND filter 621 on autofocus control. In addition, it is possible to photograph spot light sources without causing visually unnatural defocus patterns due to the shape of an aperture.

Incidentally, although in the tenth embodiment the ND filter 621 is turned by the meter 604, the aforesaid effects can also be achieved by manually manipulating the ND filter 621. In addition, it goes without saying that the aforesaid effects can be achieved irrespective of the structure of a diaphragm or the difference between the kinds of driving means, even in the case of an iris having approximately six iris blades or a diaphragm having an diamond-shaped aperture formed by two blades which move parallel to each other.

As described above, each of the above-described ninth and tenth embodiments, there is provided a light quantity adjusting device which is arranged in a camera or the like and which includes an optical member for adjusting a light quantity which is transmitted through a photographing lens, a holding member which holds the optical member, and an operating member for manually or automatically operating the holding member to insert and retract the optical member into and from an effective light beam of a photographing optical system. The holding member has a U-shaped optical member mounting portion which is opened in the moving direction of the optical member, and a rotating shaft which is disposed approximately horizontally of an optical axis, whereby if the optical member such as an ND filter is inserted or retracted into or from an optical path, it is possible to prevent the holding frame from being reflected in a picture even during photography, thereby realizing photography without a steep variation in an image.

In addition, according to the tenth embodiment, the optical member has an arcuate end face, and the optical member is inserted into the effective light beam of the photographing lens with the arcuate end face of the optical member being positioned approximately horizontally until the optical member completely covers the effective light beam.

Accordingly, during photography, it is possible to insert and retract the optical member such as an ND filter into and from the optical path while decreasing the influence of the optical member on autofocus control. In addition, it is possible to photograph spot light sources without causing visually unnatural defocus patterns due to the shape of an aperture.

The invention claimed is:

1. An image pickup apparatus comprising:
   diaphragm means for varying a size of a diaphragm aperture which determines a light quantity to be made incident on image pickup means;
   a light-attenuating filter which is capable of moving between an insertion position at which said light-attenuating filter covers the whole of the diaphragm aperture and a retraction position at which said light-attenuating filter is retracted from the whole of the diaphragm aperture; and
   control means for both controlling said diaphragm means and controlling an image pickup time of said image pickup means and a movement of said light-attenuating filter, according to a subject illuminance detected through said image pickup means,
   wherein when the size of the diaphragm aperture reaches a first predetermined value with said light-attenuating filter being positioned at the retraction position and: (i) an exposure time being a predetermined high-speed shutter time, said control means executes control which moves said light-attenuating filter to the insertion position and, at the same time, makes the exposure time longer than the predetermined high-speed shutter time; or (ii) the exposure time being longer than the predetermined high-speed shutter time, said control means executes control which, as the subject illuminance becomes higher, makes the exposure time shorter toward the predetermined high-speed shutter time while maintaining the size of the diaphragm aperture at the first predetermined value; and wherein when the size of the diaphragm aperture reaches a second predetermined value larger than the first predetermined value with said light-attenuating filter being positioned at the insertion position and the exposure time being a predetermined low-speed shutter time, said control means executes control which moves said light-attenuating filter to the retraction position and, at the same time, makes the exposure time shorter than the predetermined low-speed shutter time.

2. An image pickup apparatus according to claim 1, wherein when the size of the diaphragm aperture reaches a second predetermined value with said light-attenuating filter being positioned at the retraction position and the exposure time being shorter than the predetermined low-speed shutter time, said control means executes control which, as the subject illuminance becomes lower, makes the exposure time longer toward the predetermined low-speed shutter time while maintaining the size of the diaphragm aperture at the second predetermined value.

3. An image pickup apparatus according to claim 2, wherein the first predetermined value is larger than a diffraction limit value of said diaphragm means.

4. An image pickup apparatus according to claim 1 or 2, wherein the subject illuminance at which said control means moves said light-attenuating filter from the retraction position to the insertion position is higher than the subject illuminance at which said control means moves said light-attenuating filter from the insertion position to the retraction position.

* * * * *